(12) United States Patent
Jetton et al.

(10) Patent No.: US 11,388,921 B2
(45) Date of Patent: Jul. 19, 2022

(54) DEVICE FOR PREPARATION OF GELATIN-BASED PRODUCTS

(71) Applicant: Jevo IP, LLC, Los Angeles, CA (US)

(72) Inventors: Jeff Jetton, Lake Oswego, OR (US);
Thomas Gurski, Seattle, WA (US); Ian Graves, Seattle, WA (US); Jason Covey, Seattle, WA (US); Kevin Rivers, Seattle, WA (US); Brian Kennedy, Seattle, WA (US)

(73) Assignee: Jevo IP, LLC, Los Angeles, CA (US)

( * ) Notice: Subject to any disclaimer, the term of this patent is extended or adjusted under 35 U.S.C. 154(b) by 1216 days.

(21) Appl. No.: 15/107,896

(22) PCT Filed: Dec. 23, 2014

(86) PCT No.: PCT/US2014/072286
§ 371 (c)(1),
(2) Date: Jun. 23, 2016

(87) PCT Pub. No.: WO2015/100386
PCT Pub. Date: Jul. 2, 2015

(65) Prior Publication Data
US 2016/0309763 A1 Oct. 27, 2016

Related U.S. Application Data

(60) Provisional application No. 61/920,372, filed on Dec. 23, 2013.

(51) Int. Cl.
*A23L 29/00* (2016.01)
*A23P 30/10* (2016.01)
(Continued)

(52) U.S. Cl.
CPC .......... *A23L 29/284* (2016.08); *A23G 3/0025* (2013.01); *A23G 3/0252* (2013.01);
(Continued)

(58) Field of Classification Search
CPC ...... A47J 43/044; A47J 43/04; A47J 43/0705; A23L 29/281; A23L 29/284;
(Continued)

(56) References Cited

U.S. PATENT DOCUMENTS

| 1,522,428 A | 1/1925 | Ferguson |
| 3,037,674 A | 6/1962 | Brady et al. |

(Continued)

FOREIGN PATENT DOCUMENTS

| CN | 1054524 A | 9/1991 |
| EP | 1570745 A1 | 9/2005 |

(Continued)

OTHER PUBLICATIONS

ISA Korean Intellectual Property Office, International Search Report and Written Opinion Issued in Application No. PCT/US2014/072286, dated Apr. 27, 2015, WIPO, 13 pages.

(Continued)

*Primary Examiner* — Ericson M Lachica
*Assistant Examiner* — Preston Smith
(74) *Attorney, Agent, or Firm* — McCoy Russell LLP

(57) ABSTRACT

Methods and systems are provided for preparing a gelatin-based product. In one example, a device for preparing the gelatin-based product includes a mixing chamber, a first liquid reservoir fluidically coupled to the mixing chamber, and a chiller module. The device further includes a slideable tray including a number of slots for receiving a number of fluid vessels and an injection assembly fluidly coupled to the mixing chamber and positioned vertically above the tray.

13 Claims, 51 Drawing Sheets

(51) Int. Cl.
*A47J 43/00* (2006.01)
*A23L 29/281* (2016.01)
*A47J 43/044* (2006.01)
*A47J 43/04* (2006.01)
*A23G 3/02* (2006.01)
*A23G 3/34* (2006.01)

(52) U.S. Cl.
CPC ............... *A23P 30/10* (2016.08); *A47J 43/04* (2013.01); *A47J 43/044* (2013.01); *A23L 29/281* (2016.08); *A23V 2002/00* (2013.01)

(58) Field of Classification Search
CPC .... A23L 1/05625; A23L 29/287; A23P 10/30; A23P 30/10; A23V 2002/00
See application file for complete search history.

(56) References Cited

U.S. PATENT DOCUMENTS

| | | | |
|---|---|---|---|
| 3,371,626 A | | 3/1968 | Hachtman |
| 3,452,689 A | | 7/1969 | Kinney et al. |
| 4,055,892 A | | 11/1977 | Del Vecchio |
| 4,617,908 A | | 10/1986 | Miller et al. |
| 5,171,976 A | * | 12/1992 | Bone, Jr. ............... G06K 7/1095 235/375 |
| 5,404,922 A | | 4/1995 | Sliter |
| 6,303,175 B1 | | 10/2001 | Kürzinger et al. |
| 6,596,334 B1 | | 7/2003 | Flickinger et al. |
| 6,663,907 B1 | | 12/2003 | Pratolongo |
| 2002/0031591 A1 | | 3/2002 | Kerrigan et al. |
| 2003/0190394 A1 | | 10/2003 | Suzuki et al. |
| 2004/0013783 A1 | | 1/2004 | Miller |
| 2006/0016347 A1 | | 1/2006 | Girard et al. |
| 2006/0099316 A1 | | 5/2006 | Nuckles et al. |
| 2007/0215239 A1 | | 9/2007 | Dorney |
| 2009/0148582 A1 | | 6/2009 | Leibovich et al. |
| 2010/0140302 A1 | | 6/2010 | Knobel |
| 2011/0030564 A1 | * | 2/2011 | Cocco ................. A47J 31/3671 99/323.3 |
| 2011/0033599 A1 | | 2/2011 | Uttinger |
| 2011/0094597 A1 | * | 4/2011 | Blanc .................. A47J 31/3666 137/14 |
| 2011/0129588 A1 | | 6/2011 | Marini |
| 2011/0223308 A1 | * | 9/2011 | Motzaeli ................ C12G 3/005 426/575 |
| 2011/0228632 A1 | * | 9/2011 | Kozlowski ............... A23G 9/12 366/343 |
| 2012/0006204 A1 | | 1/2012 | Eidenschink et al. |
| 2012/0251695 A1 | * | 10/2012 | Neff ...................... A47J 27/004 426/509 |
| 2012/0314059 A1 | | 12/2012 | Hoffmann et al. |
| 2013/0340629 A1 | | 12/2013 | Jetton et al. |

FOREIGN PATENT DOCUMENTS

| | | |
|---|---|---|
| GB | 2249934 A | 5/1992 |
| JP | 2007319108 A | 12/2007 |
| WO | 9848642 A1 | 11/1998 |
| WO | 2011096979 A2 | 8/2011 |

OTHER PUBLICATIONS

United States Patent and Trademark Office, Precedential Opinion Issued in U.S. Appl. No. 10/132,492, filed Oct. 1, 2009, USPTO, 47 pages.

Australian Patent Office, Office Action Issued in Application No. 2014369892, dated Mar. 1, 2018, 9 pages.

European Patent Office, Extended European Search Report Issued in Application No. 14873614.3, dated Nov. 13, 2017, Germany, 68 pages.

State Intellectual Property Office of the People's Republic of China, Office Action and Search Report Issued in Application No. 201480070771.6, dated Mar. 5, 2019, 13 pages. (Submitted with Partial Translation).

* cited by examiner

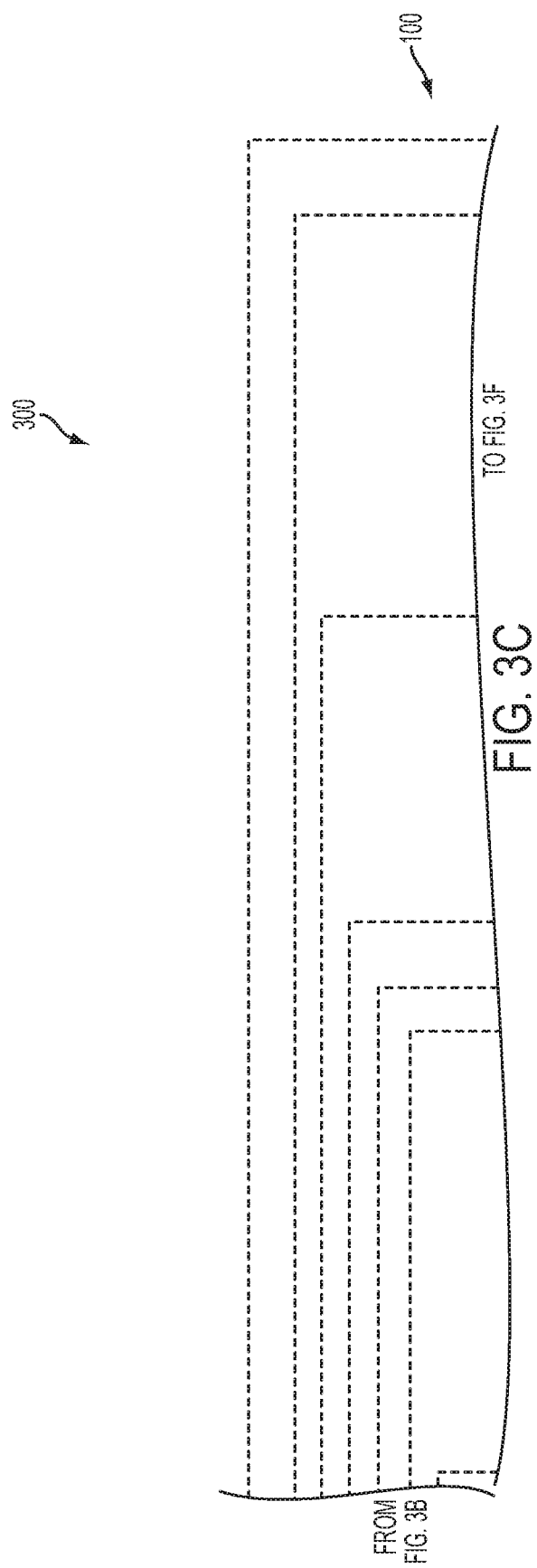

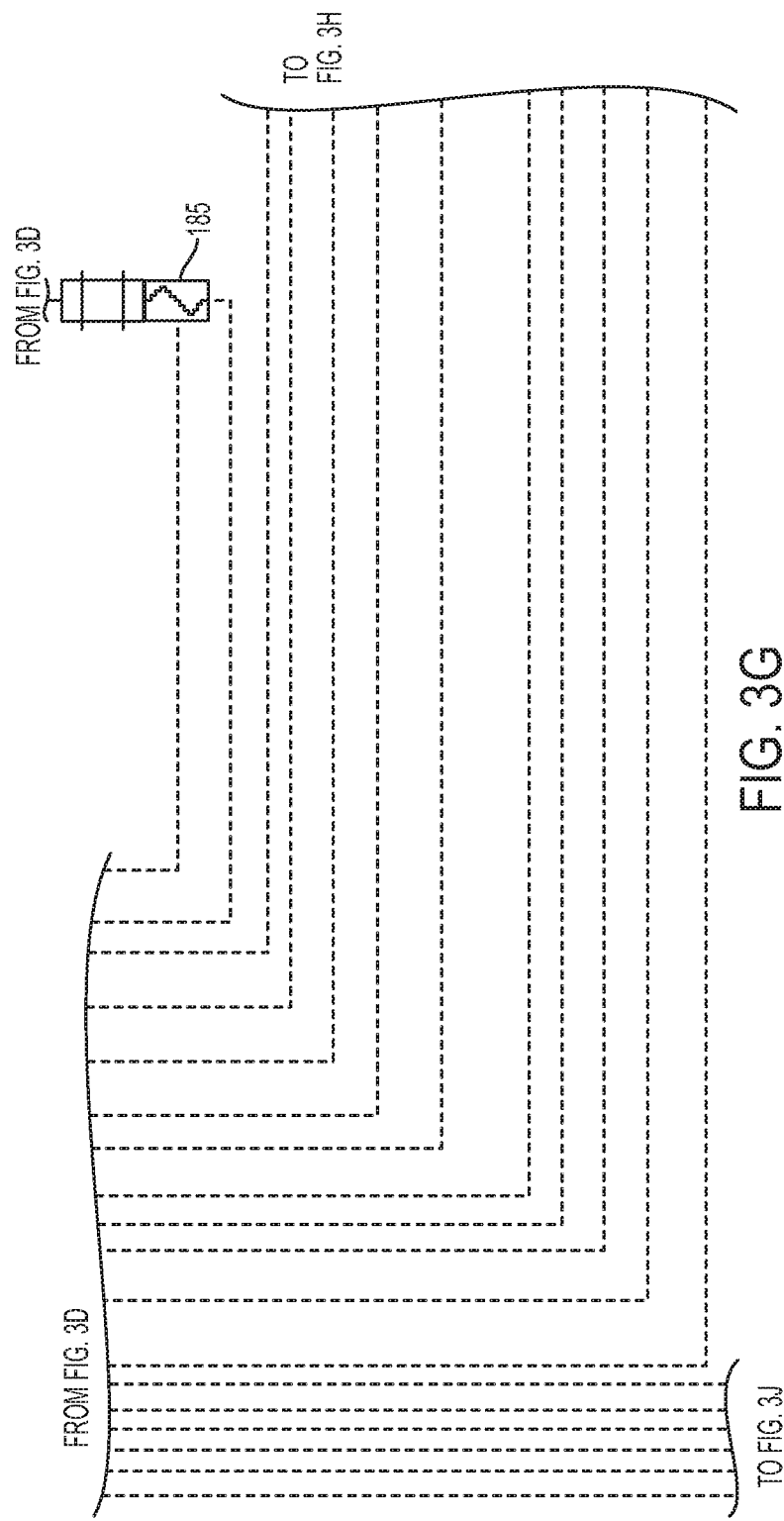

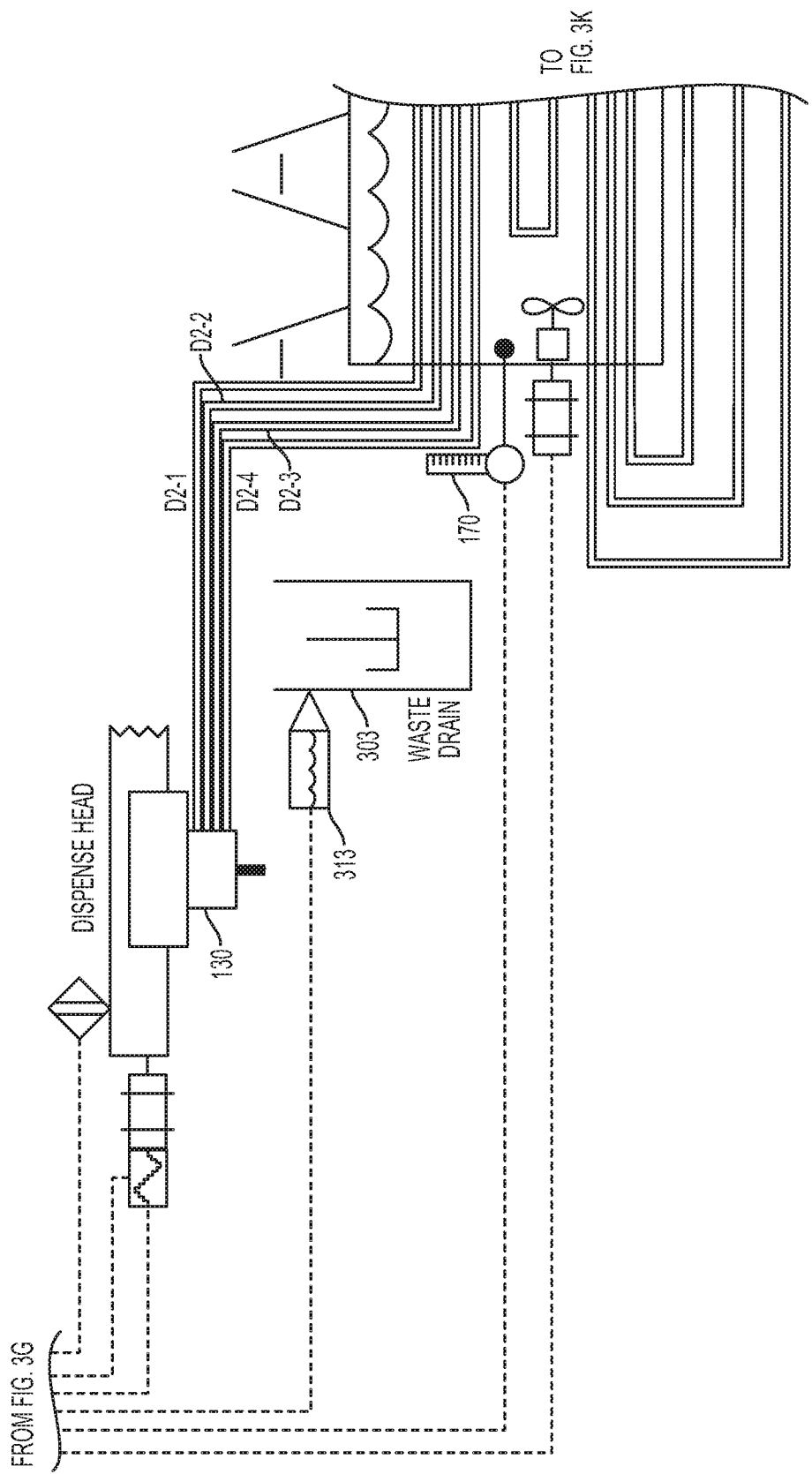

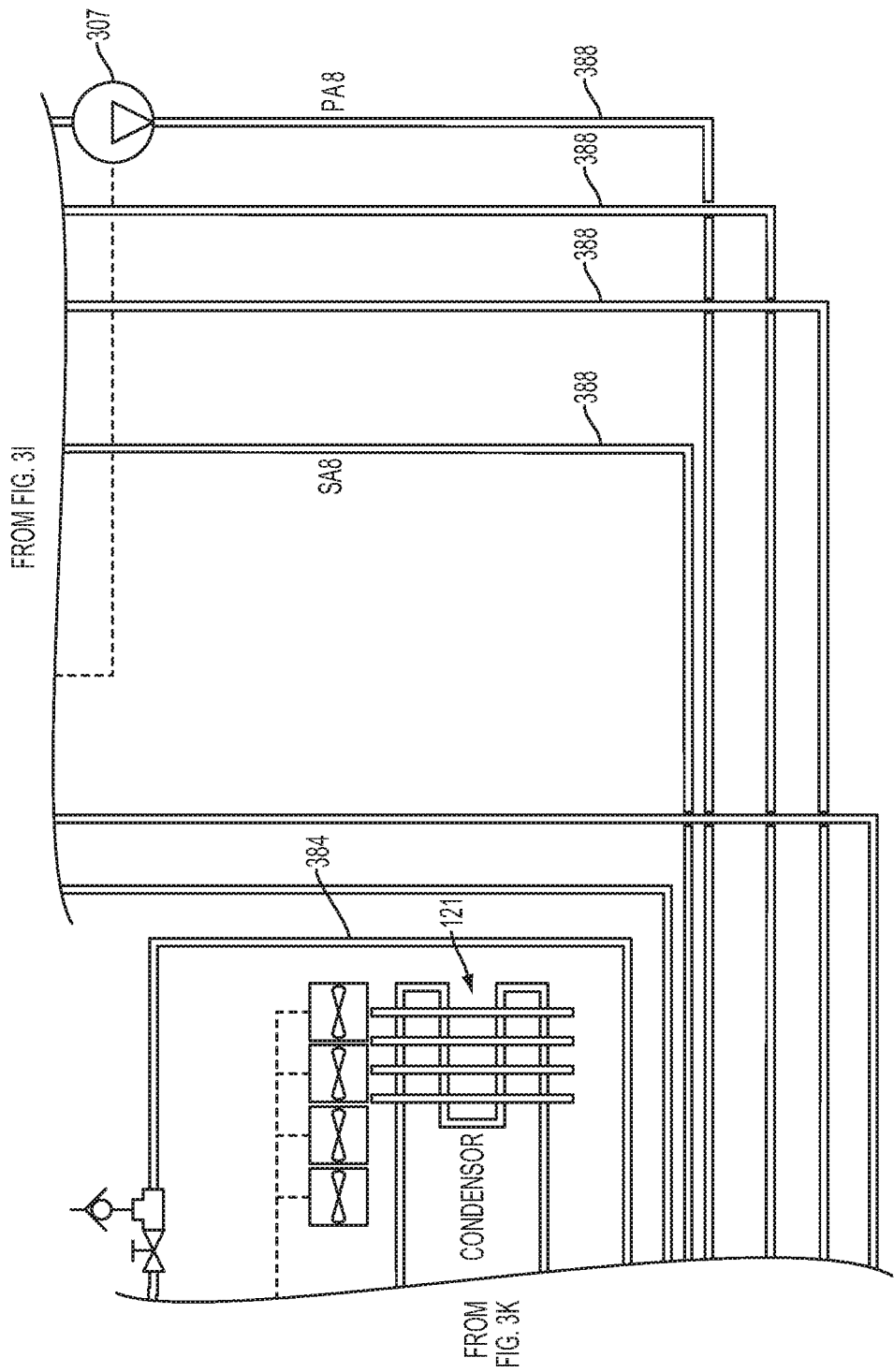

DEVICE FOR PREPARATION OF GELATIN-BASED PRODUCTS

CROSS REFERENCE TO RELATED APPLICATIONS

The present application is a U.S. National Phase of International Application No. PCT/US2014/072286 entitled "DEVICE FOR PREPARATION OF GELATIN-BASED PRODUCTS", filed on Dec. 23, 2014, which claims priority to U.S. Provisional Patent Application No. 61/920,372 entitled "DEVICE FOR PREPARATION OF GELATIN-BASED PRODUCTS", filed on Dec. 23, 2013, the entire contents of both of which are hereby incorporated by reference for all purposes.

BACKGROUND/SUMMARY

Gelatin-based food products are food products made with gelatin, a substance commonly used as a gelling agent in food, pharmaceuticals, and cosmetic manufacturing. Gelatin-based food products can be made by combining plain gelatin with other ingredients or by using a premixed powder blend of gelatin with additives. The powdered blend may be dissolved in hot water and then chilled for a period of time to allow the product to set (e.g., gel). Fully prepared gelatin food products are sold in a variety of forms, ranging from large decorative shapes to individual serving cups. Certain gelatin food products are often referred to by the generic term, jello.

A popular recipe of a gelatin-based product calls for the addition of an alcoholic beverage (e.g., rum or vodka) to the gelatin mix, to create alcoholic gelatin-based food products (often referred to by the term, jello shots). When packaged individually into individual serving sizes or cups, these products may be referred to as gelatin-based shots. These products are often made and sold in bars, restaurants, night clubs, and resorts. The production of gelatin-based products may take a significant amount of time and manual energy. For example, from start to finish, making a single batch of gelatin-based food products may take four hours or more. This time may include a time to set or gel the product, as well as preparation and clean-up time. Serving large amounts of gelatin-based food products may require substantial kitchen and refrigeration space to be used for preparation and housing until the gelatin-based shots are served and sold. Additionally, manually preparing the gelatin-based shots with multiple pieces of equipment may increase the likelihood of contaminating the shots and/or result in an inconsistent end product (e.g., some batches may turn out better than other).

In one example, the issues described above may be addressed by a device for preparing a gelatin-based product. The device may include a mixing chamber, a first liquid reservoir fluidically coupled to the mixing chamber, a chiller module, a slideable tray including a number of slots for receiving a number of fluid vessels, and an injection assembly fluidly coupled to the mixing chamber and positioned vertically above the tray. In one example, a consumable cartridge inserted into the device may form the mixing chamber. The consumable cartridge may contain dry ingredients including a gelatin powder. In another example, dry ingredients from the consumable cartridge may be transferred from the consumable cartridge and into the mixing chamber. The first liquid reservoir may contain heated water. The dry ingredients may be mixed with the heated water within the mixing chamber. The device may further include a second liquid reservoir containing alcohol. A determined amount of cooled water and (optionally) alcohol may be combined with the liquid gelatin mixture from the mixing chamber to form a combined liquid gelatin mixture. This mixture may then be injected with the injection assembly into the fluid vessels in the tray. The tray may then be chilled via the chiller module to set the product. The chiller module may be configured to reduce an amount of time for gelling the product. As a result, the gelatin-based shots may be produced more rapidly over conventional methods. Additionally, the majority of the steps of the shot-making process may be contained within the device, thereby increasing efficiency, decreasing a risk of contamination, and reducing time previously required for set-up, preparation, and clean-up.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-3L show schematics of the electrical and fluidic connections between components of the device of FIG. 1

FIGS. 5-20 are drawn to scale.

DETAILED DESCRIPTION

Figure 1:
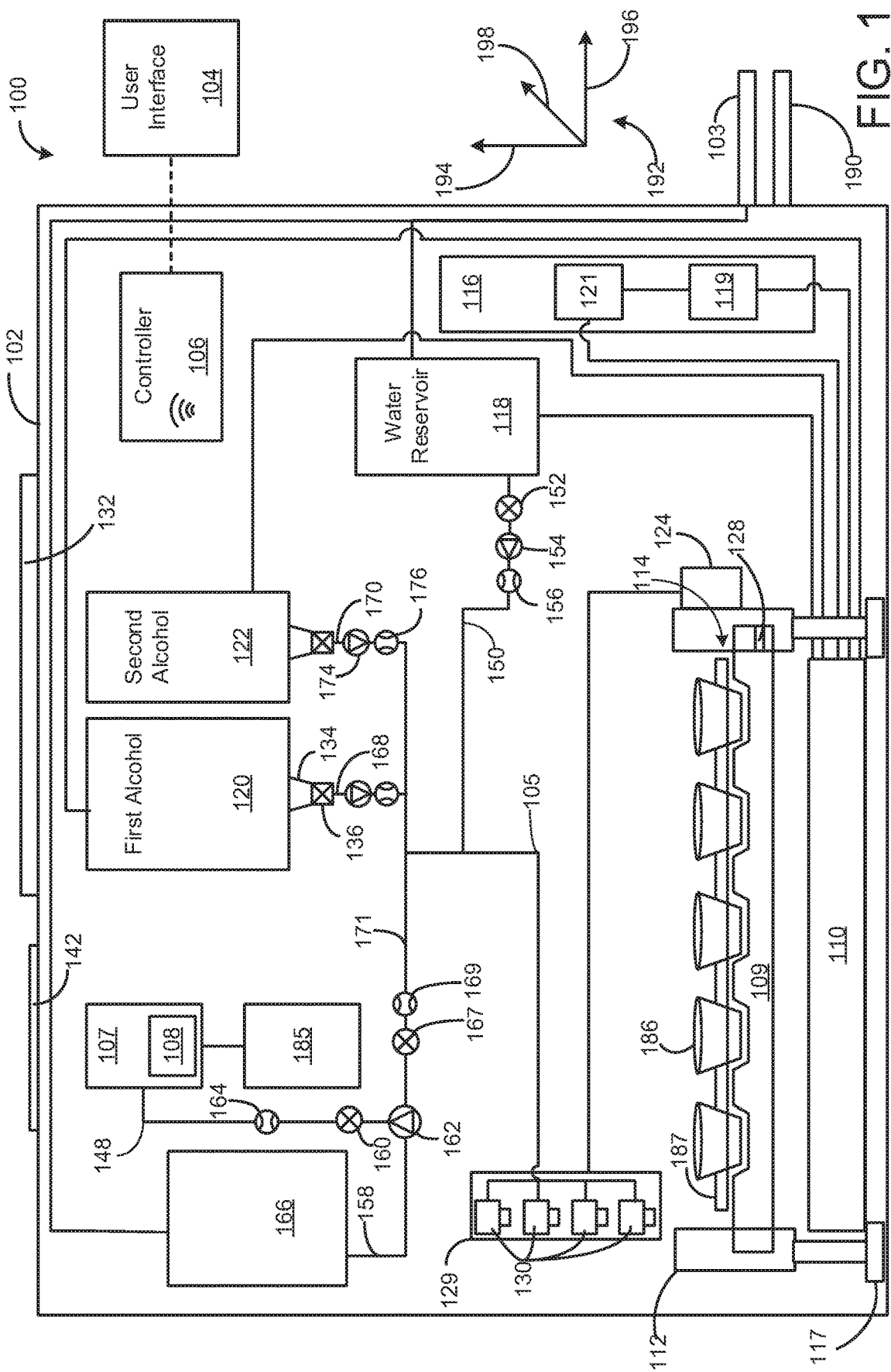
FIG. 1 shows a schematic diagram of a first embodiment of a device used to prepare a gelatin-based product.
Figure 2:
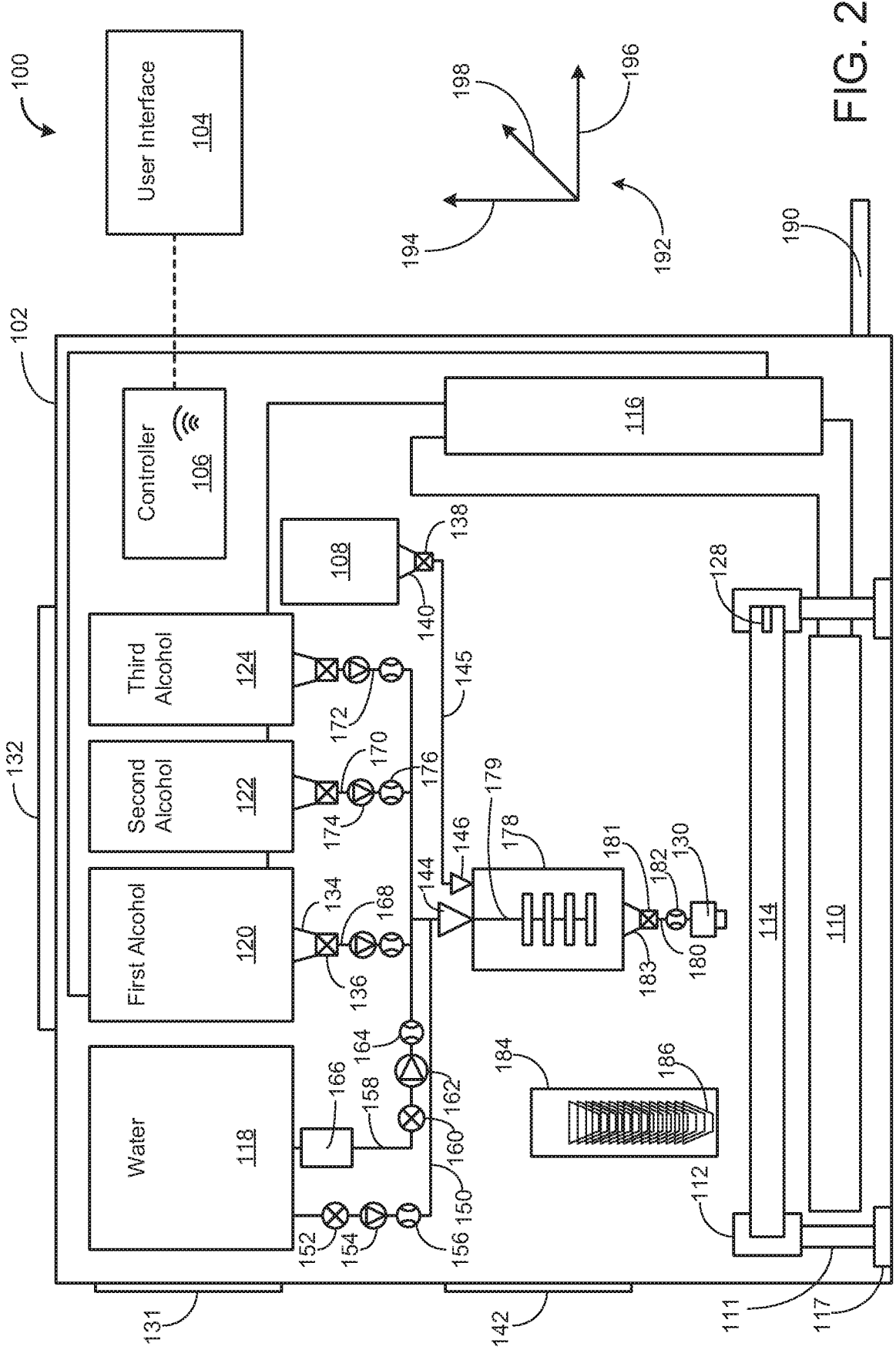
FIG. 2 shows a schematic diagram of a second embodiment of a device used to prepare a gelatin-based product.
Figure 3A:
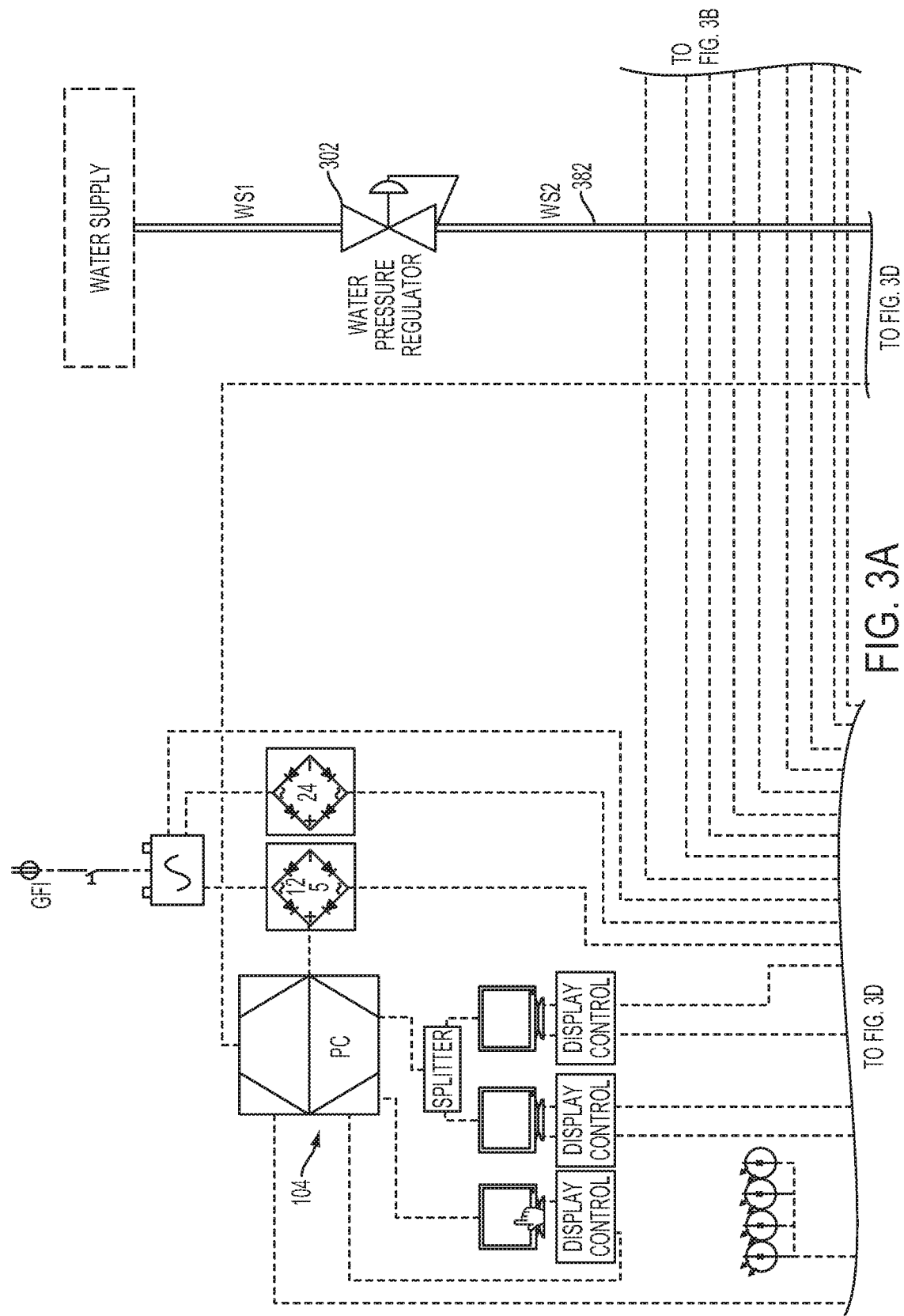
Figure 3D:
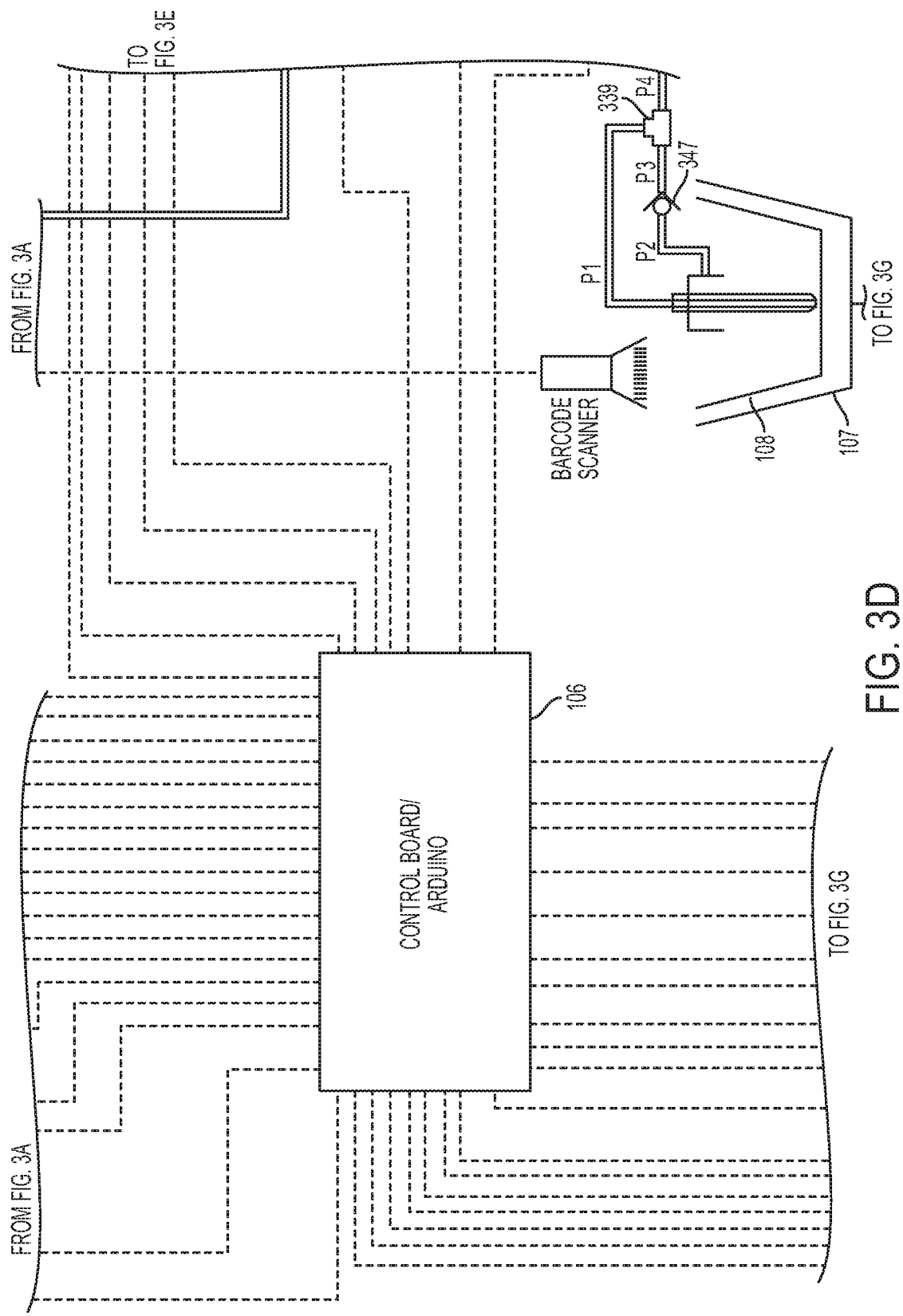
Figure 3E:
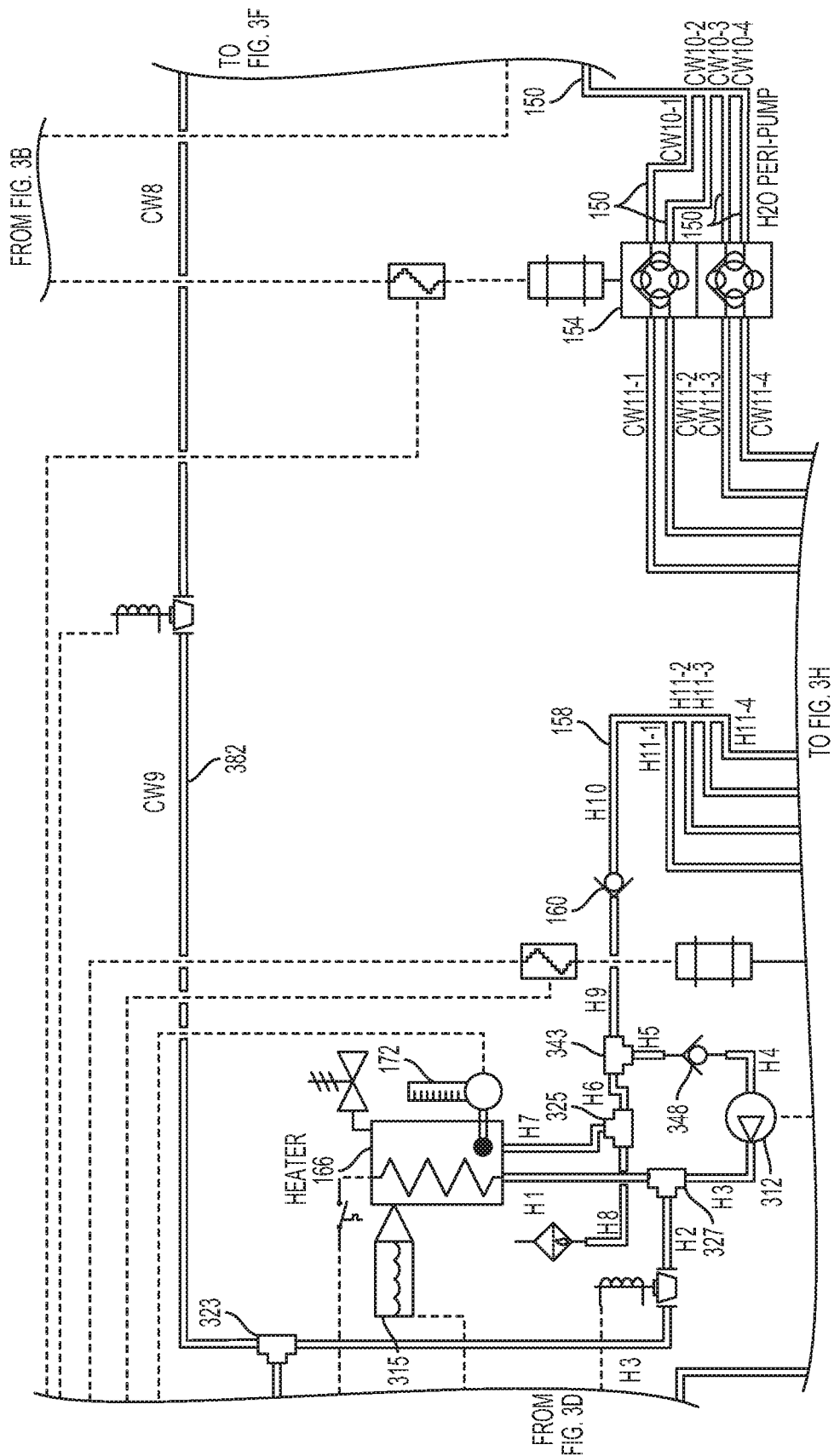
Figure 3F:
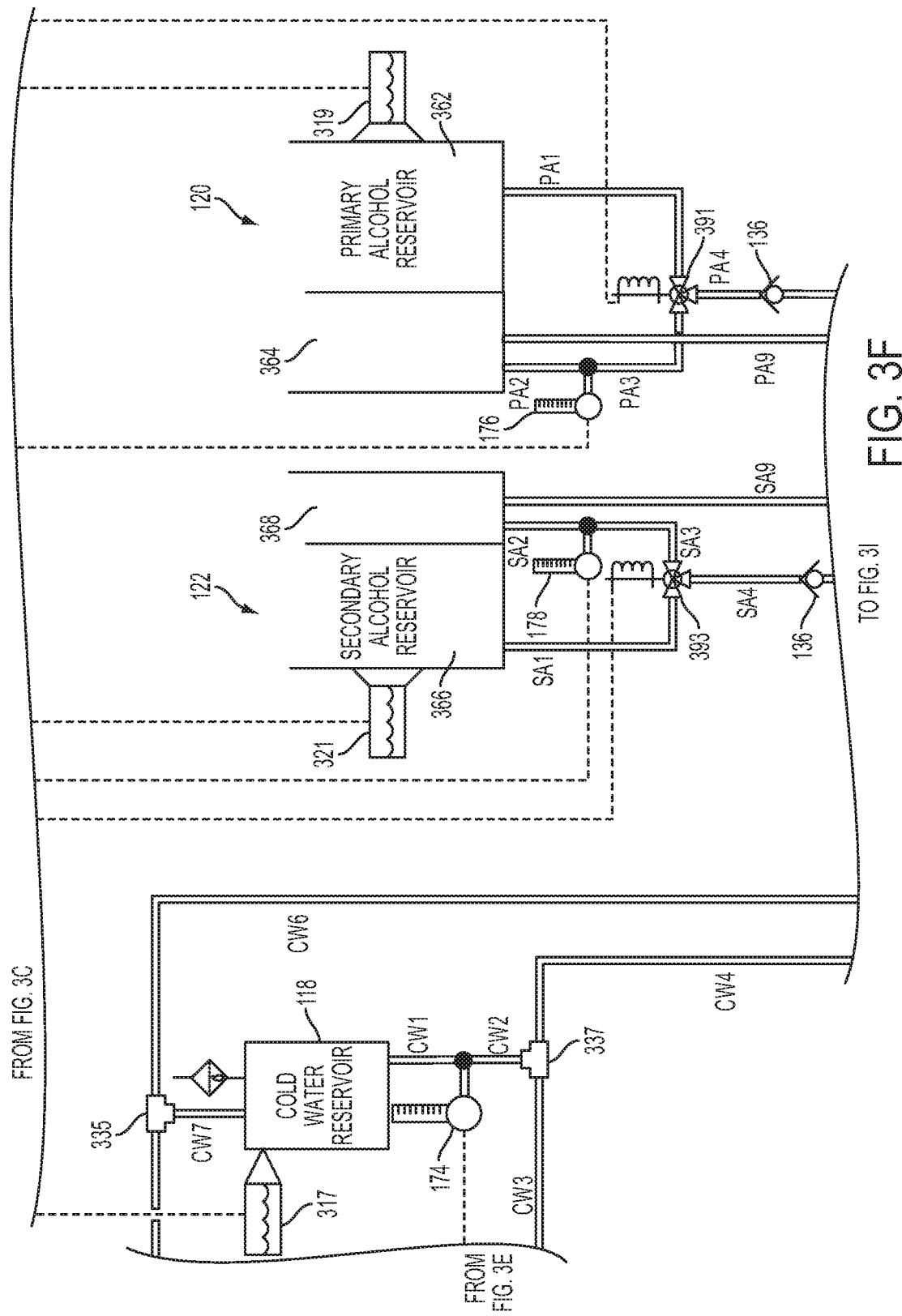
Figure 3H:
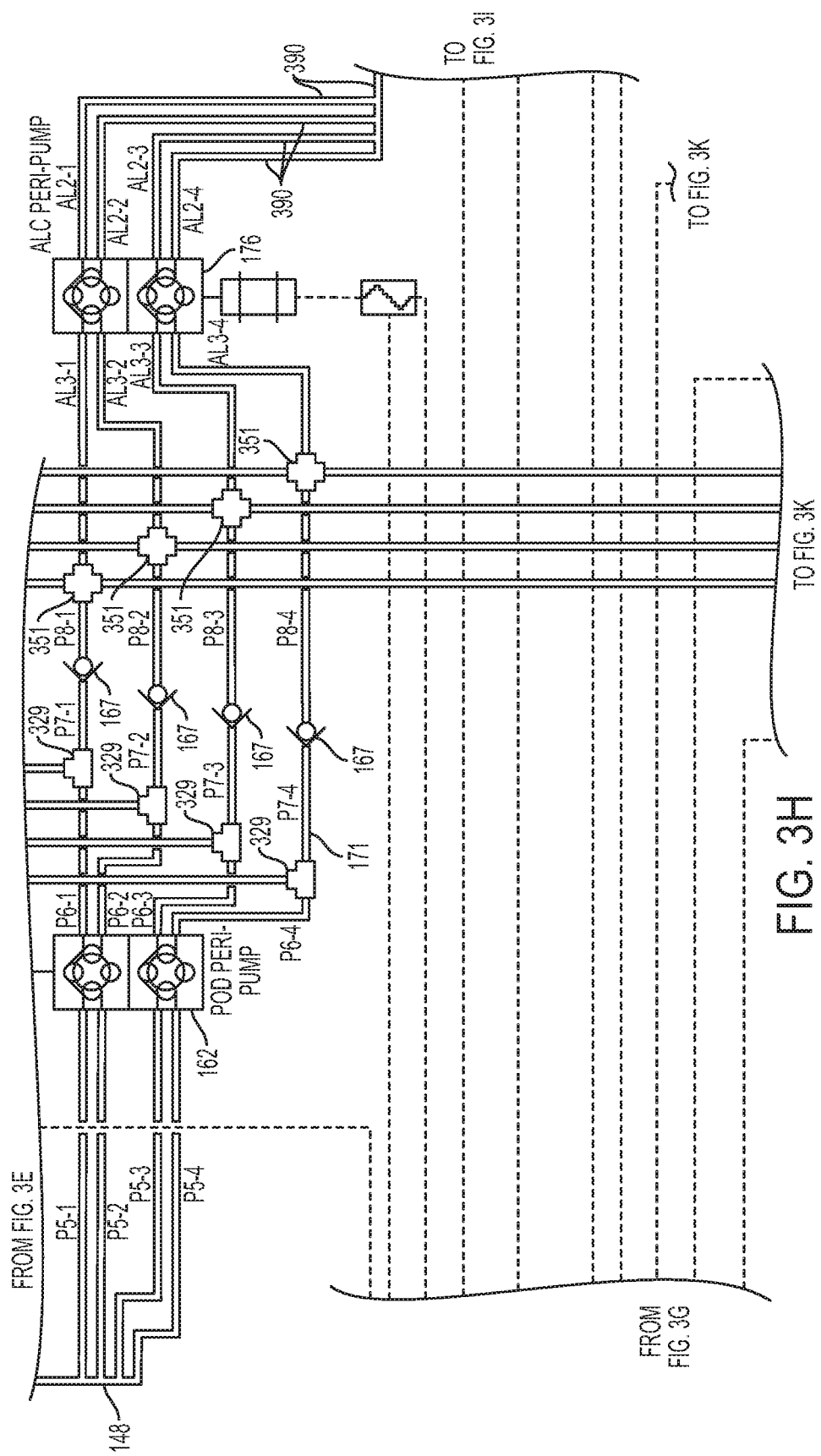
Figure 3I:
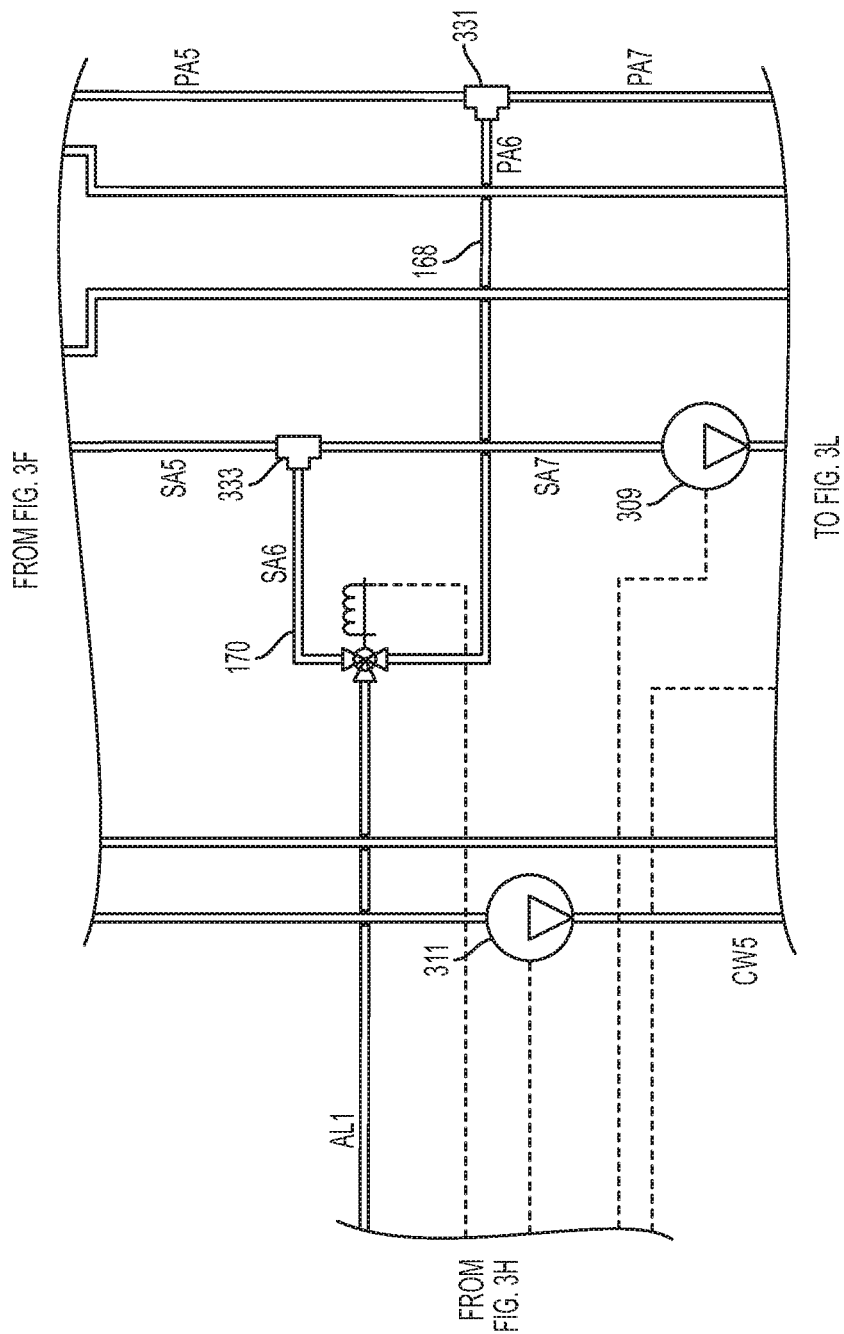
Figure 3K:
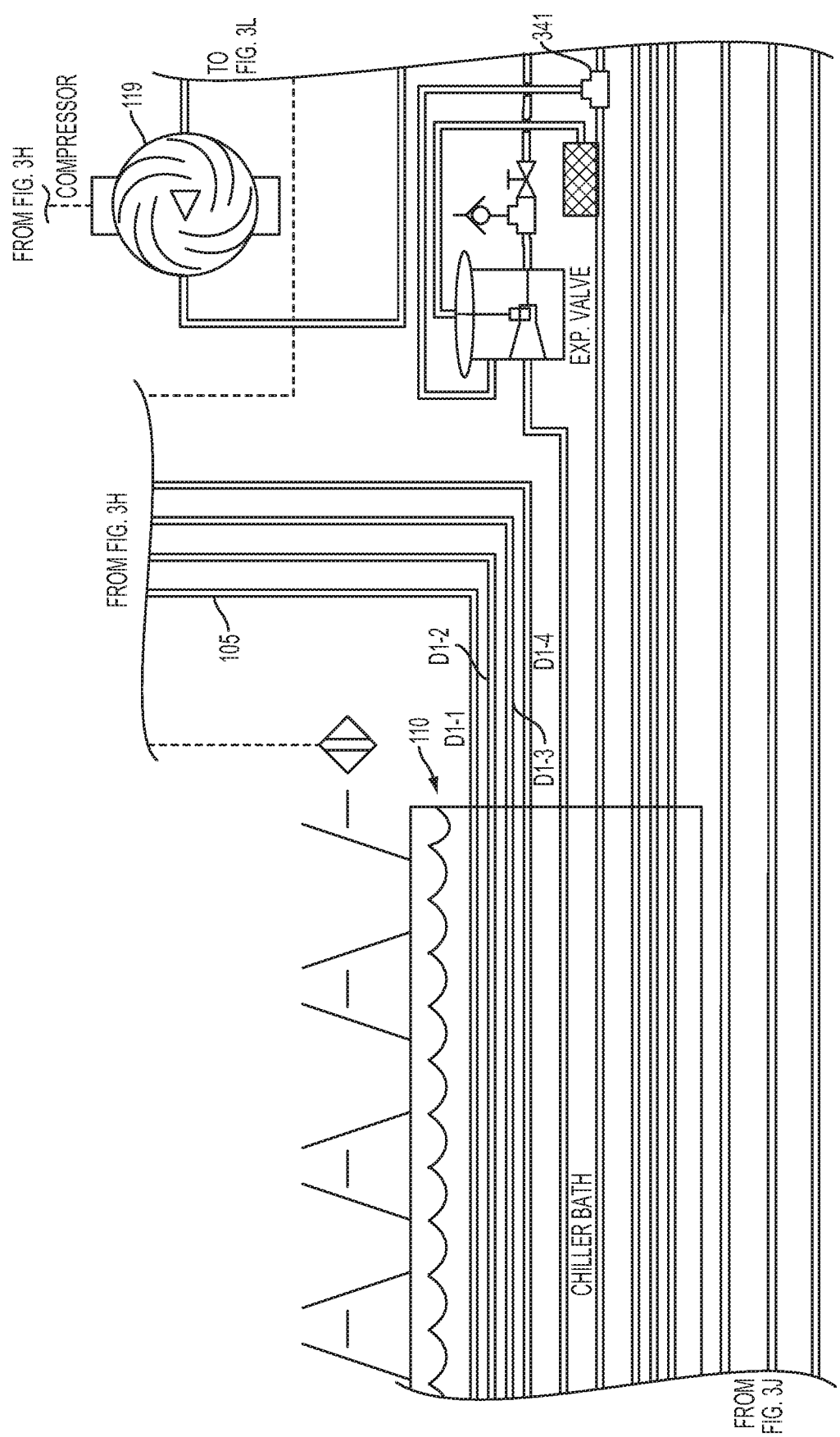

The following description relates to systems and methods for the preparation of gelatin-based products. Specifically, gelatin-based products may be prepared using a single and contained device, such as the device shown in FIGS. 1-20. In one example, the gelatin-based products may include gelatin mixed with other ingredients. For example, a gelatin powder may be mixed with water and, optionally, alcohol to form a liquid gelatin mixture. This liquid gelatin mixture may then be chilled for a period of time to form a gelatinous and solid gelatin-based product. The gelatin-based product may be formed in different shapes or within individual serving cups. The gelatin-based product within individual serving cups may be referred to herein as shots and thus the device may be referred to herein as a shot-making device. The device shown in FIGS. 1-20 may include one or more water reservoirs and alcohol reservoirs, as well as a space (e.g., slot) for receiving a consumable cartridge. The consumable cartridge may contain dry ingredients including gelatin power and possibly additional dry additives (such as vitamins or additional flavoring). Within a mixing chamber of the device, a specific amount of water may be added to the dry ingredients from the consumable cartridge and the resulting mixture may then be combined with additional water and alcohol and then automatically injected into a tray filled with individual serving cups. FIG. 1 shows a first embodiment where the consumable cartridge forms the mixing chamber. FIG. 2 shows a second embodiment where the mixing chamber is separate from the consumable cartridge. Processes for making the gelatin-based shots using the device and also for operating the device in different operational states are shown at FIGS. 21-35. After chilling the filled cups for a period of time, the shots may be complete and ready for consumption. A user may then remove the completed shots from the device.

Once all the necessary ingredients are loaded into the device, all the steps for making a batch of gelatin-based shots are performed within the device. Thus, the mixing and chilling may be fully-contained within one device. In another example, the mixing may be fully-contained within one device, while the chilling may be done external to the device. Further, the chilling may be performed more quickly with a chiller module of the device than conventional chilling methods for making gelatin-based shots. By automating the shot-making process, shots may be made more efficiently, thereby saving a user's time and money. Additionally, the mixing and chilling process of the device ensures the consistency of the shots. In one example, businesses such as bars, night clubs, restaurants, hospitals, and/or resorts may utilize the device to more efficiently prepare gelatin-based shots for their customers.

FIGS. 1-2 show schematics of two embodiments of a machine or device 100 for the preparation of gelatin-based food products. In particular, FIGS. 1-2 are two-dimensional schematic diagrams showing components of the device 100 and how they are fluidly coupled to one another. As such, the actual sizes and relative positions of the components of the device 100 may be different than shown in FIG. 1. FIGS. 5-20, described further below, are three-dimensional schematics of the device 100 showing the relative sizes and positions of the components within the device. As such, the function of each components may be described with reference to FIGS. 1-2 while the positioning of each component within the device may be described with reference to FIGS. 5-20. FIGS. 5-20 are drawn to approximately to scale. As such FIGS. 5-20 show the relative sizes and positioning of the components of the device 100.

In one example, the device 100 may be referred to as a shot-making device. Generally, the device 100 is configured to prepare multiple single servings of a gelatin-based product. In one embodiment, the device 100 may be configured to prepare gelatin-based shots containing alcohol. In other embodiments, the device 100 may be configured to prepare gelatin-based shots containing non-alcoholic beverages such as fruit juice, energy drink, and soft drinks. In further embodiments, the device 100 may be configured to prepare gelatin-based shots containing various consumable products such as fruit, vitamins, supplements, etc.

Turning to FIG. 1, a first embodiment of the device 100 is shown. The device 100 includes a device housing 102 and a user interface 104. A controller 106 within the housing 102 communicates with the user interface 104. In one example, the user interface 104 may be a touchscreen display coupled to an exterior of the housing 102. Specifically, the user interface 104 may be a graphical user interface used for the configuration, maintenance, and operation of the device 100. In one example, the user interface 104 may be coupled to a side of the exterior of the housing 102. Specifically, the user interface 104 may be positioned on a front face of the housing 102, above a slideable drawer (e.g., drawer) 114 of the device 100. In another example, the user interface 104 may be a touchscreen display on a remotely located computer, tablet, or mobile device that communicates wirelessly with the controller. In yet another example, the user interface 104 may include a series of buttons positioned on the exterior of the housing 102. In this way, the user interface 104 may be electrically coupled and/or wirelessly coupled to the controller 106.

Inside the housing 102, the device 100 includes multiple liquid reservoirs, one or more consumable cartridge receptacles (also referred to herein as a pod acceptor) 107, the controller 106, a removable and slideable tray 114 coupled to a tray mount (e.g., drawer mount) 112, a refrigeration system 116, and a chiller module 110. In one example, the device 100 may not include a chiller module 110. Instead a remote chiller module, similar to the chiller module 110 may be located exterior to the device 100 and not within the device 100. In another example, in addition to not including the chiller module 110, the device 100 may also not include the refrigeration system 116. Instead, a refrigeration system similar to the refrigeration system 116 may be included in the remote chiller module. Each of the liquid reservoirs and the pod acceptor 107 may be removably coupled to the housing 102. More specifically, the device 100 may include a water reservoir 118. The water reservoir 118 may be directly coupled via one or more water lines to a secondary water source. Specifically, the one or more water lines may be directly coupled to a water inlet port 103 which may be integrated into the housing 102 for receiving water from a secondary source. In one example, the secondary water source may be a larger water reservoir external to the device 100. A heater 166 may also be coupled to the water inlet port 103. In one example the heater 166 may include a reservoir for holding heated water. In another example, the heater 166 may not include a water reservoir.

A first water line 150 is coupled between the water reservoir 118 and an injection assembly 129. The first water line 150 may be a cooler water line with cooled water passing through the first water line 150 to the injection assembly 129. The first water line 150 includes a first valve 152, a first pump 154, and a first flow meter 156. The first valve 152 and/or the first pump 154 may be used to meter a certain volume of water into the injection assembly 129. In one example the first pump 154 may be a peristaltic pump. The first flow meter 156 may track the amount of water passing through the first water line 150 and into the injection assembly 129 and cause the first valve 152 to close once the required volume of water has been metered to the injection assembly 129.

A second water line 158 is coupled between the heater 166 and the pod acceptor 107. Similarly to the first water line 150, the second water line 158 includes a second valve 160, a second pump 162, and a second flow meter 164. In one example, the second pump 162 may be a peristaltic pump. The pod acceptor 107 may be configured to receive one or more consumable cartridges (also referred to herein as pods) 108. Specifically, the pods 108 may be removably coupled to the pod acceptor 107. The pod acceptor 107 may comprise a cylindrical cavity including a plurality of fins projecting outwardly from an interior surface of the cylindrical cavity. Complimentary fins positioned on an exterior surface of pod 108 may mate with the outwardly projecting fins on the pod acceptor 107. In other embodiments, the pod acceptor 107 may have different mating features adapted to mate with the pods 108. As an example, the pod acceptor 107 may contain grooves. A user may insert (e.g., load) and remove the pods 108 from the device 100 via a pod acceptor door 142 positioned on a top wall of the housing 102 of the device 100. The door 142 may open and close in order to allow loading and removal of the consumable cartridge 108 before and after the shot-making process.

The pod 108 may be a container containing dry ingredients such as gelatin powder. In one example, the pod 108 may be a rigid container. In another example, the pod may have a shape such as rectangular, square, or cylindrical. Additionally, the pod 108 may be single use (e.g., only used for one batch of shot).

Different pods 108 may have different volumes and/or amounts of dry ingredients. For example, a first pod 108 may have a first amount of dry ingredients. A second pod 108 may have a second amount of dry ingredients, the second amount of dry ingredients greater than the first amount of dry ingredients. As a result, the second pod 108 may make (e.g., yield) a larger amount of shots than the first pod. Despite their different sizes, the first pod and the second pod have the same connectors (e.g., fins, grooves) so that both pods 108 fit within the same respective complementary mating features of the pod acceptor 107. In this way, pods 108 of different sizes and volumes may be used within the same device 100.

Each pod 108 includes an electronic indicator, identifier tag, or other electronic label (e.g., microchip) readable by the controller 106. Upon inserting the pod into the complementary mechanical features (e.g., fins) of the pod acceptor 107, a scanning device may read the electronic identifier tag. The scanning device may be coupled to a side of the pod acceptor 107 at a level above a top surface of the pod acceptor 107. The consumable data contained within the electronic identifier tag may then be transferred to the controller 106. In one example, consumable data may include one or more of a number of shots to be made from the consumable cartridge 108, a flavor of contents (e.g., dry ingredients) within the pod 108, an expiration date of the contents within the consumable cartridge 108, a manufacturing data of the pod 108, and/or a manufacturer of the consumable cartridge 108. In this way, only consumable cartridges 108 manufactured by a specific manufacturer may be used with the device 100. If a pod 108 made by an unknown manufacturer is installed in the device 100, the device 100 may not execute the shot-making routine. In other words, the device 100 may only operate with a consumable cartridge 108 from a known and verified manufacturer, as indicated through the electronic identifier tag.

The pod acceptor 107 may be physically coupled to a first motor 185 and may be rotated by the motor 185. In one example the motor 185 may be a stepper motor. The pod acceptor 107 may be rotatable in two directions about a center axis of the pod acceptor 107. Further, the pod acceptor 107 may be configured to receive heated water from the heater 166 via the second water line 158. Specifically, a needle may be coupled to an interior surface of the door 142 through a hinged joint and may extend into an interior of the pod acceptor 107 when the door 142 is closed. Further the needle may extend into an interior of the pod 108 and as such the pod 108 may be fluidly coupled to the heater 166. The heater 166 may heat the water to a threshold temperature. As such, the second water line 158 may be a heated water line. The threshold temperature may be a temperature that causes the dry ingredients within the pod acceptor 107 to dissolve. In one example, the threshold temperature may be approximately 212° F. In another example, the threshold may be smaller or greater than 212° F. If a pod 108 is loaded into the pod acceptor, the motor 185 may rotate the pod acceptor 107 according to a pre-determined agitation profile to mix contents of the pod 108 with the heated liquid (e.g. water) received from the second water line 158 into a dissolved mixture. Mixing may occur for a duration until all the fluid and dry ingredients are fully dissolved. In alternate embodiments, the pod may also be configured to receive solid consumables such as fruit, supplements, and vitamins. As such the solid consumables may be liquefied in the pod 108 through the mixing process and mixed with the dry and fluid ingredients in the pod 108. A third water line 171 may be coupled between the second pump 162 and the injection assembly 129. The third water line 171 may include a third valve 167 and a third flow meter 169. Thus, the second pump 162 may be coupled to the heater 166, pod acceptor 107 and injection assembly 129. As such, the second pump 162 may be a three way pump, which may regulate the flow of heated water to the pod acceptor 107 from the heater 166, and the flow of dissolved mixture from the pod acceptor 107 to the injection assembly 129.

The device 100 also includes multiple alcohol reservoirs. As shown in FIG. 1, the device 100 includes a first alcohol reservoir 120, and a second alcohol reservoir 122. Each of the alcohol reservoirs may contain a different type of alcohol. For example, the first alcohol reservoir 120 may contain a first type of alcohol, and the second alcohol reservoir 122 may include a second type of alcohol. In other examples, the alcohol reservoirs may contain non-alcoholic liquids such as fruit juice, energy drinks, and soft drink. Further, solid items such as vitamins, supplements, and fruit may be deposited into the alcohol reservoirs. In alternate embodiments, the device may include more or less than two alcohol reservoirs. For example, the device 100 may include three alcohol reservoirs. In yet other embodiments, two or more of the alcohol reservoirs may contain the same type of alcohol.

Each of the alcohol reservoirs are covered and sealed at all openings or ports such that the alcohol within the reservoirs may not be contaminated. In one example, each of the alcohol reservoirs has a rectangular cross-section and is made of a material able to contact food products such as food grade plastic. Further, the first alcohol reservoir 120, and second alcohol reservoir 122, may be different sizes with different fluid volume capacities. For example, the first alcohol reservoir 120 may be a larger first size with a volume of approximately 72 ounces. The second alcohol reservoir 122 may be a smaller second size with a volume of approximately 18 ounces. In alternate embodiments, the first alcohol reservoir 120 and the second alcohol reservoir 122 may have larger or smaller volumes based on a volume necessary to make a certain number of batches of shots. Further, in some examples, all the alcohol reservoirs may be approximately the same size with the same volume. In other examples, all the alcohol reservoirs may be different sizes with different fluid volumes.

The first alcohol reservoir 120, and the second alcohol reservoir 122, are all removably coupled to the housing 102. In one example, the alcohol reservoirs and the housing 102 may include complementary mechanical couplers, such as brackets, which allow easy loading and removal from the housing 102. Further, the alcohol reservoirs may be moved into and out of the device 100 through a door 132 positioned in a top face (or wall) of the housing 102). Additionally, each of the alcohol reservoirs includes a valve 134 proximate to a bottom face of the alcohol reservoir. For example, the valve 134 may be coupled to the bottom face of the alcohol reservoir. In one example, when the valve 134 is compressed, the valve 134 may open and allow passage of the alcohol through the valve and out of the alcohol reservoir. The valve 134 may couple to a corresponding mechanical fitting including a valve actuator 136. The valve actuator 136 may actuate the valve 134 to open and close based on commands sent from the controller 106. Each of the first alcohol reservoir 120, and the second alcohol reservoir 122, include a valve 134 which couples to a corresponding valve actuator 136.

The dissolved mixture from the pod acceptor 107, pre-chilled alcohol from one or more of the alcohol reservoirs, and cooled (e.g., pre-chilled) water from the water reservoir 118 may be pumped by the peristaltic pumps to a common fluid line 105 before entering the injection assembly 129. Thus, the dissolved mixture, alcohol, and cooled water may combine to form a combined liquid gelatin mixture before entering the injection assembly 129. The injection assembly 129 may include a plurality of nozzles 130 for dispensing the liquid gelatin mixture into a plurality of cups 186 disposed in the tray 114. Thus, the cups 186 may receive the liquid gelatin mixture from the common fluid line 105 via the nozzles 130. In some embodiments, the liquid from the alcohol reservoirs may be non-alcohol (e.g., juice, energy drink, soft drink, etc.). Additionally, solid consumables such as fruit and vitamins may enter the common fluid line 105 by introducing these elements into either the pod 108 or the alcohol reservoirs as described above. Thus, the dissolved fluid mixture in the fluid line 105, may or may not include alcohol, and may include non-alcoholic beverages, vitamins, fruit, medication, and other consumables.

Figure 5:
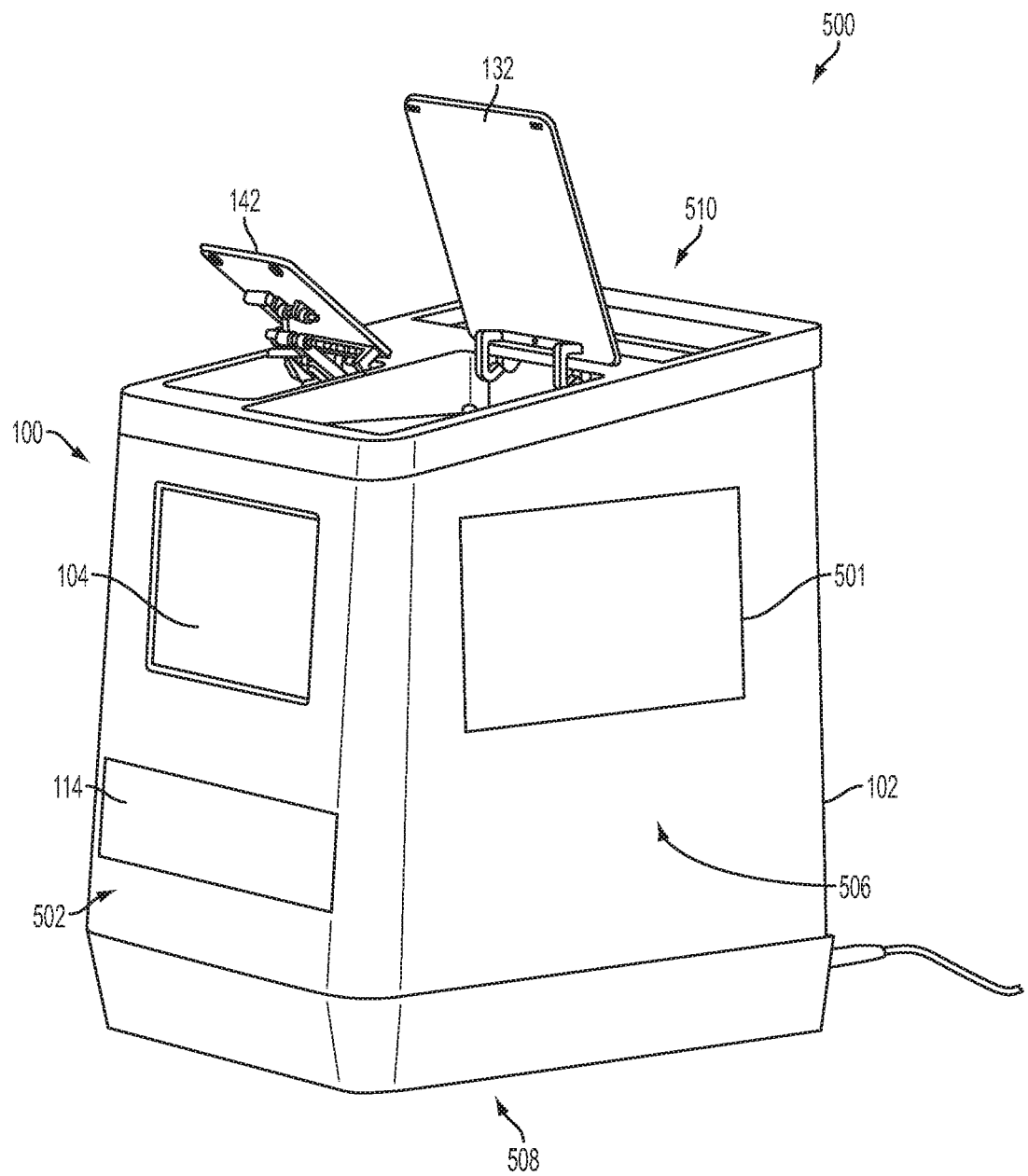
FIGS. 5-20 show schematics of a device used to prepare a gelatin-based product, such as the device of FIG. 1.

Further, the controller 106 may control the movement and operation of the injection assembly 129. The tray 114 may include a removably coupled constituent tray 187 and a drawer 109. Cups 186 may be removably coupled to the constituent tray 187. Further, the constituent tray 187 may be removably coupled to the drawer 109. Cups 186 may extend through slots in the constituent tray 187 and into recesses in the drawer 109. The tray 114 may be coupled to the drawer mount 112. The drawer mount 112 is built into the housing 102 and may be slidable into and out of the device 100 when a door (not shown in FIG. 1) is opened. Specifically, tray 114 slides along a groove in the tray mount 112. The door may be a door (e.g., door 506 shown in FIG. 5) positioned in the front face of the housing 102, in front of the tray 114, as shown in FIG. 5. For example, a user may open the door and then slide the tray 114 out from the inside of the device 100, thereby revealing the tray 114 to the user. The user may then load cups 186 in the constituent tray 187, and load the constituent tray 187 into the drawer 109. The constituent tray 187 may include a number of slots for receiving the cups 186. Thus, the slots may be sized similarly to the cups such that one cup fits within each slot. After loading the required number of cups, the user may move the tray 114 back inside of the device 100 and underneath the nozzles 130 of the injection assembly 129 and close the door. The user may also load the cups 186 with fruit, vitamins, supplements, or other consumable products to be mixed with the dissolved fluid mixture from the common fluid line 105.

As described above, the cups 186 may be sized to fit within slots of the constituent tray 187. In one example, the cups and corresponding tray slots may have an oval cross-section with. The diameters of the cross-sections of the cups 186 may increase towards an opening of the cups 186. The diameter of the cross-section of the cups 186 proximate the opening of the cups 186 may be slightly larger than the diameters of the slots in the constituent tray 187. Thus, the cups 186 may extend partially through the slots in the constituent tray 187, such that the cups 186 may still be supported by the constituent tray 187 at their tops. The recesses in the drawer 109 may be sized accordingly to receive the portion of the cups 186 extending through the constituent tray 187. In alternate embodiments, the cups and corresponding slots may have a different cross-section (e.g., circular or square) with a different size. For example, the cross-section of the cups may be circular.

As introduced above, the tray 114 is positioned vertically below the injection assembly 129 and nozzles 130. Additionally, the injection assembly 129 may be coupled to a second motor 124. The motor 124 may translate the injection assembly 129 including the nozzles 130 horizontally. For example, FIG. 1 shows an axis system 192 including a vertical axis 194, a horizontal axis 196, and a lateral axis 198. The motor 124 may translate horizontally with respect to the horizontal axis 196. The controller 106 may adjust the position of the injection assembly 129 via actuation of the motor 124. As such, the controller 106 may translate the injection assembly 129 to a desired position. The injection assembly may include a plurality of nozzles 130 extending for the length of the tray 114 along the lateral axis 198. The slots in the constituent tray 187 may be arranged in columns extending along a width of the tray 114, in a direction of the lateral axis 198, and rows extending along the length of the tray 114, in a direction of the horizontal axis 196 (e.g., in an array). Thus, each nozzle 130 may be aligned over each slot in a row of slots in the tray 114. As such, the number of nozzles 130 may be the same as the number of rows in the tray 114. In one example the injection assembly may include four nozzles 130 and the tray 114 may include four rows for cups. In alternate embodiments, the injection assembly 129 may include greater or fewer nozzles 130. The motor 124 may move injection assembly 129 such that it is aligned over a column of cups 186 and so that each nozzle 130 may be aligned over each individual cup 186 during the filling process. The dissolved mixture in the common fluid line 105 may be dispensed into the cups via the nozzles 130. The controller 106 may determine which column of cups need to be filled and the order in which to fill the cups. The last column of cups to be filled may correspond to a last column of cups 186 of the tray 114, the last row including a temperature sensor 128. A temperature measured via the temperature sensor 128 may be used by the controller 106 to set a countdown timer for the shot chilling process. In another example, the countdown timer for the shot chilling process may have a pre-set duration that is not based on temperature.

In one embodiment, the chiller module 110 may be positioned below the nozzle 130 and proximate to a support base 117 at a bottom of the device 100. The chiller module 110 is coupled to the refrigeration system 116. The refrigeration system includes a refrigeration compressor 121 and a condenser 119 which provide direct cooling to the chiller module 110 through refrigerant lines integrated into the chiller module 110. The refrigeration system 116 circulates coolant through the refrigerant lines through the chiller module 110. Additionally, respective fluids from the first alcohol reservoir 120, the second alcohol reservoir 122, and the water reservoir 118 may flow through the chiller module in order to pre-chill the respective fluids, before flowing to the common fluid line 105. The chiller module 110 may be used to accelerate the speed of gelling (e.g., setting) the gelatin-based shots. In one example, the shots may be gelled (e.g., cured and solidified) within 10 minutes. In other examples, the chiller module 110 may gel the shots in a time less than or greater than 10 minutes. Further, since the chiller module 110 may be a water bath chiller, the fluid dispensed within the cups 186 may remain above a freezing point temperature, thereby preventing freezing of the shots.

In another embodiment, the chiller module 110 may not be included in the device 100. For example, a remote chiller module, similar to the chiller module 110 may be located exterior to the device 100 and not within the device 100. However, the chiller module may still be fluidly coupled to the refrigeration system located within the device 100. The constituent tray 187 may be removed from the device 100 once the gelatin-based shots have been dispensed into the cups 186 and inserted into the external chiller module in order to set the shots. For example, the remote chiller module may be positioned in close proximity (e.g., next to) the device 100 such that the liquid shots may be quickly transferred from the device 100 and into the remote chiller module.

In a further embodiment, the chiller module 110 and refrigeration system 116 may not be included in the device. Instead a refrigeration system similar to refrigeration system 116 may be included in the external chiller module. AS such, the chiller module 110, may not be fluidly coupled to any component positioned within the device 100. The constituent tray 187 may be removed from the device 100 once the gelatin-based shots have been dispensed into the cups 186 and inserted into the external chiller module in order to set the shots.

The user interface 104 may include a progress bar indicating the time remaining in the chilling and/or shot-making process. The user interface 104 may also include a light or another type of indicator that indicates when the shots are complete and ready for consumption. The user interface 104 may include additional buttons or controls for selecting shot-making parameters such as the desired number of shots and desired type of alcohol, as described further below with reference to FIGS. 21-22 and FIG. 32. Additional indicators may be present on the user interface 104 such as a "shots spoiled" indication when the shots are no longer safe for consumption. Further, various warning indications may be included on the user interface 104 to indicate degradation of system components or low levels of one or more of the fluid reservoirs (e.g., the water or alcohol reservoirs). In some embodiments, the user interface 104 may display fluid levels of each of the water and alcohol reservoirs.

The device 100 may further include a power adapter 190 and/or connector for connecting the device 100 to a power source (e.g., a wall outlet). In other embodiments, the device 100 may include a battery and be battery operating.

The device 100 may be sized to easily fit on the counter of a bar or restaurant, for example, without taking up a large amount of space. For example, in some embodiments the device 100 has a width of approximately 14 inches, a depth of approximately 18 inches, and a height of less than approximately 20 inches, although other sizes are possible. The user interface 104 may be approximately seven inches measured along a diagonal of the face of the user interface 104. In other examples, the user interface may have a diagonal measurement less than or greater than seven inches.

The controller 106 may include wireless connectivity and/or a LAN connection. As such, the controller 106 may communicate with one or more external devices (e.g., remote devices) through the wireless connection and/or the LAN connection. Thus, the controller may utilize cloud computing to both store and retrieve digital information such as user inputs and preferences, advertisements, etc. As an example, a remote computer or server may monitor the functioning of the device 100 through the wireless connection. Specifically, the remote computer may track a number of gelatin-based shots and flavors of the gelatin-based shots produced each day by the device 100. Further, the wireless connection may transfer health and functionality data from the controller 106 of the device 100 such as if there are any errors in the device 100 and whether or not the device is working properly. For example, if an error or some sort of degradation is indicated, the controller 106 of the device 100 may notify the remote computer. The device 100 may then be serviced in order to repair any degraded components of the device 100.

The controller 106 may also send and receive a variety of signals to and from various components of the device 100. For example, the controller 106 may receive signals from inputs via the user interface 104 (e.g., alcohol selection, shot type confirmation, start/stop signals, etc.), from various countdown timers, from the heater 166, from one or more temperature sensors (e.g., the temperature sensor 128), from various flow meters, etc. The controller 106 may send signals to components of the device 100 such as one or more valves or valve actuators (e.g., valve 152, valve 160, valve actuator 136, valve actuator 138), one or more pumps (e.g., pump 154, pump 174), the chiller module 110, the tray 114, the nozzle 130, the second motor 124, etc.

Additional sensors to those discussed above may be present in the device 100. For example, the water reservoir 118 and each of the alcohol reservoirs may include a fluid level sensor for determining the fluid level of the respective reservoir. Further, additional temperature and/or pressure sensors may be included to maintain the fluids at required temperatures. FIGS. 5-20 show the device 100 and its components in further detail. A description of a process for preparing the gelatin-based shots is provided below with reference to FIGS. 21-35.

FIG. 2 shows a second embodiment of the device 100 shown in FIG. 1. The device 100 of FIG. 2 may include similar components to those of FIG. 1 and thus are numbered similarly. The second embodiment shown in FIG. 2 shows the device 100 wherein the mixing chamber and the consumable cartridge are separate.

Turning to FIG. 2, the device 100 includes a device housing 102 and a user interface 104. A controller 106 within the housing 102 communicates with the user interface 104. In one example, the user interface 104 may be a touchscreen display coupled to an exterior of the housing 102. Specifically, the user interface 104 may be a graphical user interface used for the configuration, maintenance, and operation of the device 100. In one example, the user interface 104 may be coupled to a side of the exterior of the housing 102. Specifically, the user interface 104 may be positioned on a front face of the housing 102, above a slideable cup tray (e.g., tray) 114 of the device 100. In another example, the user interface 104 may be a touchscreen display on a remotely located computer, tablet, or mobile device that communicates wirelessly with the controller. In yet another example, the user interface 104 may include a series of buttons positioned on the exterior of the housing 102. In this way, the user interface 104 may be electrically coupled and/or wirelessly coupled to the controller 106.

Inside the housing 102, the device 100 includes multiple liquid reservoirs, one or more consumable cartridges 108 (e.g., containers), the controller 106, a chiller module 110, a removable and slideable cup tray 114 coupled to a tray mount 112, a mixing chamber 178, and a refrigeration system 116. Each of the liquid reservoirs, the consumable cartridges 108, and the mixing chamber 178 may be removably coupled to the housing 102. More specifically, the device 100 includes a water reservoir 118. The water reservoir 118 may include a fill port for manually filling the water reservoir 118. In one example, the fill port may be positioned at a side or top of the water reservoir 118 and proximate to a door 131 in a side of the housing 102. Additionally or alternatively, the water reservoir 118 may be directly coupled via one or more water lines to a secondary water source. In one example, the secondary water source may be a larger water reservoir external to the device 100. In another example, the secondary water source may be a standard pressurized water source such as pluming of a facility in which the device 100 is used (e.g., coupled directly to pluming of a building).

The device 100 also includes multiple alcohol reservoirs. As shown in FIG. 2, the device 100 includes a first alcohol reservoir 120, a second alcohol reservoir 122, and a third alcohol reservoir 124. Each of the three alcohol reservoirs may contain a different type of alcohol. For example, the first alcohol reservoir 120 may contain a first type of alcohol, the second alcohol reservoir 122 may include a second type of alcohol, and the third alcohol reservoir 124 may include a third type of alcohol. In alternate embodiments, the device 100 may include more or less than three alcohol reservoirs. For example, the device 100 may include two alcohol reservoirs, as shown in FIG. 2. In yet other embodiments, two or more of the alcohol reservoirs may contain the same type of alcohol.

Each of the alcohol reservoirs is covered and sealed at all openings or ports such that the alcohol within the reservoirs may not be contaminated. In one example, each of the alcohol reservoirs has a rectangular cross-section and is made of a material able to contact food products such as food grade plastic. Further, the first alcohol reservoir 120, second alcohol reservoir 122, and third alcohol reservoir 124 may be different sizes with different fluid volume capacities. For example, the first alcohol reservoir 120 may be a larger first size with a volume of approximately 72 ounces. The second alcohol reservoir 122 and the third alcohol reservoir 124 may be a smaller second size with a volume of approximately 18 ounces. In alternate embodiments, the first alcohol reservoir 120, the second alcohol reservoir 122, and the third alcohol reservoir 124 may have larger or smaller volumes based on a volume necessary to make a certain number of batches of shots. Further, in some examples, all the alcohol reservoirs may be approximately the same size with the same volume. In other examples, all the alcohol reservoirs may be different sizes with different fluid volumes. The alcohol reservoirs may be configured to receive both alcohol and non-alcoholic fluids, as well as solid consumables such as fruit, vitamins, supplement, etc.

The first alcohol reservoir 120, the second alcohol reservoir 122, and the third alcohol reservoir 124 are all removably coupled to the housing 102. In one example, the alcohol reservoirs and the housing 102 may include complementary mechanical couplers, such as brackets, which allow easy loading and removal from the housing 102. Further, the alcohol reservoirs may be moved into and out of the device 100 through a door 132 positioned in a top face (or wall) of the housing 102). Additionally, each of the alcohol reservoirs includes a valve 134 proximate to a bottom face of the alcohol reservoir. For example, the valve 134 may be coupled to the bottom face of the alcohol reservoir. In one example, when the valve 134 is compressed, the valve 134 may open and allow passage of the alcohol through the valve and out of the alcohol reservoir. The valve 134 may couple to a corresponding mechanical fitting including a valve actuator 136. The valve actuator 136 may actuate the valve 134 to open and close based on commands sent from the controller 106. Each of the first alcohol reservoir 120, the second alcohol reservoir 122, and the third alcohol reservoir 124 include a valve 134 which couples to a corresponding valve actuator 136.

As shown in FIG. 2, a consumable cartridge 108 may be positioned within the device 100. The device 100 may be configured to receive one or more consumable cartridges 108. Specifically, the consumable cartridge 108 may be removably coupled to the housing 102 through a first complementary mechanical coupler, such as a bracket and complementary mechanical part which fits within the bracket, which allows easy loading and removal of the consumable cartridge 108 from the housing 102. The first complementary mechanical coupler may include a mechanical receiving portion directly coupled to the housing 102 (e.g., bracket) and a mechanical adapter portion directly coupled to the consumable cartridge 108. In some examples, the mechanical adapter portion may be continuous with the consumable cartridge 108 (e.g., made as one piece). Further, the consumable cartridge 108 may be removably coupled to the device 100 through a second mechanical coupler including a valve actuator 138. The valve actuator 138 may be directly coupled to the housing 102 and removably coupled to a first valve 140 on a bottom of the consumable cartridge 108. As such, the consumable cartridge 108 may be removably coupled to the device 100 through the complementary connectors (e.g., first complementary mechanical coupler and valve actuator 138). The complementary connectors may be sized such that the consumable cartridge 108 snaps into and out of the device 100. The complementary connectors may allow dry ingredients to flow out of the consumable cartridge 108 when the consumable cartridge 108 is coupled to the device 100. For example, the consumable cartridge 108 may be positioned vertically higher than the mixing chamber 178 (or an inlet port to the mixing chamber 178) to allow the dry ingredients to be gravity fed into the mixing chamber 178. A user may insert (e.g., load) and remove the consumable cartridge 108 from the device 100 via a side door 142 positioned in a side wall of the housing 102 of the device 100. The side door 142 may open and close in order to allow loading and removal of the consumable cartridge 108 before and after the shot-making process. In alternate embodiments, the consumable cartridge 108 may be removably coupled to the housing 102 of the device through alternate mechanical couplers.

The consumable cartridge 108 may be a container containing dry ingredients such as gelatin powder. In one example, the consumable cartridge 108 may be a rigid container. In another example, the consumable cartridge may have a shape such as rectangular, square, or cylindrical. The consumable cartridge 108 may include the first valve 140, as described above for dispensing the dry ingredients from the consumable cartridge 108. Additionally, the consumable cartridge 108 may be single use (e.g., only used for one batch of shot).

Different consumable cartridges 108 may be sized differently and have different volumes and/or amounts of dry ingredients. For example, a first consumable cartridge 108 may have a first volume and include a first amount of dry ingredients. A second consumable cartridge 108 may have a second volume and include a second amount of dry ingredients, the second volume greater than the first volume and the second amount of dry ingredients greater than the first amount of dry ingredients. As a result, the second consumable cartridge 108 may make (e.g., yield) a larger amount of shots than the first consumable cartridge. Despite their different sizes and volumes, the first consumable cartridge and the second consumable cartridge have the same connectors (e.g., the same first valve 140 and first complementary mechanical coupler) so that both consumable cartridges 108 fit within the same respective complementary connectors (e.g., valve actuator 138, first complementary mechanical coupler) of the device 100. In this way, consumable cartridges 108 of different sizes and volumes may be used within the same device 100.

In one example, the first consumable cartridge may produce 10 gelatin-based shots. The second consumable cartridge may produce 20 gelatin-based shots. For example, the second consumable cartridge may include approximately 2.5 ounces of dry ingredients. In another example, the second consumable cartridge may include more or less than 2.5 ounces of dry ingredients. Each shot may be approximately 1.5 ounces (e.g., fluid ounces). In alternate embodiments, the consumable cartridges may have different volumes producing a different number of shots (e.g., different than 10 or 20). The dry ingredients may then be scaled accordingly for the desired number of shots. In this way, any number of shots may be possible as long as there are enough cup positions in the tray 114. However, 10 or 20 shots may be the number of shots allowed for the tray 114 and device 100 size described below. For example, as described below, the tray 114 may include 20 receptacles (e.g., slots) for receiving 20 cups. Thus, no more than 20 shots may be made per batch. In alternate embodiments, if the size of these components (e.g., the tray 114) were altered, more or less shots may be made with the device 100.

Each consumable cartridge 108 includes an electronic indicator, identifier tag, or other electronic label (e.g., microchip) readable by the controller 106. Specifically, the first valve 140 and/or the mechanical adapter portion of the consumable cartridge 108 may include an electronic identifier tag. In one example, upon inserting the consumable cartridge (e.g., snapping) into the complementary mechanical connectors (e.g., mechanical coupler including valve actuator 138 and mechanical receiving portion) of the device 100, a sensor on one or both of the complementary mechanical connectors (e.g., couplers) may read the electronic identifier tag. In another example, a sensor on the exterior of the device 100 may read and identify the electronic identifier tag of the consumable cartridge before the consumable cartridge is inserted into the device 100. The consumable data contained within the electronic identifier tag may then be transferred to the controller 106. In one example, consumable data may include one or more of a number of shots to be made from the consumable cartridge 108, a flavor of contents (e.g., dry ingredients) within the consumable cartridge 108, an expiration date of the contents within the consumable cartridge 108, a manufacturing data of the consumable cartridge 108, and/or a manufacturer of the consumable cartridge 108. In this way, only consumable cartridges 108 manufactured by a specific manufacturer may be used with the device 100. If a consumable cartridge 108 made by an unknown manufacturer is installed in the device 100, the device 100 may not execute the shot-making routine. In other words, the device 100 may only operate with a consumable cartridge 108 from a known and verified manufacturer, as indicated through the electronic identifier tag.

The device 100 further includes a mixing chamber 178. In one example, the mixing chamber is a hollow cylinder including a mixing blade 179. In another example, the mixing chamber 178 is bullet shaped with an internal mixing blade 179. The mixing blade 179 is configured to mix contents of the mixing chamber 178 such that dry ingredients within the mixing chamber 178 dissolve completely in a threshold amount of time. In one example, the threshold amount of time may be 15 seconds. In another example, the threshold amount of time may be less than or greater than 15 seconds. The bullet shaped mixing chamber 178 may increase mixing, thereby allowing the dry ingredients to dissolve more quickly in liquid (e.g., warmer water) injected into the mixing chamber 178. In one example, the mixing blade 179 may include a series of paddles mounted on a central shaft, the central shaft rotated by a gear motor in order to mix ingredients within the mixing chamber 178. In this way, the mixing blade 179 is rotatable about a central axis of the mixing chamber 178. In another example, the mixing blade 179 includes a series of curved, propeller-shaped blades rotatable about a central shaft coupled to either a top or a bottom of the mixing chamber 178. Further, the mixing blade 179 may be positioned at the bottom of the mixing chamber 178, and the dry ingredients and liquid may enter the mixing chamber 178 through an opening in the top of the mixing chamber 178. In another embodiment, the mixing blade 179 may be positioned at the top of the mixing chamber 178, and the dry ingredients and liquid may enter the mixing chamber 178 through an opening at the bottom of the mixing chamber 178.

The mixing chamber 178 is removably coupled to the housing 102 of the device. In this way, the mixing chamber 178 may be removed from the device 102 for cleaning. Additionally, consumable products such as fruit, vitamins, and supplements may be directly added to the mixing chamber 178 during the shot-making process. The mixing chamber 178 may be made out of a material that is dishwasher safe, such as stainless steel. Additionally, a cleaning cycle may be run in between each mixing event (e.g., after mixing the ingredients for a batch of shots). For example, hot water may be pumped into the mixing chamber 178 in order to rinse the chamber and flush out any remaining gelatin mixture. In this way, the cleaning cycle may allow multiple batches of shots to be made without removing the mixing chamber 178 from the device 100 for cleaning.

The mixing chamber 178 is configured to receive the dry ingredients from the consumable cartridge 108 and liquid from one or more of the water reservoir 118, the first alcohol reservoir 120, the second alcohol reservoir 122, and/or the third alcohol reservoir 124. The mixing chamber 178 includes a fluid input port 144 and a dry input port 146. The dry input port 146 is coupled to the consumable cartridge 108 through a dry ingredients line 145. In one embodiment, the dry input port 146 includes a valve that opens to allow dry ingredients to pass into the mixing chamber 178. In another embodiment, the first valve 140 and the valve actuator 138 of the consumable cartridge 108 may be directly coupled to the dry input port 146 with nothing in between (e.g., no dry ingredients line 145). The fluid input port 144 is coupled to one or more fluid lines from the liquid reservoirs, as described further below. Thus, the fluid input port 144 allows liquids to flow into the mixing chamber 178. In one embodiment, the fluid input port 144 may include a valve which opens to allow liquid into the chamber and then closes during mixing to reduce fluid leakage from the mixing chamber 178. In alternate embodiments, the mixing chamber 178 may include more or less than two input ports. For example, the mixing chamber 178 may include one input port for each liquid and each dry ingredient (e.g., one port for each alcohol, one port for water, and one port for dry ingredients). In another embodiment, the mixing chamber 178 may include only one input port for all the liquid and dry ingredients.

A first water line 150 is coupled between the water reservoir 118 and the mixing chamber 178. The first water line 150 may be a cooler water line with unheated water passing through the first water line 150 and to the consumable cartridge 108. The first water line 150 includes a first valve 152, a first pump 154, and a first flow meter 156. The first valve 152 and/or the first pump 154 may be used to meter a certain volume of water into the mixing chamber 178. The first flow meter 156 may track the amount of water passing through the first water line 150 and into the mixing chamber 178 and cause the first valve 152 to close once the required volume of water has been metered to the mixing chamber 178. A second water line 158 is also coupled between the water reservoir 118 and the mixing chamber 178. Similarly to the first water line 150, the second water line 158 includes a second valve 160, a second pump 162, and a second flow meter 164. Additionally, the second water line 158 includes a heater 166. The heater 166 may heat the water to a threshold temperature. As such, the second water line 158 may be a heated water line. The threshold temperature may be a temperature that causes the dry ingredients within the mixing chamber 178 to dissolve. In one example, the threshold temperature may be approximately 212° F. In another example, the threshold may be smaller or greater than 212° F.

Figure 10:
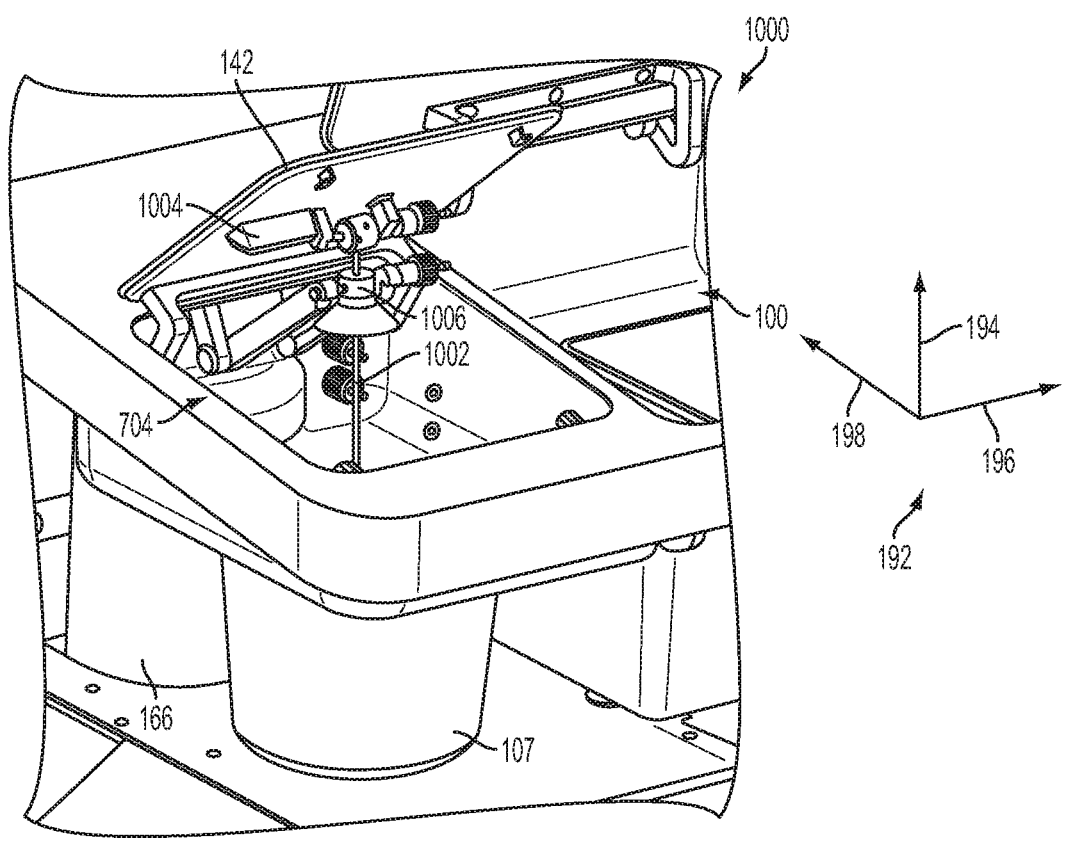

In another embodiment, only one water line may be coupled to the water reservoir 118. As such, the one water line may be a common water line. The common water line may include one pump (e.g., first pump 154), one flow meter (e.g., first flow meter 156), and one valve (e.g., first valve 152). The one valve may be a three-way valve that directs water from the water reservoir 118 to either a cooler water line or a heated water line. Both the cooler water line and the heated water line may be separately coupled to the mixing chamber 178. The heated water line may include the heater 166 in order to heat the water to the threshold temperature. The heater 166 may be an in-line heater, as shown in FIG. 10, described further below.

Additional fluid lines may include a first alcohol line 168 coupled between the first alcohol reservoir 120 and the mixing chamber 178, a second alcohol line 170 coupled between the second alcohol reservoir 122 and the mixing chamber 178, and a third alcohol line 172 coupled between the third alcohol reservoir 124 and the mixing chamber 178. Each of the first alcohol line 168, the second alcohol line 170, and the third alcohol line 172 include a valve actuator 136, a pump 174, and a flow meter 176. The valve actuator 136, the pump 174, and the flow meter 176 may control the amount (e.g., volume) of alcohol metered into the mixing chamber 178.

After adding all the required dry ingredients and fluids to the mixing chamber 178, the fluids may be mixed with the dry ingredients with the mixing blade 179. Mixing may occur for a duration until all the fluid and dry ingredients are fully mixed and ready to be injected into the cups. The mixed liquid gelatin mixture may exit the mixing chamber 178 and enter an injection line 180. A valve actuator 181 may open a valve 183 when injection is ready to occur. The injection line 180 is coupled to a nozzle 130 which injects fluid (e.g., the liquid gelatin mixture) into cups positioned within the tray 114 (below the nozzle). The nozzle 130 may include an opening which opens and closes to fill each cup with a certain volume of fluid. The volume of fluid (e.g., approximately 1.5 ounces) may be monitored and controlled by a flow meter 182.

The device 100 includes the tray 114 coupled to the tray mount 112. The tray mount 112 is built into the housing 102 and may slide vertically (with respect to a surface on which the device 100 sits) along a series of bars 111 in order to move into and out of the chiller module 110. The series of bars 111 may be coupled to a support base 117, the support base 117 positioned at and coupled to a bottom of the housing 102. The tray 114 is slidable into and out of the device 100. Specifically, tray 114 slides along a groove in the tray mount 112. For example, a user may slide the tray 114 out from the inside of the device 100, thereby revealing cup slots to the user. The user may then load fluid vessels, such as cups, into the tray 114. The tray 114 includes a number of slots for receiving the cups. Thus, the slots may be sized similarly to the cups such that one cup fits within each slot. The slots may be color-coded and correspond to a 10 or 20 shot batch. For example, the slots corresponding to positions for a 10 shot batch may be colored one color while the remaining (e.g., unused) slots are colored a different color. As a result, the user may be given instructions to position 10 cups in the appropriately colored slots. When making a full batch of 20 shots, all cups may be positioned within all of the slots. After loading the required number of cups, the user may close the door and move the tray 114 back inside of the device 100 and underneath the nozzle 130.

In an alternate embodiment, the cups may be automatically loaded into the tray 114 instead of being manually loaded by the user. For example, as shown in FIG. 2, the device 100 may include a cup receptacle 184. The cup receptacle 184 may hold a plurality of cups 186. The device may automatically drop and load the cups 186 from the cup receptacle and into the required slots (based on 10 or 20 shot selection) of the tray 114.

As described above, the cups 186 may be sized to fit within slots of the tray 114. In one example, the cups and corresponding tray slots may have an oval cross-section with a first diameter in a range of approximately 42-46 mm and a second diameter in a range of approximately 47-51 mm, the first diameter perpendicular to the second diameter. The diameters of the cups may be slightly smaller than the diameters of the carousel slots so that the cups may be easily removed from the slots. In alternate embodiments, the cups and corresponding carousel slots may have a different cross-section (e.g., circular or square) with a different size. For example, the cross-section of the cups may be circular.

As introduced above, the tray 114 is positioned vertically below the nozzle 130 and the consumable cartridge 108. Additionally, the nozzle 130 may be coupled to an x-y motion control assembly. The x-y motion control assembly may translate the nozzle 130 horizontally and laterally (in two dimensions, perpendicular to the vertical direction). For example, FIG. 2 shows an axis system 192 including a vertical axis 194, a horizontal axis 196, and a lateral axis 198. The x-y motion control assembly may translate horizontally with respect to the horizontal axis 196 and laterally with respect to the lateral axis 198. The controller 106 may adjust the x-y motion control assembly via an actuator included in the assembly. As such, the controller 106 may actuate the x-y motion control assembly to translate the nozzle 130 to a desired position. The x-y motion control assembly may move the nozzle over each individual cup during the filling process. The controller 106 may determine which cups need to be filled and the order in which to fill the cups. The last cup to be filled may correspond to a last slot of the tray 114, the last slot including a temperature sensor 128. A temperature measured via the temperature sensor 128 may be used by the controller 106 to set a countdown timer for the shot chilling process. The tray 114 is slideable along and removable from the tray mount 112. Additionally, as described above the tray 114 and the tray mount 112 are movable together in the vertical direction (with respect to the vertical axis 194). Specifically, the tray 114 may be lowered from a first, higher position proximate to the door and above a chiller module 110 of the device 110 and to a second, lower position within the chiller module 110.

The chiller module 110 is positioned below the door and nozzle 130 and proximate to the support base 117 at a bottom of the device 100. The chiller module 110 is coupled to the refrigeration system 116. The refrigeration system includes a refrigeration compressor which provides direct cooling to the chiller module 110 through refrigerant lines integrated into the chiller module 110. The refrigeration system 116 circulates coolant through the refrigerant lines through the chiller module 110. The refrigeration system 116 may also circulates chilled coolant to the alcohol reservoirs. Specifically, the refrigeration system 116 may circulate chilled coolant through chilling evaporators coupled to the alcohol reservoirs. The chiller module 110 may be used to accelerate the speed of gelling (e.g., setting) the gelatin-based shots. In one example, the shots may be gelled (e.g., cured and solidified) within 10 minutes. In other examples, the chiller module 110 may gel the shots in a time less than or greater than 10 minutes.

The user interface 104 may include a progress bar indicating the time remaining in the chilling and/or shot-making process. The user interface 104 may also include a light or another type of indicator that indicates when the shots are complete and ready for consumption. After the shots finish gelling, the tray 114 rises vertically out of the chiller module 110 and back in front of the door. The user interface 104 may include additional buttons or controls for selecting shot-making parameters such as the desired number of shots and desired type of alcohol. Additional indicators may be present on the user interface 104 such as a "shots spoiled" indication when the shots are no longer safe for consumption. Further, various warning indications may be included on the user interface 104 to indicate degradation of system components or low levels of one or more of the fluid reservoirs (e.g., the water or alcohol reservoirs). In some embodiments, the user interface 104 may display fluid levels of each of the water and alcohol reservoirs.

The device 100 may further include a power adapter 190 and/or connector for connecting the device 100 to a power source (e.g., a wall outlet). In other embodiments, the device 100 may include a battery and be battery operating.

The device 100 may be sized to easily fit on the counter of a bar or restaurant, for example, without taking up a large amount of space. For example, in some embodiments the device 100 has a width of approximately 14 inches, a depth of approximately 18 inches, and a height of less than approximately 20 inches, although other sizes are possible. The user interface 104 may be approximately seven inches measured along a diagonal of the face of the user interface 104. In other examples, the user interface may have a diagonal measurement less than or greater than seven inches.

The controller 106 may include wireless connectivity and/or a LAN connection. As such, the controller 106 may communicate with one or more external devices (e.g., remote devices) through the wireless connection and/or the LAN connection. For example, a remote computer or server may monitor the functioning of the device 100 through the wireless connection. Specifically, the remote computer may track a number of gelatin-based shots and flavors of the gelatin-based shots produced each day by the device 100. Further, the wireless connection may transfer health and functionality data from the controller 106 of the device 100 such as if there are any errors in the device 100 and whether or not the device is working properly. For example, if an error or some sort of degradation is indicated, the controller 106 of the device 100 may notify the remote computer. The device 100 may then be serviced in order to repair any degraded components of the device 100.

The controller 106 may also send and receive a variety of signals to and from various components of the device 100. For example, the controller 106 may receive signals from inputs via the user interface 104 (e.g., alcohol selection, number of shots confirmation, start/stop signals, etc.), from a countdown timer, from the heater 126, from one or more temperature sensors (e.g., the temperature sensor 128), from various flow meters, etc. The controller 106 may send signals to components of the device 100 such as one or more valves or valve actuators (e.g., valve 152, valve 160, valve actuator 136, valve actuator 138), one or more pumps (e.g., pump 154, pump 174), the chiller module 110, the tray 114, the nozzle 130, the x-y motion control system, the mixing chamber 178, the mixing blade 179, etc.

Additional sensors to those discussed above may be present in the device 100. For example, the water reservoir 118 and each of the alcohol reservoirs may include a fluid level sensor for determining the fluid level of the respective reservoir. Further, additional temperature and/or pressure sensors may be included to maintain the fluids at required temperatures.

Turning now to FIGS. 3A-3L, schematics of the device 100 (e.g., device 100 shown in FIG. 1) shows both electrical and fluidic connections between components of the device 100. In the description of FIGS. 3A-3L herein, only the fluidic connections may be described. Additionally any components referred to as 'coupled to one another' may be fluidly coupled to one another such that fluid may pass between the coupled components. In FIGS. 3A-3L, solid lines may represent pipes or tubes, showing fluidic connections between components of the device 100. As such, components of the device with solid lines connecting them are fluidly coupled to one another. Dotted lines, may represent electrical connections between components of the device 100. As such, components of the device 100 connected to one another by dotted lines may be electrically coupled to one another. Further, as shown in FIGS. 3A-3L, water may flow through fluid lines 150, 158, and 382. Coolant (e.g., refrigerant) may flow through fluid lines 384. Mixed fluid (e.g., liquid gelatin mixture) may flow through lines 105, 148, and 105. Alcohol may flow through lines 168, 170, 388, and 390. Additionally, the dashed lines of FIGS. 3A-3L show electrical connections between the controller 106, user interface 104, and additional electrical components (e.g., actuators and sensors) of device 100. As such, dashed lines between the controller 106 and another component may represent electrical communication between those components. Any components shown coupled to one another via the above described fluid lines in FIGS. 3A-3L are fluidly coupled to one another such that fluid may pass between the coupled components.

A water pressure regulator 302 may regulate the amount of water flowing to the heater 166 and the water reservoir 118. The heater is coupled to the pod acceptor 107 via the pump 162. In one example, pump 162 may be a peristaltic pump. The cold first water reservoir 118 is fluidly coupled to the chiller module 110. Both the first and second alcohol reservoirs, 120 and 122, respectively, are coupled to the chiller module 110 as well. Further, the heater 166, water reservoir 118, and a waste drain 303 may include point level sensors 315, 317, and 313, respectively, for measuring an amount of liquid in each. First alcohol reservoir 120 (e.g., primary alcohol reservoir) and second alcohol reservoir 122 (e.g., secondary alcohol reservoir) may include analog level sensors 319 and 321, respectively, to measure an amount of liquid in each reservoir. As one example, level sensors 319 and 321 may be hall effect sensors that read a position of a floating magnet in the respective alcohol reservoirs. Circulation pumps 1402, as shown and described in greater detail in FIG. 14, may include: pump 307, pump 309, pump 311, and pump 312. As such, pump 307 may recirculate fluid from a secondary compartment 362 of the first alcohol reservoir 120 to the chiller module 110, and back to a primary compartment 364 of the first alcohol reservoir 120. Similarly, pump 309 may recirculate fluid from a secondary compartment 366 of the second alcohol reservoir 122 to the chiller module 110, and back to a primary compartment 368 of the second alcohol reservoir 122. Pump 311 may recirculate fluid between the cold water reservoir 118 and the chiller module 110.

The consumable cartridge 108, water reservoir 118, and alcohol reservoirs are coupled to four way valves 351 via pumps 162, 176, and 154 respectively, and the valves 351 are coupled to the nozzles 130 of the injection assembly. As one example, pumps 162, 176, and 154 may be peristaltic pumps. Thus, each of the four-way valves 351 may receive fluid from each of: one or more of the alcohol reservoirs, the cold water reservoir 118, and the consumable cartridge 108. The compressor 119 and condenser 121 are coupled to the chiller module 110 to provide coolant to the chiller module 110. The device 100 may also include a plurality of three-way valves: valve 325, valve 327, valves 329, valve 331, valve 333, valve 335, valve 337, valve 339, valve 341, and valve 343. The three-way valves may be capable of directing fluid to three separate components of the device 100 (e.g., components connected to the fluid lines coupled to each three-way valve). One-way check valves 408 shown and described further below with reference to FIGS. 4A-4B, may ensure the unidirectional flow of fluid and may include: valves 160, valves 167, valves 136, valve 347, and valve 348. Thus, water entering the device 100 (e.g., from an external water source) may flow to either the heater 166, or the cold water reservoir 118. After being heated by the heater 166, water may recirculate back to the heater 166, or may flow to the consumable cartridge 108 via pump 162. The fluid mixture exiting the consumable cartridge 108 may then flow through the four-way valves 351 to the nozzles 130. Fluid from the cold water reservoir 118 may flow through the chiller module 110 and back to the cold water reservoir 118 before flowing through pump 154 and four-way valves 351 to the nozzles 130. Fluid (e.g. alcohol) from the primary compartments of the alcohol reservoirs may flow through pumps 176 and four-way valves 351, to the nozzles 130.

Additionally, the alcohol reservoirs may each include actuable 3-way valves 391 and 393, which may be adjustable to regulate fluid flow in a desired direction. As such, the actuable a-way valves 391 and 393 may regulate the flow of liquid out of the secondary compartments of the two alcohol reservoirs to the chiller module 110, and to the primary compartments of both the alcohol reservoirs after being recirculated through the chiller module 110. Additionally, the actuable 3-way valves may ensure that only fluid from the primary compartments of the alcohol reservoirs flows to pumps 176.

Device 100 may further include temperature sensors including: temperature sensor 170, temperature sensor 172, temperature sensor 174, temperature sensor 176, and temperature sensor 178 for measuring the temperature of the fluid in contact with the sensors. Specifically, sensors 176 and 178 may measure the temperature of the fluid exiting the primary compartments of the first alcohol reservoir 120 and second alcohol reservoir, respectively. Sensor 174 may measure the temperature of the fluid exiting the cold water reservoir 118, sensor 172 may measure the temperature of the fluid in the heater 166, and sensor 170 may measure the temperature of the interior of the chiller module 110.

Additional components shown in FIGS. 3A-3L and not described herein may be included in the device 100. As described above, components shown connected by a specific fluid line may be fluidly coupled to one another such that fluid may transfer between the coupled components. Various pumps and valves may control and adjust the flow of fluid between fluidly coupled components. Further still, the controller 106 may actuate the pumps, valves, and injection assembly shown in FIGS. 3A-3L according to various control routines, such as the control routines shown in FIGS. 21-35, described further below. Additionally, the controller 106 may receive signals from the sensors shown in FIGS. 3A-3L (e.g., temperature and level sensors).

Figure 4A:
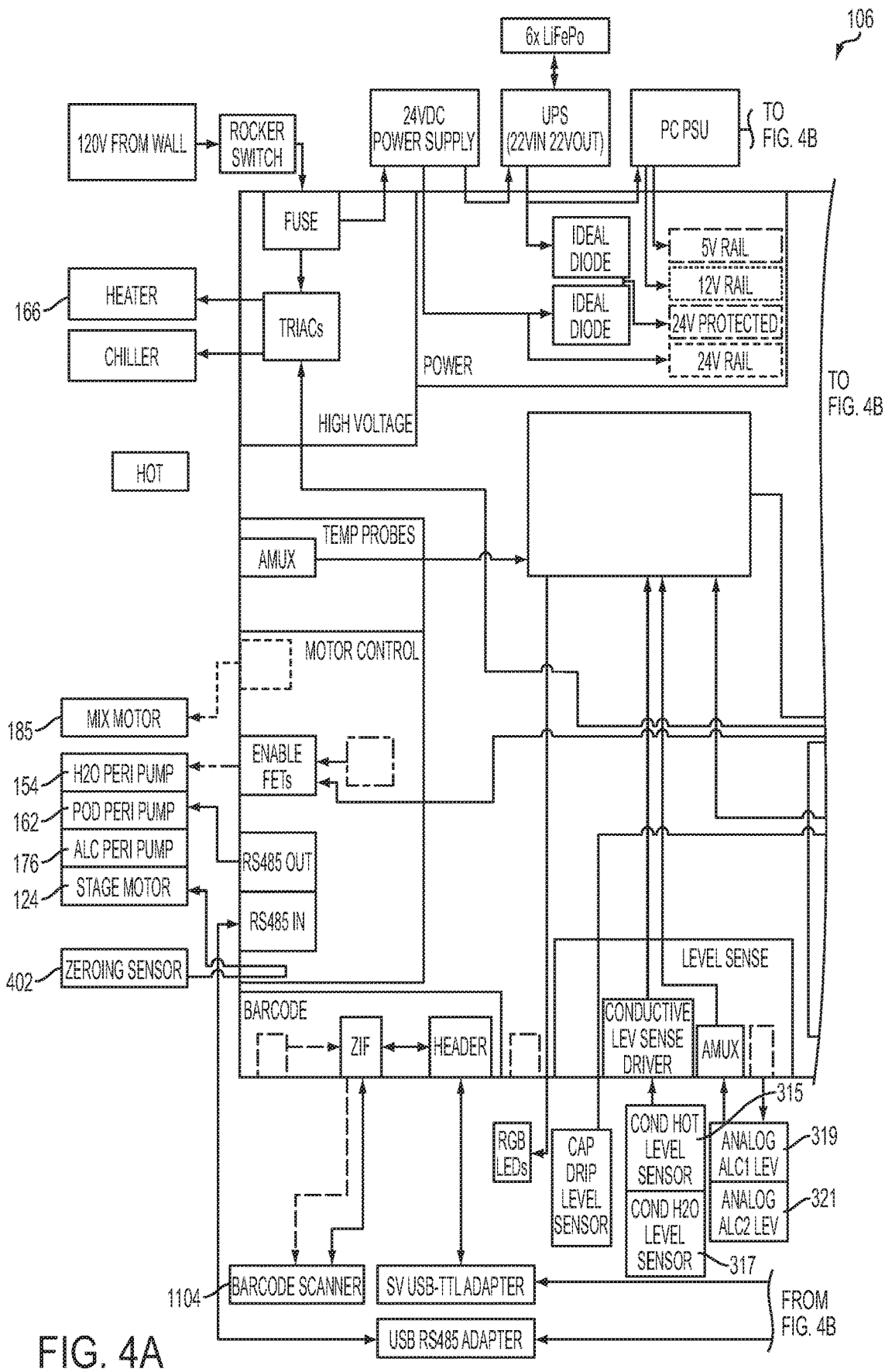
FIGS. 4A-4B show schematics of the electrical connections and components of the device of FIG. 1.
Figure 4B:
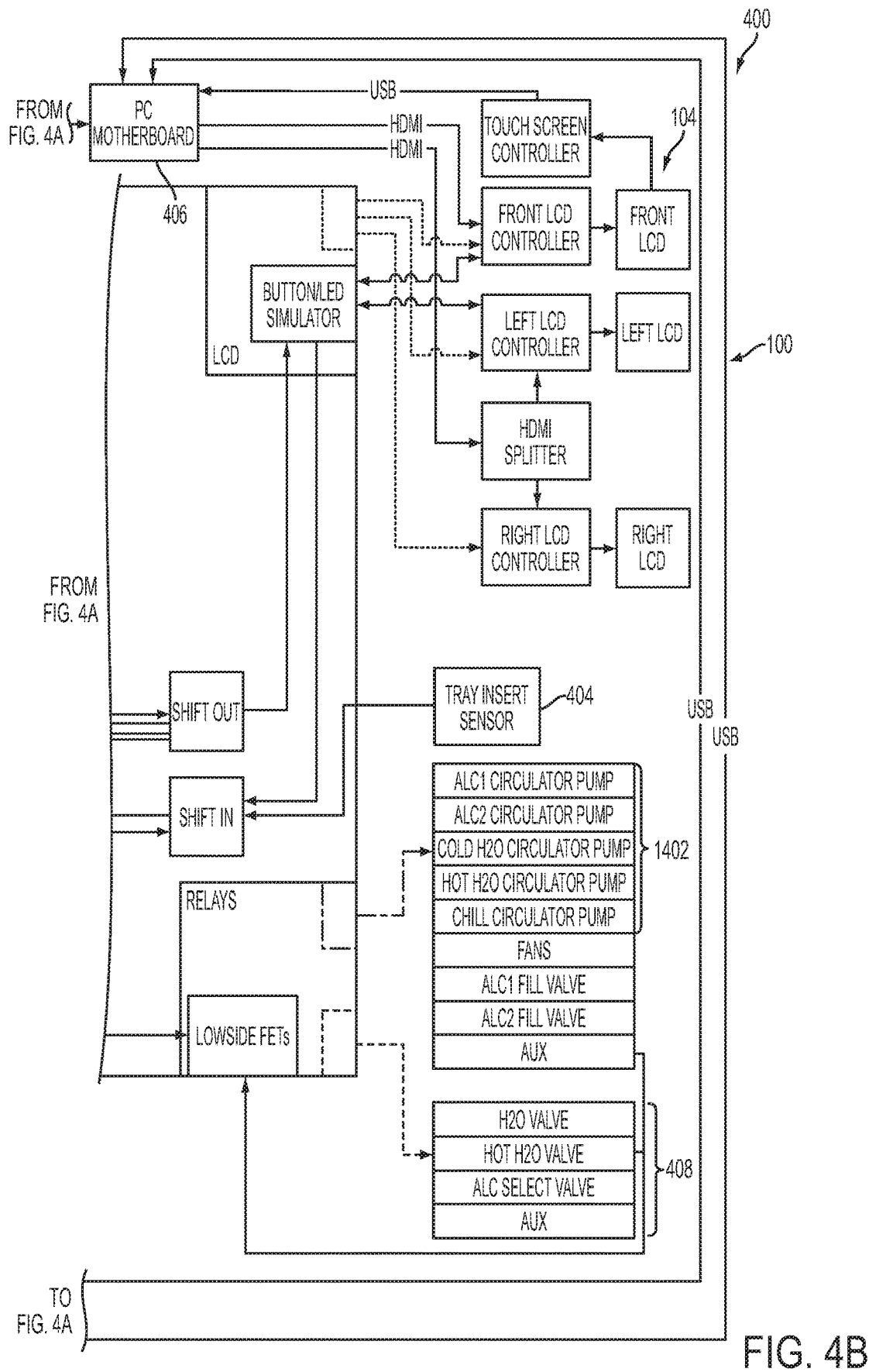

Turning now to FIGS. 4A-4B, electrical connections between components of the device 100 are shown. Any lines drawn between components shown in FIGS. 4A-4B represent electrical connections between the components, and as such the components may be in electrical communication with one another. Specifically, FIGS. 4A-4B shows how the various components of the device 100 may be electrically coupled to the controller 106. For example, the heater 166, motor 185, motor 124, pumps 154, pump 162, pump 176, and recirculation pumps 1402 may all be coupled to the controller 106. The controller 106 may include a motherboard 406. Further, the controller 106 may be adapted to receive signals from a plurality of sensors of the device shown in FIGS. 4A-4B, receive user inputs via the user interface 104, and send signals to a plurality of actuators shown in FIGS. 4A-4B of the device according to instructions stored on a memory of the controller and the received signals and user inputs. The sensors may include: sensor 315, sensor 317, sensor 319, sensor 321, zeroing sensor 402, and tray insert sensor 404 (e.g., detecting when the constituent tray 187 is inserted into the drawer 109 of the tray 114. Based on the feedback from the plurality of sensors, the controller 106 may send signals to actuators including: first motor 185, pump 154, circulation pumps 1402, etc. Additionally, the controller 106 may adjust the amount and direction of the flow of fluid between components of the device 100 by adjusting the positions of one-way check valves 408. Device 100 may include additional electrical connections not described above with regard to FIGS. 4A-4B. Any components that may send and/or receive signals from the controller 106 are electrically coupled to the controller 106 (and thus communicate with the controller 106).

Turning now to FIGS. 5-20, schematics of the device 100 for preparing the gelatin-based product are shown. Specifically, FIGS. 5-20 show three-dimensional schematics of the device 100 shown in FIGS. 1-4. FIGS. 5-20 show the relative sizes and positions of the components within the device 100. As such, the components of the device 100 shown in FIGS. 5-20 may be the same as the components shown in FIGS. 1-4. Thus, the components of the device 100 described above with regard to FIGS. 1-4 may not be described in detail again below.

FIGS. 5-20 include the same axis system 192 shown in FIGS. 1-2, the axis system 192 including the vertical axis 194, the horizontal axis 196, and the lateral axis 198. Further, FIGS. 8-20 are internal views (e.g., sectional views) of the device 100 showing the internal components within walls of the device 100, the walls forming the housing 102 of the device 100. The axis system 192 may aid in showing the relative positioning of components of the device 100 to one another. For example, components shown vertically above or below one another relative to the vertical axis 194 may be positioned vertically above or below one another within the device 100. Further, components described as or shown as being positioned in front of or behind another component relative to the lateral axis 198 may be positioned in front or behind the other component within the device 100. Thus, as used below, "above or below" may be relative to the vertical axis 194, "front or behind" may be relative to the lateral axis 198, and "right or left" may be relative to the horizontal axis 196. Similarly components showing adjacent to one another may be positioned adjacent to one another. Further still, components shown coupled to one another in FIGS. 5-20 may be physically coupled to one another. Further, if components are shown directly coupled to one another then they are directly coupled to one another without any intervening components separating the two coupled components.

The device 100, as shown in FIGS. 5-20, may comprise six or more walls, each of the walls including an interior face (proximate to the interior components) and an exterior (or outside) face, the exterior face visible to a user. The device 100 may comprise a front wall 502 with a front exterior face opposite from a back wall 608. Further, the device 100 may comprise a first side wall 506 opposite from a second side wall 606, and a top wall (e.g., top face or surface) 510 opposite from a bottom wall (e.g., bottom face or surface) 508. In another example, the bottom wall 508 may comprise multiple components.

FIG. 5 shows a first isometric schematic 500 of the device 100. The user interface 104 may be positioned on the front wall 502 of the housing 102 above the slideable tray 114. The slideable tray may slide into and out of the interior of the device 100 via the drawer 109. A first side display 501 may be positioned near the same vertical position as the user display 104, on the first side wall 506 of the housing. The side display 501 may display images of various alcohols and/or various advertisements loaded onto the controller of the device 100. Additionally, the side display 501 may display a variety of advertisements stored remotely via a wireless connection and/or through cloud computing. Doors 132 and 142 may be positioned on the top wall 510 of the device 100 more proximate the front wall 502 than the back wall 608 shown in FIG. 6. Door 132 may be positioned closer to the first side 506 than door 142. Both doors may open and close, and may be flush with the top wall 510 of the housing 102 when closed. As shown in FIG. 5, the doors are open.

Figure 6:
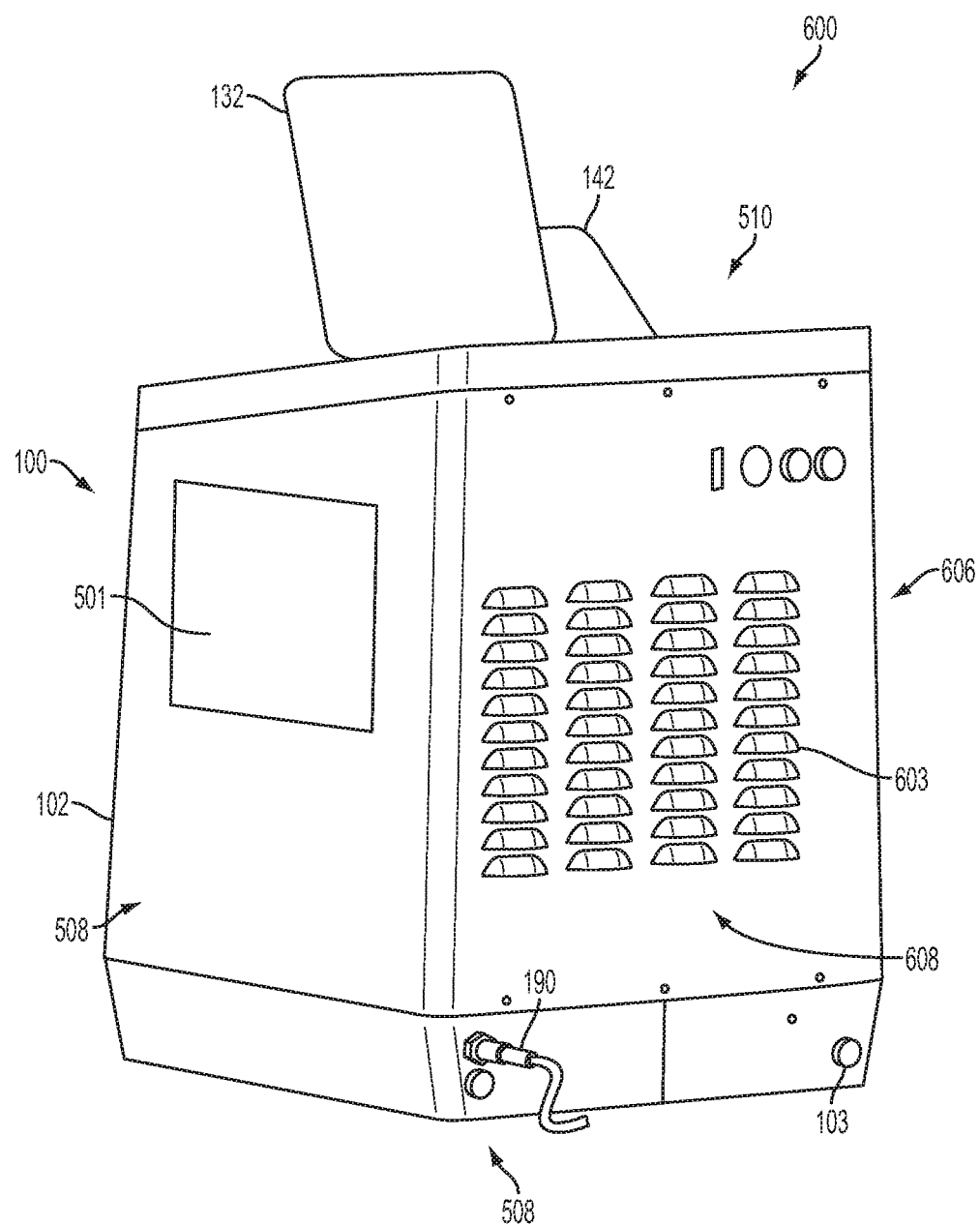
Figure 6:
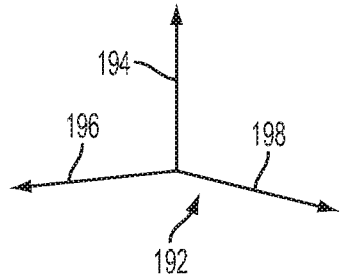

FIG. 6 shows a second isometric schematic 600 of the device 100. A plurality of air inlets 603 may be included on the back wall 608 of the housing 102 to allow air to flow between the external environment and the interior of the device 100 (e.g., for cooling purposes). The power adapter 190 and water inlet port 103 may be coupled to back wall 608 of the housing 102 proximate the bottom wall 508 of the housing 102, below the air inlets 603. The power adapter 190 may be positioned closer to the first side wall 506 than to the second side wall 606. The water port inlet 103 may be positioned closer to the second side wall 606 than to the first side wall 506. Additionally, a second side display (not shown) may be nearly identical to the first side display 501 and may be positioned on the second side wall 606 in relatively the same position on the second side wall 606 as the first side display 501 on the first side wall 506.

Figure 7:
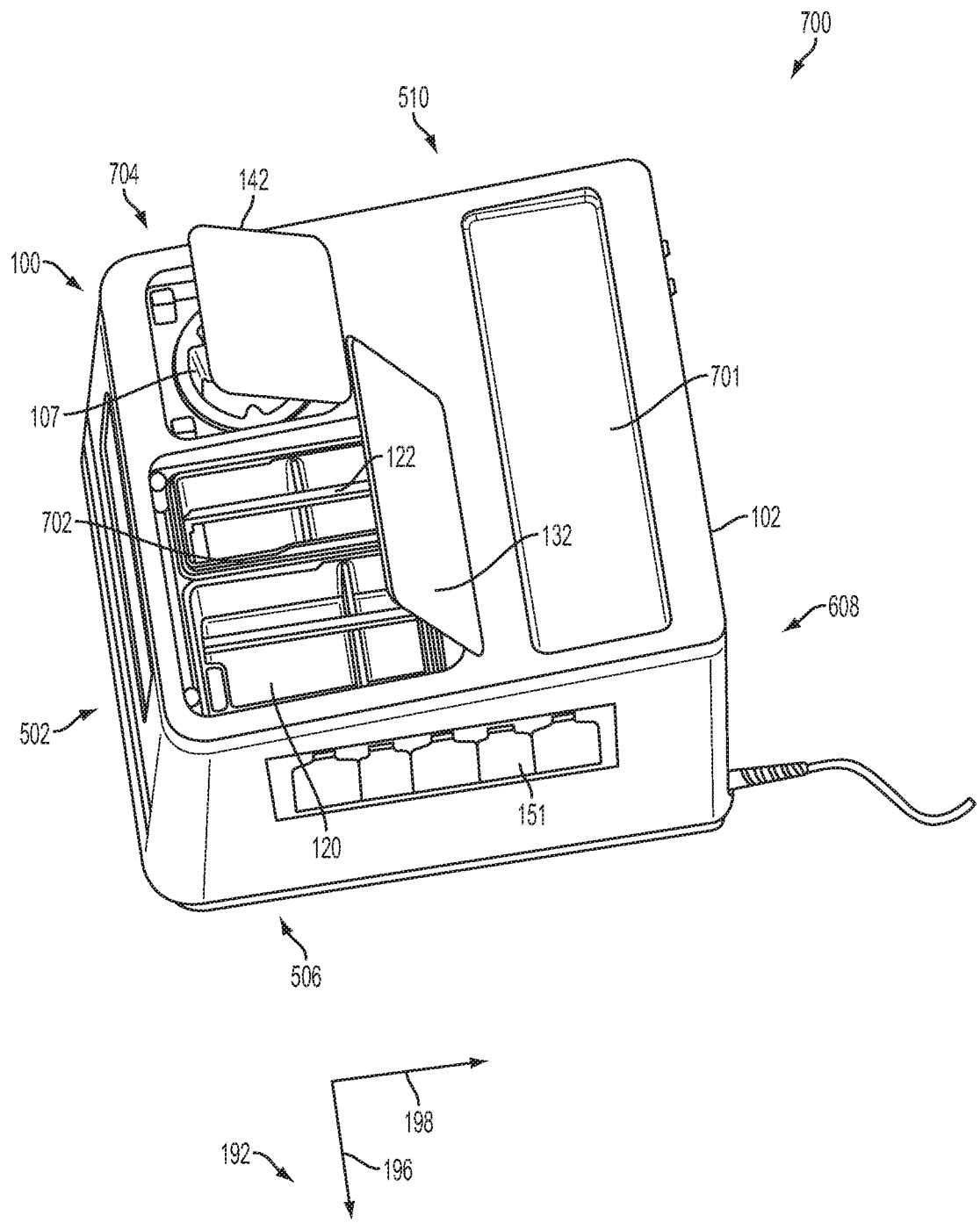

FIG. 7 shows a third isometric schematic 700 of the device 100. A recess 701 in the top wall 510 of the housing 102 may be sized to fit bottles containing alcohol or other fluids. The recess 701 may be positioned behind doors 132 and 142, and closer to the back wall 608 than to the front wall 502. First alcohol reservoir 120 and second alcohol reservoir may be positioned directly beneath door 132. First alcohol reservoir 120 may be positioned more proximate to the first side wall 506 than the second alcohol reservoir 122. Further the alcohol reservoirs may be physically separated by a barrier 702. A pod receptacle 704 which may include the pod receptacle door 142, and pod acceptor 107 may be positioned next to the alcohol reservoirs in the top wall 510. The pod acceptor 107 may be positioned directly and vertically below the pod receptacle door 142.

Figure 8:
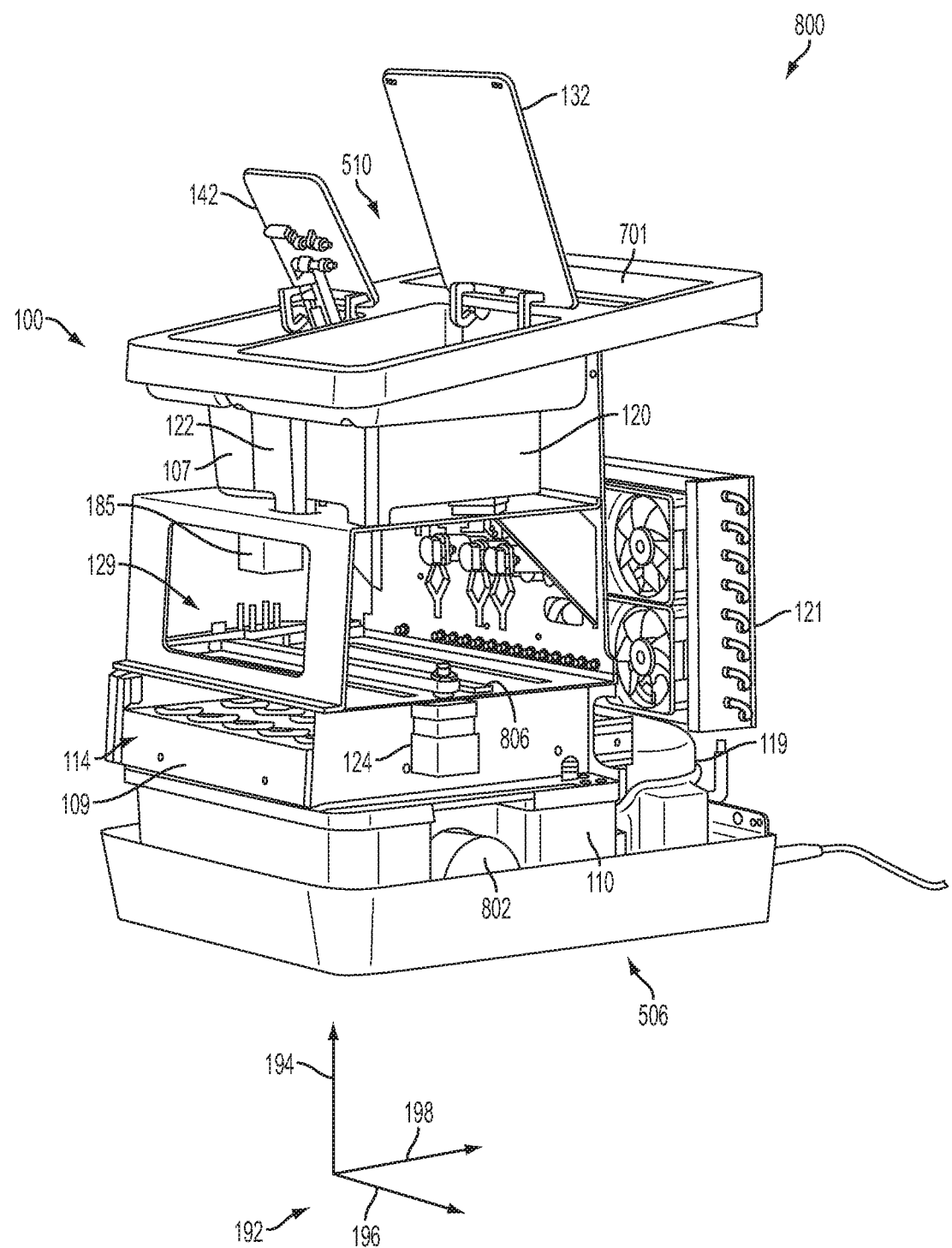

FIG. 8 shows a fourth isometric schematic 800 of the device 100. The first motor 185 may be positioned below the pod acceptor 107 which may extend from the top wall 510 into the interior of the device 100. The pod acceptor 107 may be rotatable in two directions by the motor 185 along its center axis which extends along the vertical axis 194. Further, both of the alcohol reservoirs 120 and 122 may extend from the top wall 510 into the interior of the device 100. The injection assembly 129 may be positioned beneath first motor 185 and the alcohol reservoirs. The injection assembly 129 may be directly coupled to a rod (e.g., track) 806 that extends laterally across the device, along the span of the tray. Further, the second motor 124 may move the injection assembly 129 along the rod 806. Motor 124 may be positioned directly vertically beneath rod 806, and may be coupled to the side of the tray 114 most proximate to the first side wall 506 of the device 100. The tray 114, which may include the drawer 109, may be positioned directly vertically beneath the rod 806, but vertically above the chiller module 110. Specifically, the slideable tray 114 may be laterally movable into and out of an interior of the device 100 and is positioned directly vertically above a chiller module 110 when positioned fully inside the device 100 (e.g., drawer 109 may be closed). The chiller module 110 may include a pump 802 for circulating water through and within the chiller module. The pump 802 may positioned on the side of the chiller module 110 most proximate to the first side wall 506 of the device 100. The condenser 121 may be positioned vertically beneath the recess 701, behind the tray 114. The compressor 119 may be positioned directly vertically beneath the condenser 121.

Figure 9:
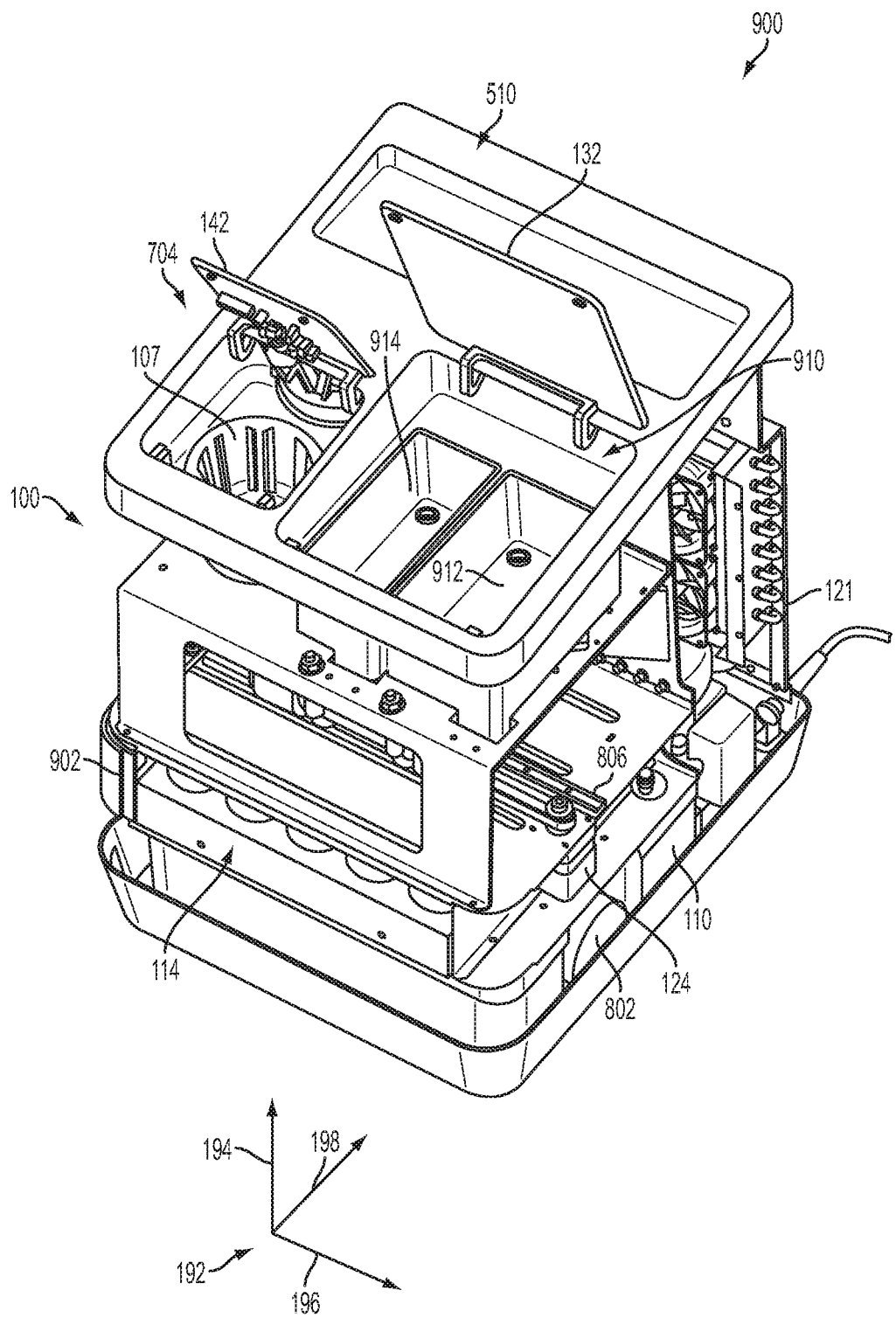

FIG. 9 shows a fifth isometric schematic 900 of the device 100. A slideable waste drawer 902 (may also be referred to as the drain of the device 100) may be positioned next to tray 114 and opposite the side where the second motor 124 is coupled. The slideable waste drawer 902 may include an internal cavity, and the waste drawer may be laterally movable into and out of the interior of the device 100. The internal cavity of the waste drawer 902 may be adapted to hold one or more fluids purged from the device 100.

Additionally, the waste drawer 902 may extend along the side of a slideable tray 114. Specifically the length of the tray 114 and the length of the waste drawer 902 may be substantially the same and the width of the waste drawer 902 (in a direction of the horizontal axis 196) may be smaller than the width of the tray 114.

As shown in FIG. 9, the top wall 510 of the device 100 includes a liquid reservoir opening. The device 100 further includes a liquid reservoir receptacle 910 including a first slot 912 adapted to removably couple to the first alcohol reservoir 120, a second slot 914 adapted to removably couple to the second alcohol reservoir 122, and door 132. As such, the first slot 912 may receive the first alcohol reservoir 120 and the second slot 914 may receive the second alcohol reservoir 122. Each of the corresponding slots and alcohol reservoirs may have complementary fluid couplings (e.g., valves or valve interfaces).

FIG. 10 shows a sixth isometric schematic 1000 of the device 100. In addition to the door 142 and pod acceptor 107, the pod receptacle 704 may further include a needle 1002 and a mirror 1004. The mirror 1004 may be directly coupled to an interior surface of the door 142. The needle 1002 may be coupled to the interior surface of the door 142 through a hinged joint 1006. The needle 1002 may extend into an interior of the pod acceptor 107 when the pod receptacle door 142 is closed. Specifically the needle 1002 may extend into the pod acceptor 107 (and into a pod 108 (not shown) when inserted into the pod acceptor) and may be fluidly coupled to the heater 166 and pump 162 (not shown). Thus, the needle may transfer fluid into and out of a pod 108 positioned within and coupled to the pod acceptor 107. The heater 166 may be positioned laterally behind the pod acceptor 107.

Figure 11:
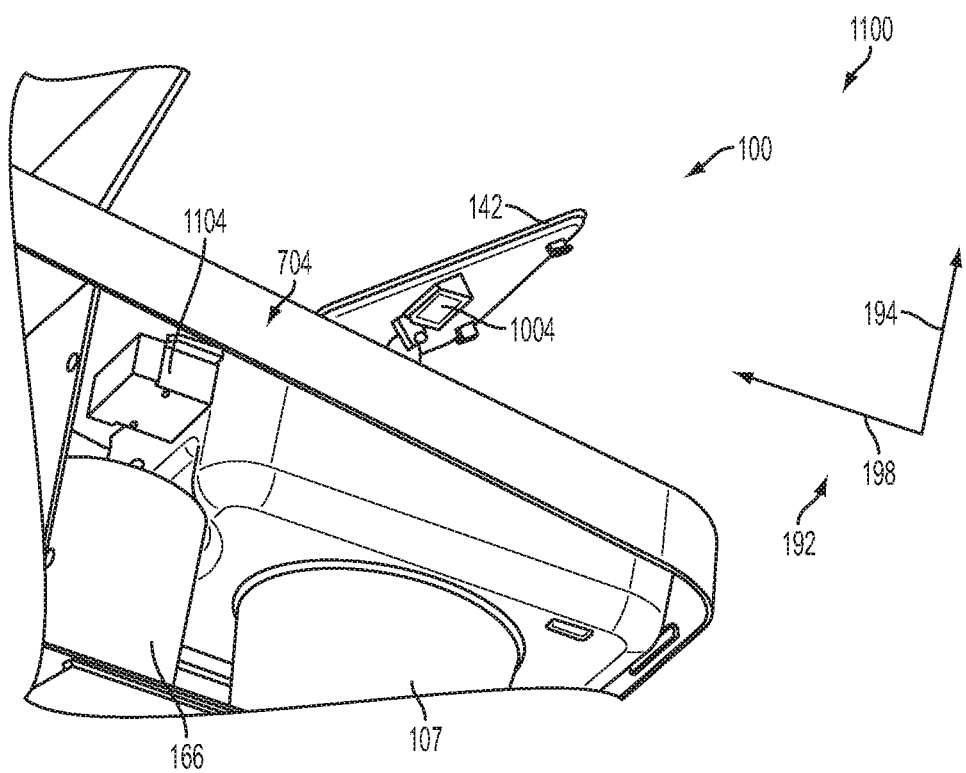

FIG. 11 shows a seventh isometric schematic 1100 of the device 100. The pod receptacle 704 may further include a scanning device 1104 which may be capable of reading a barcode of the pod 108 when inserted into the pod acceptor 107 via the mirror 1004. Specifically the mirror 1004 is angled relative to the interior surface of the door 142 and at least partly faces the scanning device 1104. In one example, the mirror 1004 may be angled 45 degrees relative to the surface of the door 142. The scanning device may be positioned on the back side (with respect to the lateral axis 198) of the pod receptacle 704 more proximate the heater 166 than the mirror 1004.

Figure 12:
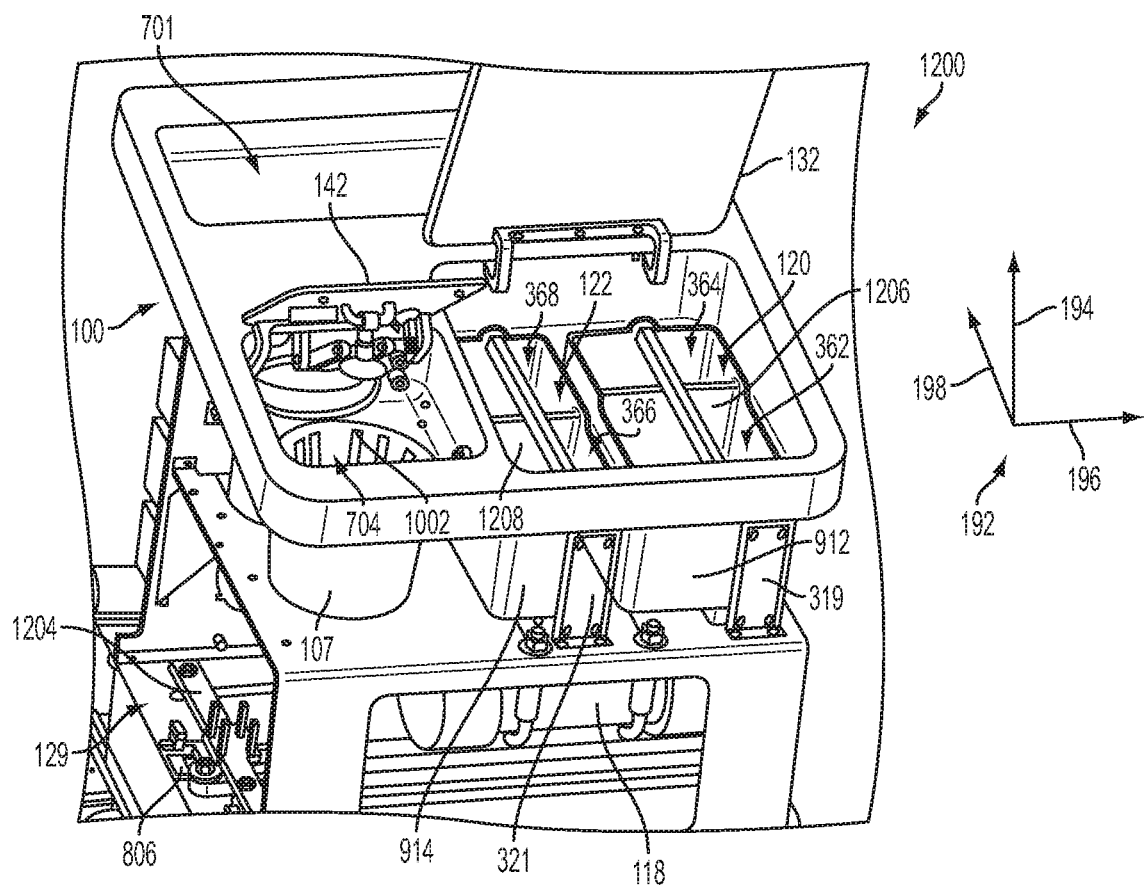

FIG. 12 shows a eighth isometric schematic 1200 of the device 100. The injection assembly 129 may further include a bar 1204 which may span the length of the tray 114 along the lateral axis 198. The bar 1204 may slide along the rod 806 in two directions along the horizontal axis 196. The cold water reservoir 118 may be positioned directly beneath the alcohol reservoirs. Primary compartment (e.g., back compartment) 364 and secondary compartment (e.g., front compartment) 362 of the first alcohol reservoir 120 may be physically separated by a first partition 1206. Similarly, the primary compartment 368 and secondary compartment 366 of the second alcohol reservoir 122 may be separated by a second partition 1208. The primary compartments of both the alcohol reservoirs may be positioned laterally behind the secondary compartments, more proximate the recess 701 than the secondary compartment of the both the alcohol reservoirs. The analog level sensors 319 and 321 may be directly coupled to the front face of the corresponding first slot 912 and second slot 914 and interface directly with sides of the first alcohol reservoir 120 and second alcohol reservoir 122 respectively, that include the secondary compartments.

Figure 13:
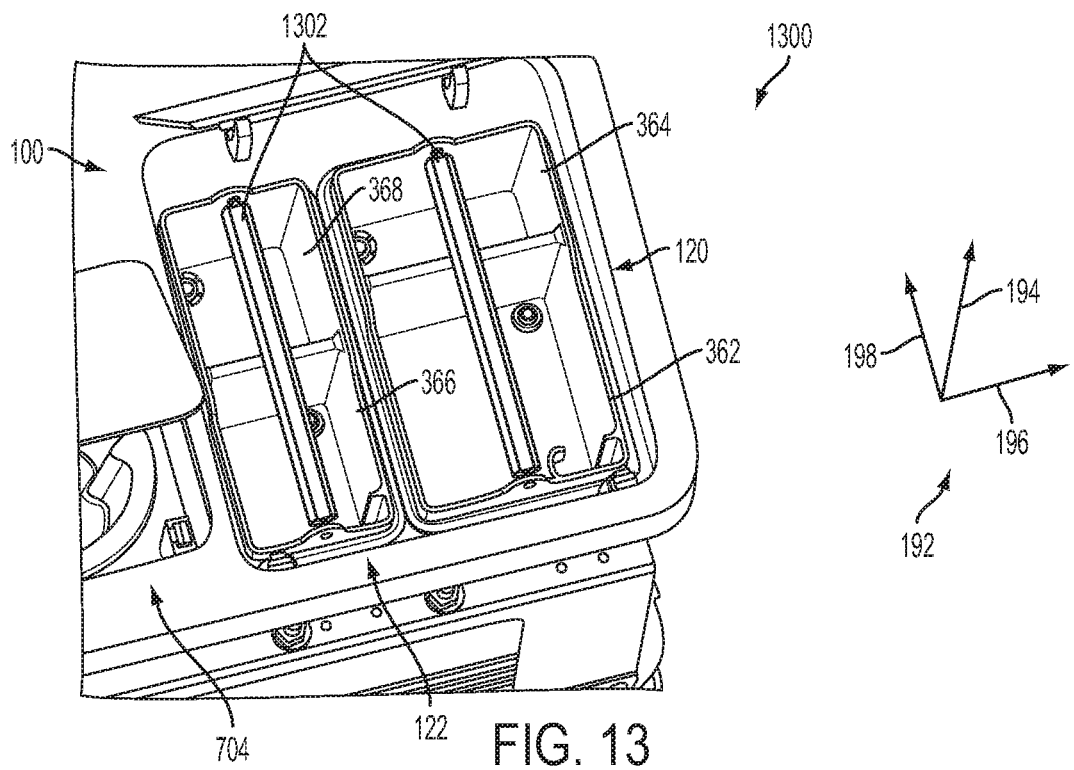

FIG. 13 shows a ninth isometric schematic 1300 of the device 100. Handles 1302 may be included in both the alcohol reservoirs, and may span the length of the reservoirs along the lateral axis 198 at a top of the reservoirs. As such, the first alcohol reservoir 120 and the second alcohol reservoir 122 may be removably coupled to the device 100.

Figure 14:
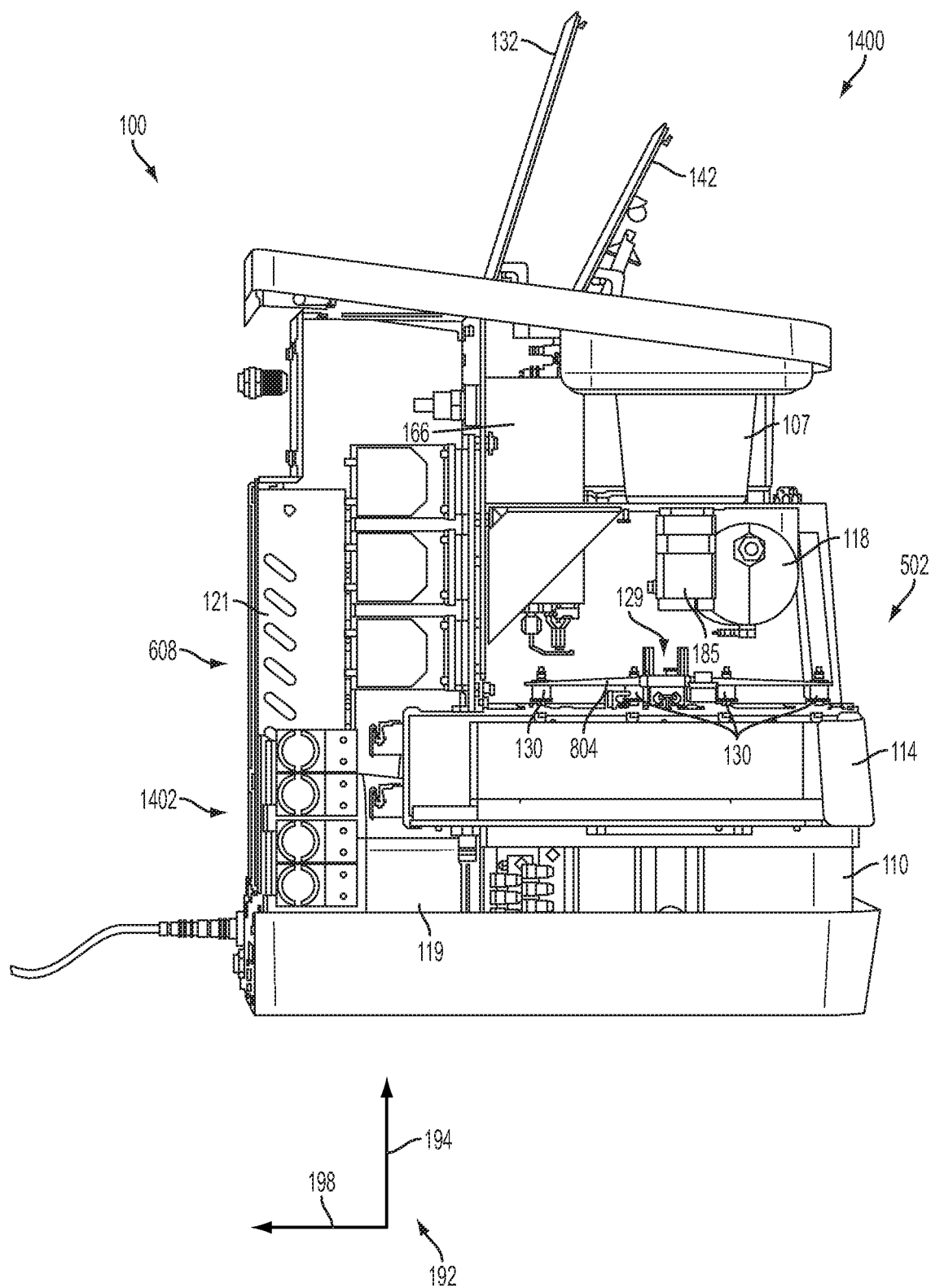

FIG. 14 shows a tenth isometric schematic 1400 of the device 100. Circulation pumps 1402 which may include pump 307, pump 309, pump 311, and pump 312 may be positioned vertically below the condenser 121, and horizontally behind the tray 114 more proximate the back wall 608 of the device 100. The water reservoir 118 may be positioned more proximate the font wall 502 than the first motor 185. The nozzles 130 of the injection assembly 129, may be directly coupled to a bottom surface of the bar 804. The nozzles 130 may be evenly spaced across the bar 804. In another embodiment, the nozzles 130 may not be evenly spaced along the bar 804.

Figure 15:
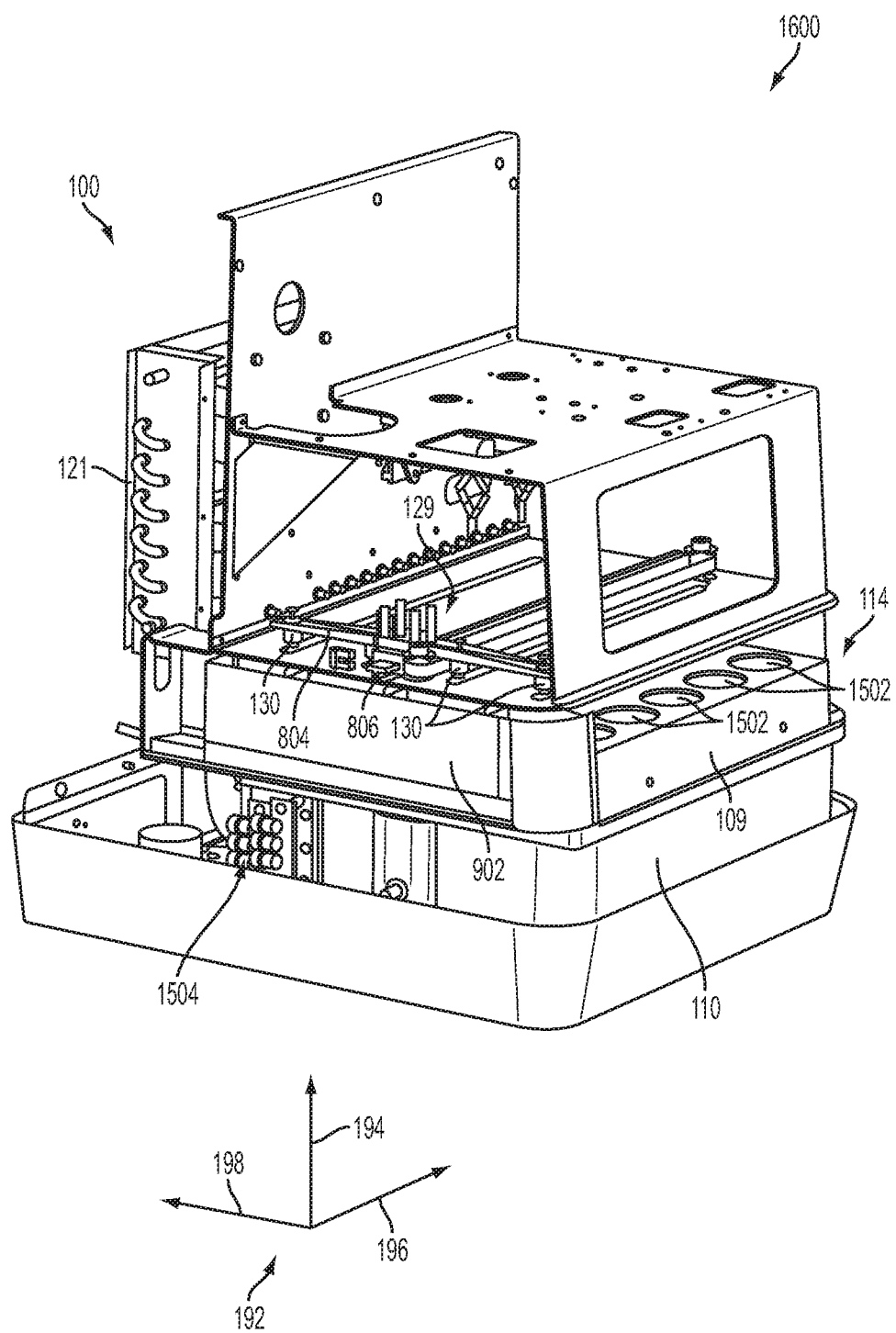

FIG. 15 shows a eleventh isometric schematic 1500 of the device 100. The rod 806 may be positioned centrally beneath the bar 804 of the injection assembly 129 such that the bar may extend outward from the rod 806. The drawer 109 of the tray 114, may include recesses 1502 to receive a plurality of cups 186 (not shown). The recesses 1502 may form an internal tray which is physically coupled to the top of the drawer and may not be removable from the drawer 109. The chiller module 110 further comprises a plurality of water inlets 1504 arranged along the exterior of a side of the chiller module 110 opposite the side of the chiller module 110 coupled to the pump 802 (not shown).

Figure 16:
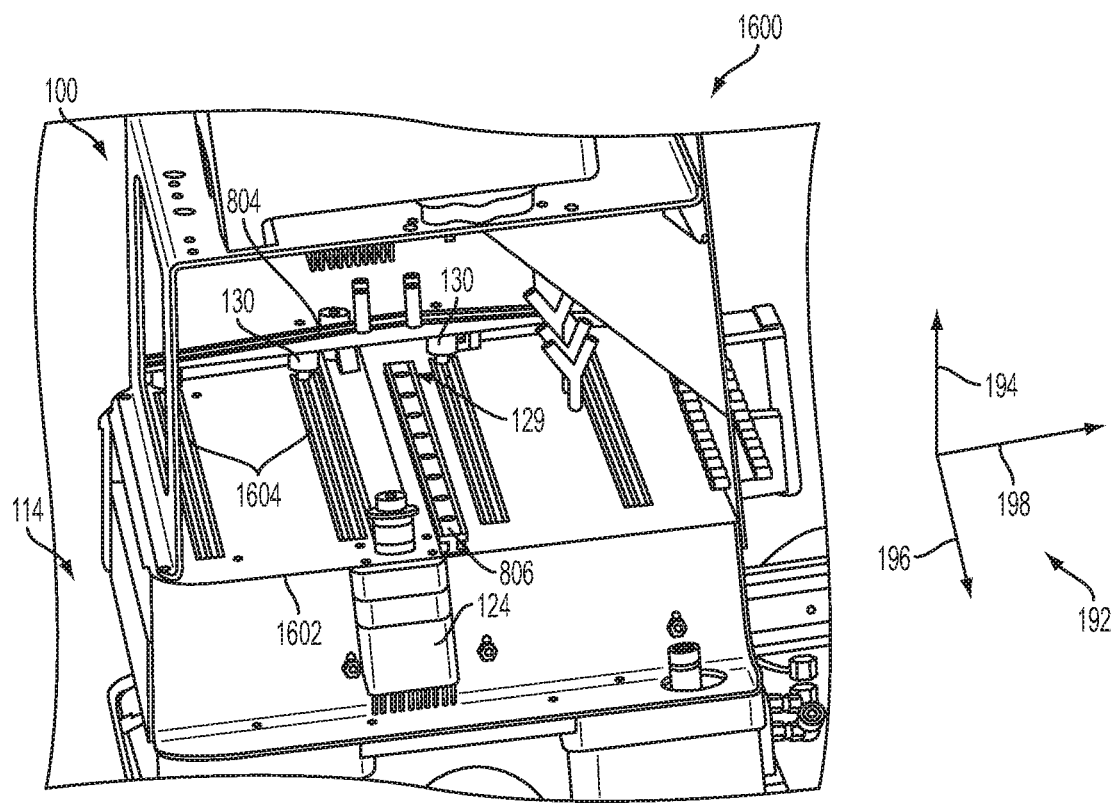

FIG. 16 shows a twelfth isometric schematic 1600 of the device 100. The device 100 may further include a structural plate 1602 which may span the width and length of the tray 114 along both the horizontal axis 196 and the lateral axis 198. The structural plate 1602 may be positioned between the tray 114 and the injection assembly 129. The rod 806 may be directly coupled to the plate 1602. The structural plate may also include slots 1604 which may be positioned directly vertically below the nozzles 130 of the injection assembly 129. Further, the slots may extend along the length of the plate 1602 in the horizontal direction. In this way, the longitudinally extending bar 804, the rod (e.g., central slide) 806 and the motor 124 may form a sliding gantry system of the injection assembly 129. The bar 804 of the injection assembly is movable along a single axis defined by the rod 806 (e.g., one degree of freedom of movement).

Figure 17:
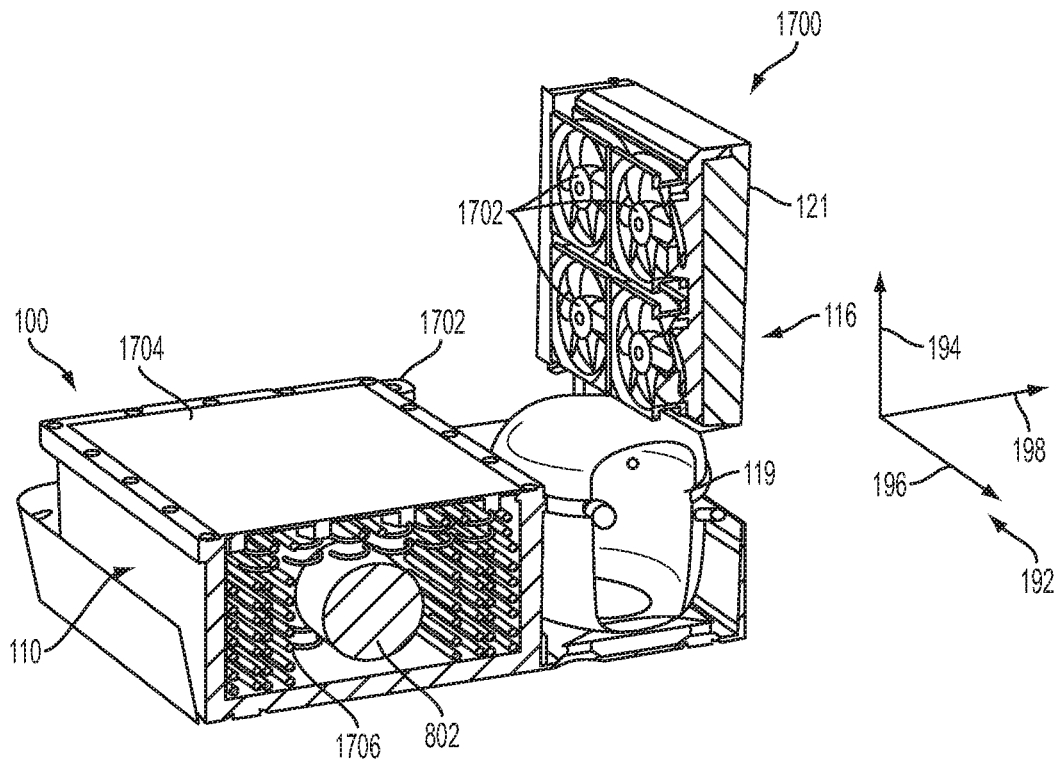

FIG. 17 shows a thirteenth isometric schematic 1700 of the device 100. The condenser 121 which comprises the refrigeration system 116 may include a plurality of fans 1702 to aid in the cooling of coolant in the cooling system (e.g., refrigeration system). Device 100 may further include a cooling plate 1704 which may be positioned vertically on top of the chiller module 110, between the chiller module 110 and the tray 114 (not shown). The cooling plate 1704 may span the surface area of the top of the chiller module 110 and may aid in transferring heat between the tray containing the cups and the chiller module 110. The interior of the chiller module 110 may include a plurality of cooling tubes 1706 designed to circulate coolant throughout the interior of the chiller module 110. Additionally, the cooling tubes 1706 may circulate coolant between the refrigeration system 116 and the chiller module 110.

Figure 18:
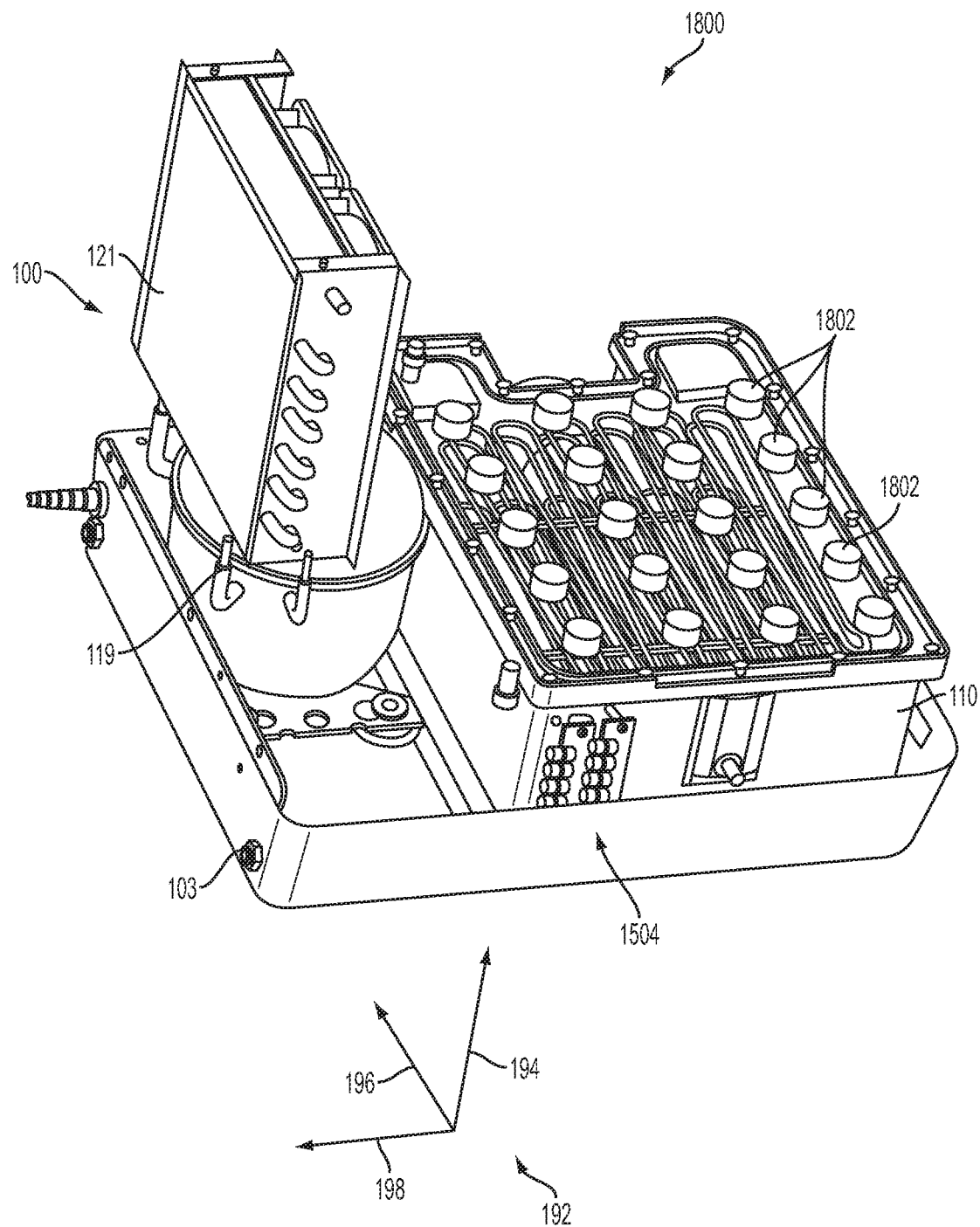

FIG. 18 shows a fourteenth isometric schematic 1800 of the device 100. A plurality of cooling pucks 1802 may be evenly spaced over a top surface of the interior of the chiller module 110, vertically above the cooling tubes 1706, and vertically beneath the cooling plate 1704 shown in FIG. 17.

In one example, the pucks 1802 may be circular, however in other examples the pucks 1802 have other shapes (e.g. rectangular, elliptical, triangular, etc.). The pucks 1802 may be spaced such that each puck 1802 may sit directly underneath a cup 186 (not shown) or between adjacent cups to maximize heat transfer efficiency between the chiller module 110 and the cups 186. Further, the pucks 1802 may be made of a thermally conductive material such as silver, copper, or a composite polymer. Thus, the pucks 1802 may increase heat transfer between the cups 186 and the chiller module 110, thus reducing the amount of time needed to chill the plurality of gelatin-filled cups.

Figure 19:
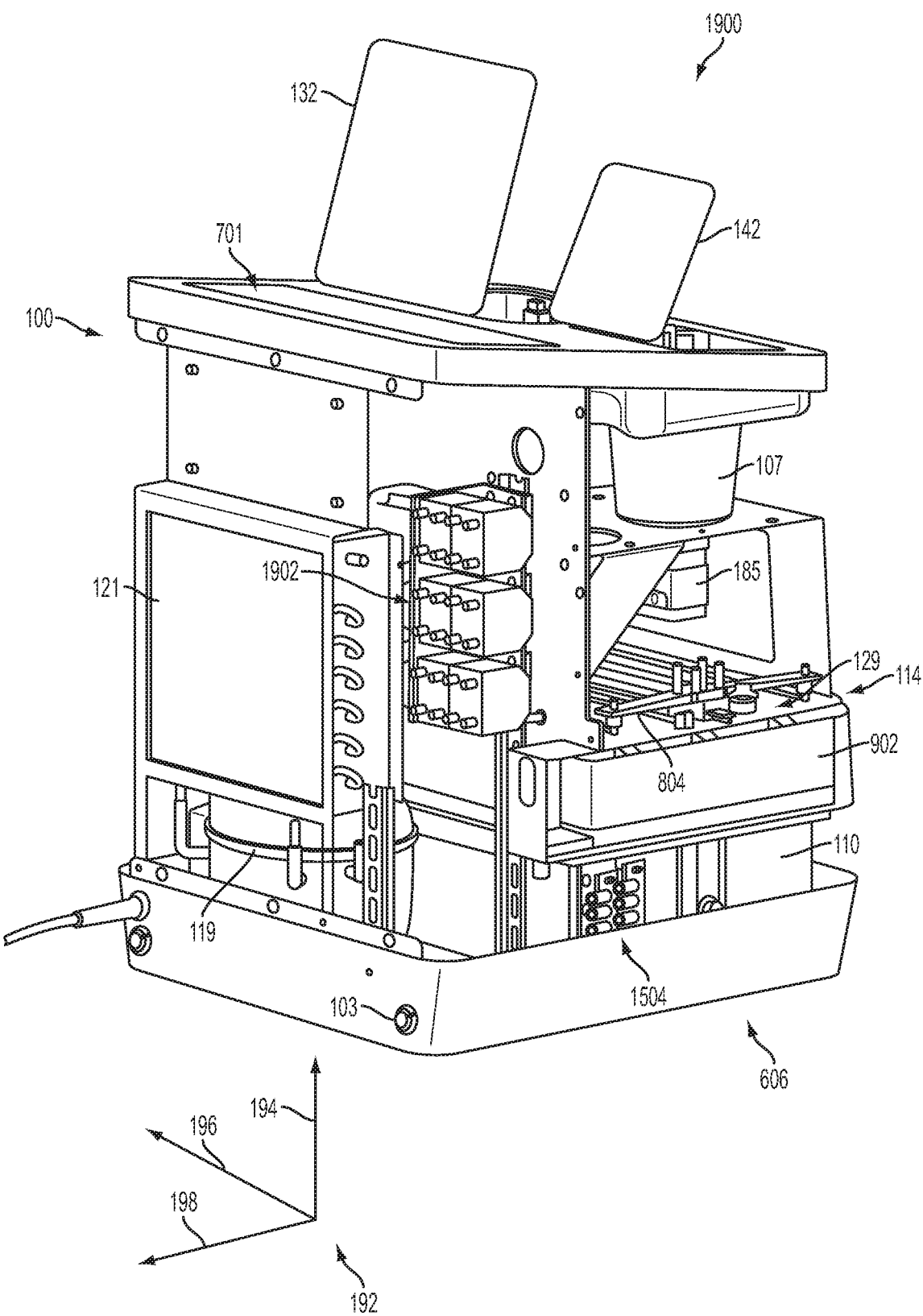

FIG. 19 shows a fifteenth isometric schematic 1900 of the device 100. Peristaltic pumps 1902 which may include pump 154, pumps 176, and pump 162, may be positioned vertically above and horizontally behind the tray 114. Further the peristaltic pumps may be positioned vertically below the recess 701, and more proximate the second side wall 606 than the condenser 121. The peristaltic pumps 1902 may help reduce contamination of consumable fluids within the device 100.

Figure 20:
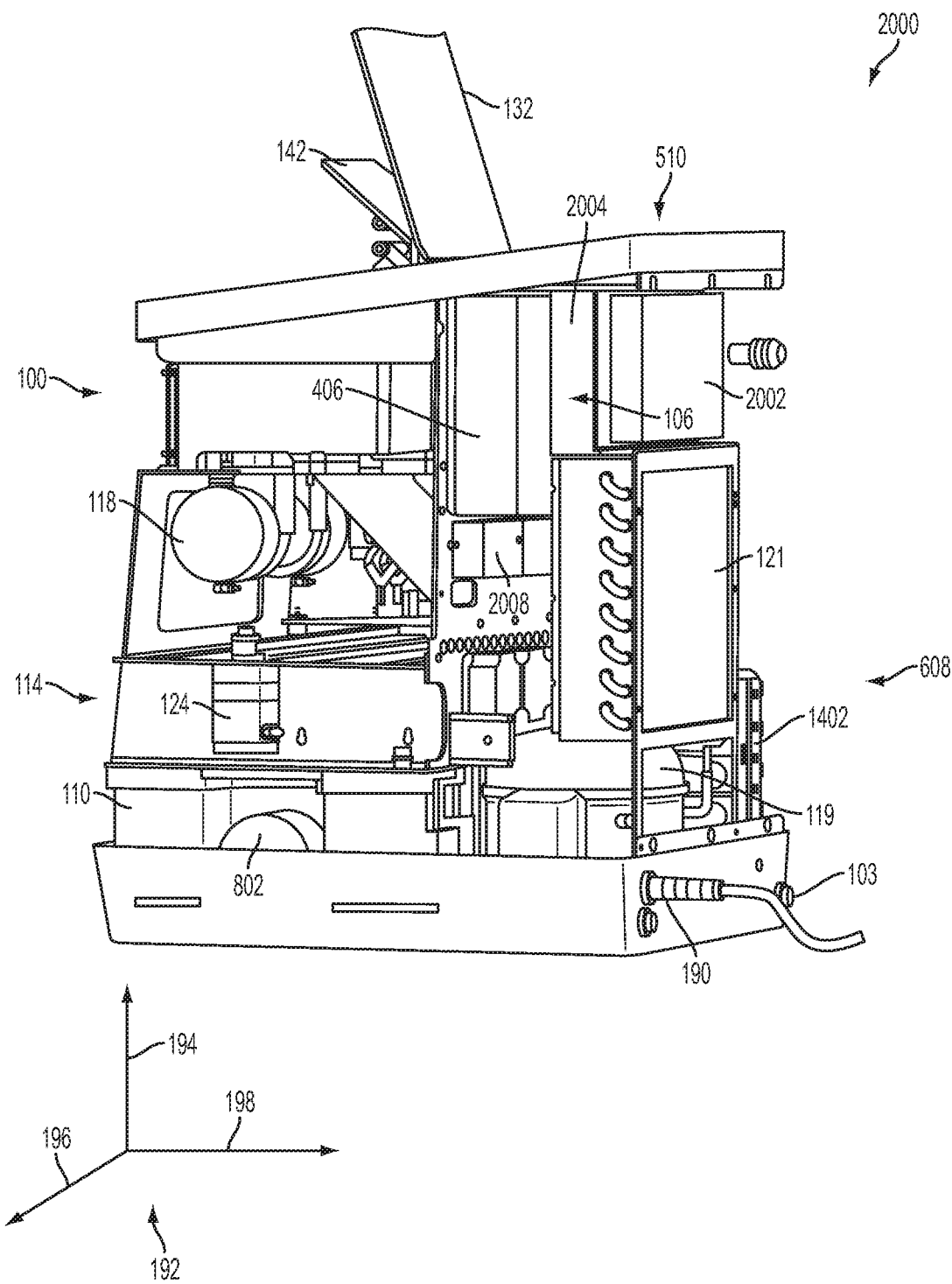

FIG. 20 shows a sixteenth isometric schematic 2000 of the device 100. The controller 106 may be positioned vertically above the condenser 121, generally between the condenser 121 and the top wall 510 of the device 100. As such, the controller 106 may be positioned horizontally behind the tray 114 and cold water reservoir 118 more proximate power adapter 190 and water inlet port 103 on the back wall 608 of the device 100. Controller 106 may include: motherboard 406, a small computer power supply unit (PC PSU) 2004, a driver-board 2002, and a large 24V power supply 2008.

FIGS. 21-32 show user interface flow diagrams and state diagrams of the device 100 shown in FIGS. 1-20. Thus, components described below with reference to FIGS. 21-32 may be the same components described above with reference to FIGS. 1-20. Further, instructions for carrying out the various methods or operational states of FIGS. 21-32 may be stored in a memory of the controller 106 of the device 100 and executed by the controller.

Figure 21:
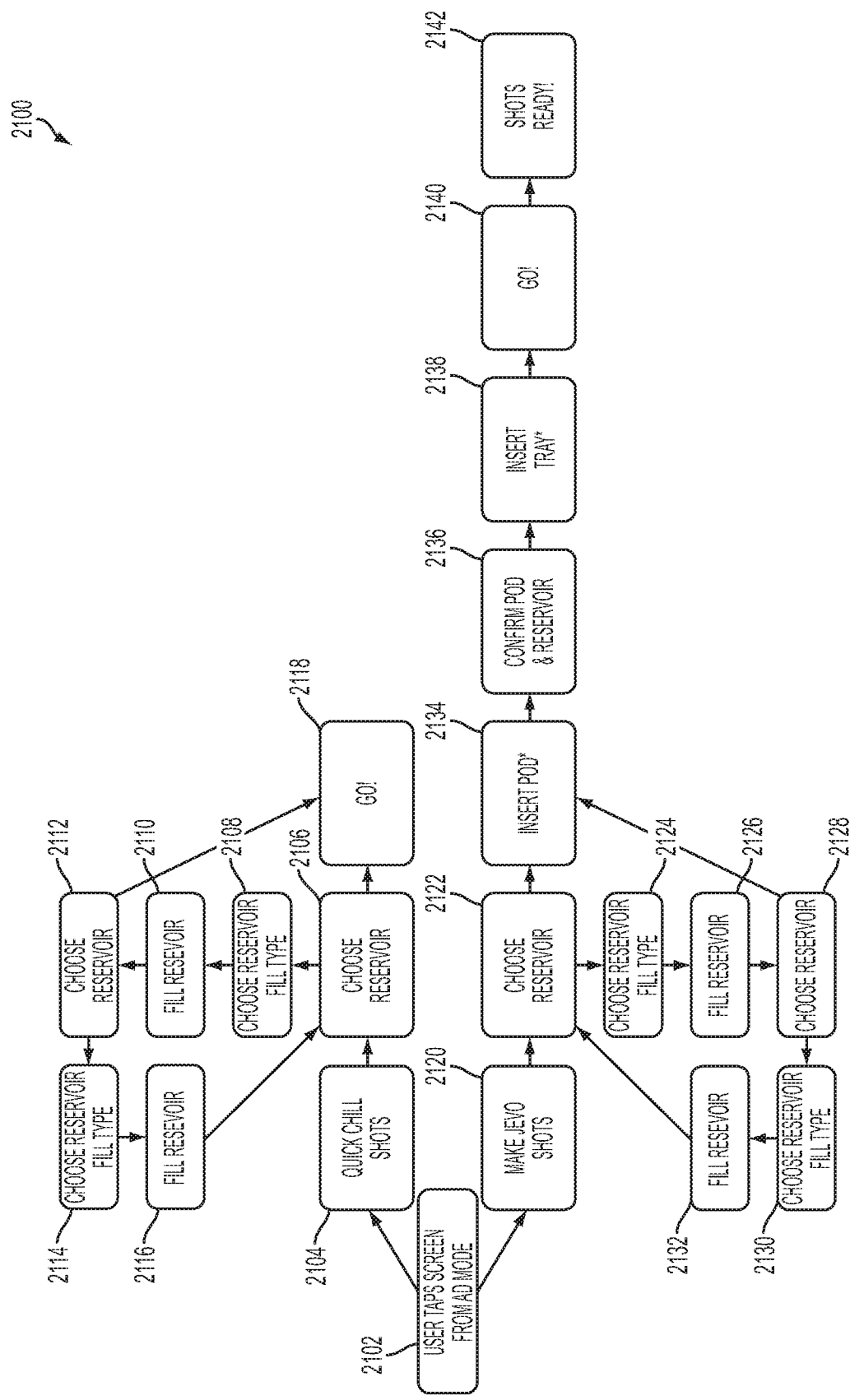
FIGS. 21-22 show user interface flow diagrams of a device used to prepare a gelatin-based product.

Turning to FIG. 21, a first user interface flow diagram 2100 for device 100 is shown. Specifically, diagram 2100 shows an embodiment of a flow of displays for the user interface 104 of device 100. More specifically, the controller 106 may display various requests and/or input options for a user to select from based on previously received user selections and/or operating conditions of the device 100. At 2102, a controller may change the display of the user interface from an add mode (e.g., where one or more advertisements are displayed on the user interface) to a display including a "Make Gelatin-based Shots" selection button (e.g., input button) 2120 and a "Quick Chill Shots" selection button 2104. If the controller receives an input selecting the Quick Chill Shots option, the controller may then prompt a user via the user interface to choose a reservoir at 2106. For example, the display for choosing a reservoir may include a Reservoir 1 selection button and a Reservoir 2 selection button, where each selection button may display a currently selected alcohol for the corresponding reservoir. As described above, device 100 may include two liquid reservoirs for holding alcohol. However, in other embodiments, fewer or greater than two alcohol reservoirs may be included within the device.

If the selected reservoir is already filled and ready to make shots, the controller may display at 2118 a request for the user to confirm that the shot cups are arranged in the tray and ready to go. For example, the display at 2118 may include a "Cancel" selection button and a "Go" selection button. If the controller receives confirmation that the shot cups are ready via the "Go" selection button, the controller may proceed to prepare the quick chill shots. As one example, preparing the quick chills shots may include injecting a pre-determined amount of the selected alcohol from the selected reservoir into each of the plurality of cups arranged in the tray 114. Thus, the cup filling process may be automated by the controller 106 and may include dispensing the dissolved mixture from a common fluid line (e.g., common fluid line 105 from FIG. 1). into the cups via dispensing heads (e.g., nozzles 130 from FIG. 1). The selected alcohol may already be pre-chilled. In some embodiments, the shots may be ready as soon as all the cups are filled. In another embodiment, the method may further include chilling the shots for a duration in the cups arranged above the chiller module. The method may also include indicating to the user via the user interface that the quick chill shots are ready for user consumption. In alternate embodiments, the user may select more than one alcohol type (and thus reservoir) and the method may include injecting a first and second selected alcohol into each cup to make mixed quick chill shots.

Alternatively at 2106, if the selected reservoir needs to be filled, the controller may display via the user interface a request for the user to choose the reservoir fill type (e.g., choose the type of alcohol) at 2108. For example, the display screen may display a variety of selection buttons corresponding to different alcohol types (e.g., vodka, gin, rum, whiskey, etc.). After choosing the reservoir fill type, the controller may display via the user interface a request for the user to fill the selected reservoir at 2110. The display at 2110 may further include a "cancel" selection button and a "confirm" selection button. After receiving a signal indicating the "confirm" selection button was selected, the controller may again display via the user interface the choose reservoir display screen at 2112, as described above at 2104. If the controller receives a selection via the user interface that the second reservoir does not need to be filled, the controller may proceed to 2106. Otherwise, the controller may proceed to 2114 to display a request for the user to choose the second reservoir fill type and then to 2116 to fill the second reservoir, similar to the displays described above at 2108 and 2110. After the reservoir has been filled at 2116, the controller may continue to 2106 and prompt the user to choose a reservoir for making the quick chill shots via the user interface.

Returning to 2120, if the controller receives a selection of the "Make Gelatin-based Shots" selection button via the user interface, the controller may display the choose reservoir display screen (as described above) at 2122. If one or more of the reservoirs need to be filled and a user wants to fill the empty or low reservoir, the controller may continue to display screens 2124-2132, similar to screens 2108-2116 described above. Once the controller receives confirmation that all the necessary liquid (e.g., alcohol) reservoirs are filled, the controller continues to 2134 to display a request for the user to insert the consumable cartridge (e.g., pod). The display at 2134 may include a "Cancel" selection button and a "Confirm" selection button. After receiving a selection of the "Confirm" selection button indicating that the pod has been inserted into the pod receptacle 904, the controller proceeds to 2136 to display a confirmation request. The displayed confirmation request may include a display indicating the inserted pod (e.g., type or flavor of consumable within the pod) and the selected reservoir (and selected alcohol). The display at 2136 may include a "Cancel" selection button and a "Confirm" selection button. After receiving a selection of the "Confirm" selection button, the controller proceeds to 2138 to display a request to insert the shot tray (where the shot tray includes the plurality of cups, as described above). The display at 2138 may include a "Cancel" selection button and a "Confirm" selection button. After receiving a selection of the "Confirm" selection button, the controller proceeds to 2140 to display a request for the user to confirm that the device is loaded and ready to make gelatin-based shots. For example, the display at 2140 may include a "Cancel" selection button and a "Go" selection button. If the controller receives confirmation that the device is ready via the "Go" selection button, the controller may proceed to prepare the gelatin-based shots.

During the shot-making process, as described further below at FIGS. 34-35, the controller may display via the user interface what the device is currently preparing (e.g., consumable and alcohol type) and a progress bar giving an indicating of a time remaining in the shot making process. Once the shot making process is complete, the controller displays at 2142 an indication that the gelatin-based shots are complete.

Figure 22:
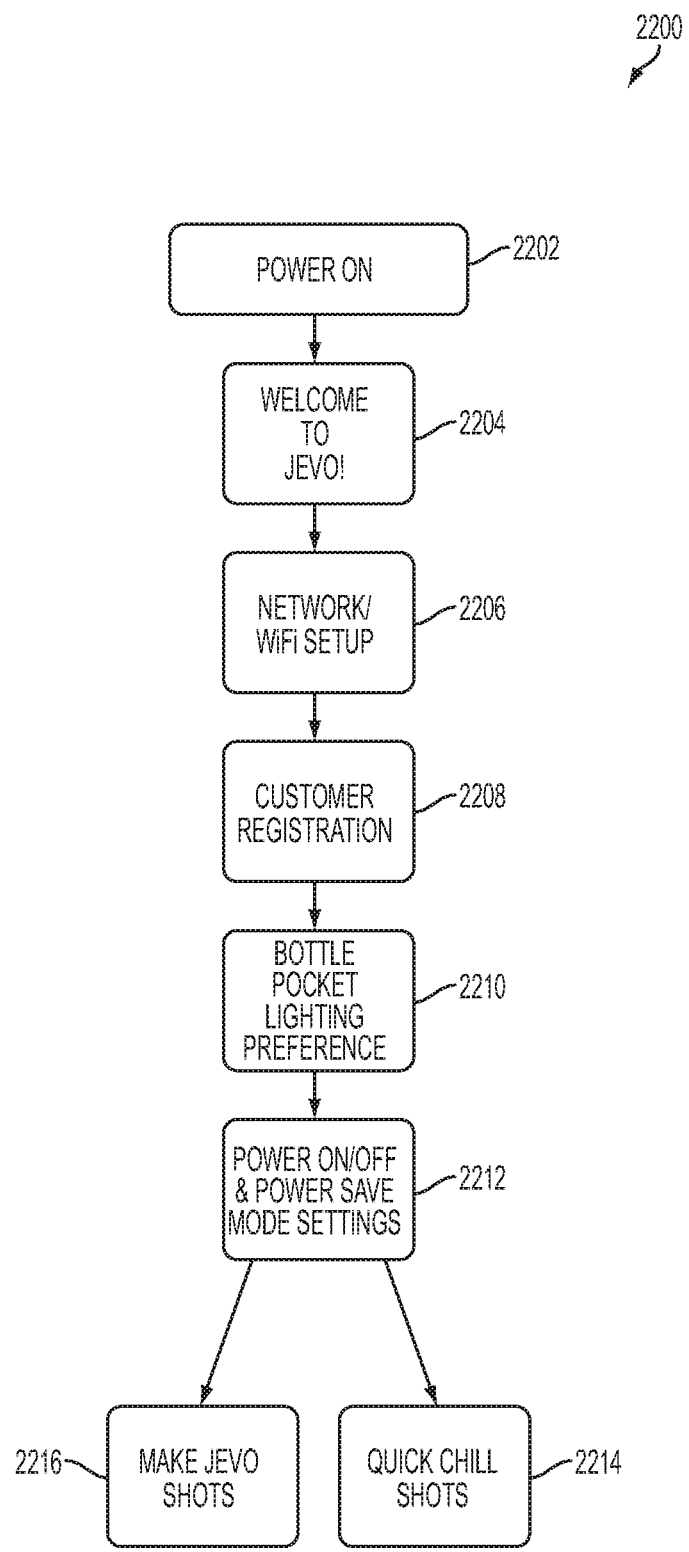

FIG. 22 shows a second user interface flow diagram 2200 for device 100. Specifically, diagram 2200 shows an embodiment of a flow of displays for the user interface 104 of device 100 upon powering-on the device. The controller 106 may display various requests and/or input options via the user interface for a user to select from when a user turns on the device for the first time. For example, a user may power on the device at 2202. Following powering on the device, the controller may display via the user interface a welcome screen at 2204. At 2206, the controller may display a request for the user to input network and/or wireless internet settings. At 2208, the controller may display a request for customer registration information. At 2210, the controller may display a request for a user to input and/or select from a series of bottle pocket lighting preferences. The bottle pocket lighting preferences may include various intensity and/or colors output by lights installed in a storage recess (e.g. side display 501) of a housing of the device. Additionally, the bottle pocket lighting preferences may be selected from a plurality of options stored remotely via a wireless connection or cloud computing. At 2212, the controller may display a request for a user to input and/or select from various power on/off and power save mode settings. The controller may then display a screen including a "Make gelatin-based shots" selection button" 2216 and a "Quick Chill Shots" selection button 2214, as previously described above with reference to FIG. 20.

Figure 23:
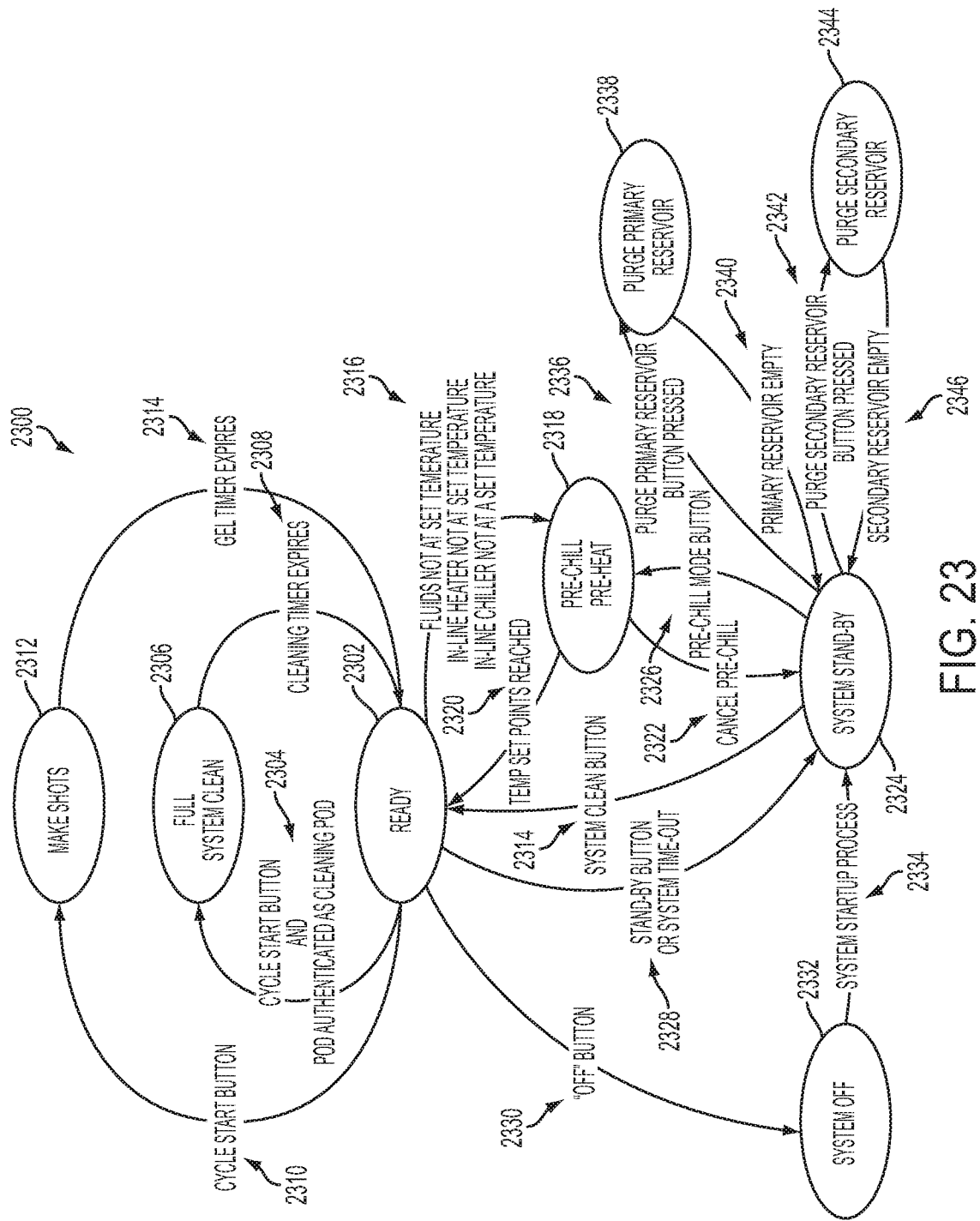
FIGS. 23-31 show state diagrams and flow charts of methods for operating a device used to prepare a gelatin-based product.

FIG. 23 shows an embodiment of a state diagram 2300 for device 100. The state diagram 2300 shows various states of the device wherein various control routines may be executed. The control routines for each state may be executed by the controller of the device and are presented in FIGS. 23-30, described further below. When the device is in one of the below-described states, the device is continuously operating in that current state while checking a plurality of conditions for that state (e.g., system temperature, inputs received from the user interface, etc.). When one of the state-specific conditions are met, the device transitions to the corresponding next state and then continuously operates in that state while continuously checking a plurality of conditions for the new, next state. As such, the device may continuously operate in the current state while checking for a plurality of conditions in real-time.

The different states of the device include the "system off" state 2332 wherein the device is turned off; the "system stand-by" state 2324 wherein the device is on and awaiting further inputs or signals from the device to move to another state; the "ready" state 2302 wherein the device is ready to execute a routine; the "pre-chill/pre-heat" state 2318 wherein the controller may pre-chill or pre-heat various liquids within the device; the "make shots" state 2312 wherein the device prepares the quick chill or gelatin-based shots; the "full system clean" state 2306 wherein the controller executes a cleaning cycle of the device; the "purge primary reservoir" (e.g., first reservoir) state 2338 where the controller purges the contents of the primary, first reservoir (e.g., first alcohol reservoir 120); and the "purge secondary reservoir" (e.g., second reservoir) state 2344 where the controller purges the contents of the secondary, second reservoir (e.g., second alcohol reservoir 122). The "full system clean" state 2306, the "purge primary reservoir" state 2338, and the "purge secondary reservoir" state 2344 may all be cleaning routines of the device 100. The "make shots" state 2312 may be the shot making routine of the device. Further, the "system off" state 2332, the "system stand-by" state 2324, the "ready" state 2302, and the "pre-chill/pre-heat" state 2318 may all be machine inactive routines wherein the device is adjusting operating conditions of the device, but not actively preparing shots or cleaning the machine.

The controller of the device 100 may transition from the different states described above based on various user inputs received via the user interface and/or other switches of the device and based on various received signals indicating operating conditions of the device. As described above, each state may have a set of conditions which the controller continuously monitors during operating at that state. When the controller receives a signal matching one of the conditions for the current state, the device may switch from one operating state to another operating state. For example, as shown in FIG. 23, the device may transition from the "ready" state 2302 to the "make shots" state 2312 upon receiving a selection of a cycle start button 2310 (e.g., such as a confirmation selection and/or "Go" selection from the user interface, as described above). Upon expiration of a gel timer (e.g., after the shots have chilled for a threshold duration) at 2314, the device transitions from the "make shots" state 2312 and back to the "ready" state 2302. The device may transition from the "ready" state 2302 to the "full system clean" state 2306 upon selection of a cycle start button and after the pod inserted into the pod receptacle (e.g., pod receptacle 704 from FIG. 7) is authenticated as a cleaning pod (e.g., a cartridge including a cleaning solution instead of a gelatin-based product) via the scanning device (e.g. scanning device 1104 from FIG. 10) of the pod receptacle, as shown at 2304. The device may then return to the "ready" state 2302 from the "full system clean" state after expiration of a cleaning timer 2308 indicating that the cleaning cycle is complete. The device may transition from the "ready" state 2302 to: the "system off" state 2332 when a system off button 2330 is selected; the "system stand-by" state 2324 upon receiving an input from a stand-by button or system time-out button 2328; and the "pre-chill/pre-heat" state 2318 when upon receiving a signal that one or more of fluids are not at a set temperature, the in-line heater (e.g. heater 166 from FIG. 1) is not at a set temperature, and/or an in-line chiller (e.g., chiller module 110 from FIG. 1) is not at a set temperature as shown at 2316.

Additionally, the device may transition from the "pre-chill/pre-heat" state 2318 to: the "system stand-by" state 2324 when a selection canceling the pre-chill routine is received at 2322 and the "ready" state 2302 when a set of designated temperature set points of the device, as shown at 2320, have been reached. The device may transition from the "system off" state 2332 to the "system stand-by" state 2324 following execution of a system startup process 2334. Further still, the device may transition from the "system stand-by" state 2324 to: the "ready" state 2302 after receiving an input via a system clean button 2314; the "pre-chill/pre-heat" state 2318 after receiving an input from a pre-chill mode button 2326; the "purge primary reservoir" state 2338 after receiving an input from a purge primary reservoir button 2336; and the "purge secondary reservoir" state 2344 after receiving an input from a purge secondary reservoir button 2342. The device may transition from the "purge primary reservoir" state 2338 to the "system stand-by" state 2324 after receiving a signal that the primary reservoir is empty or below threshold level, as shown at 2340. Similarly, the device may transition from the "purge secondary reservoir" state 2344 to the "system stand-by" state 2324 after receiving a signal that the secondary reservoir is empty or below a threshold level as shown at 2346.

FIGS. 24-34 show flow charts showing methods for each state, as described above with reference to FIG. 23. Similar states and conditions described above with reference to FIG. 23 may be labeled the same in FIGS. 24-34. The methods of FIGS. 24-34 may include conditions that may be continuously checked during the current state routine. As such, when certain conditions are met during the methods for each state, the device may transition from the current state to another state, as described above. Details already described above with regard to FIG. 23 may be the same for FIGS. 24-34 and thus may not be re-explained below in the interest of brevity. Instructions for executing the methods presented in FIGS. 24-34 may be stored in a memory of the controller 106 of device 100. As such, the methods of FIGS. 24-34 may be executed by the controller 106.

Figure 24:
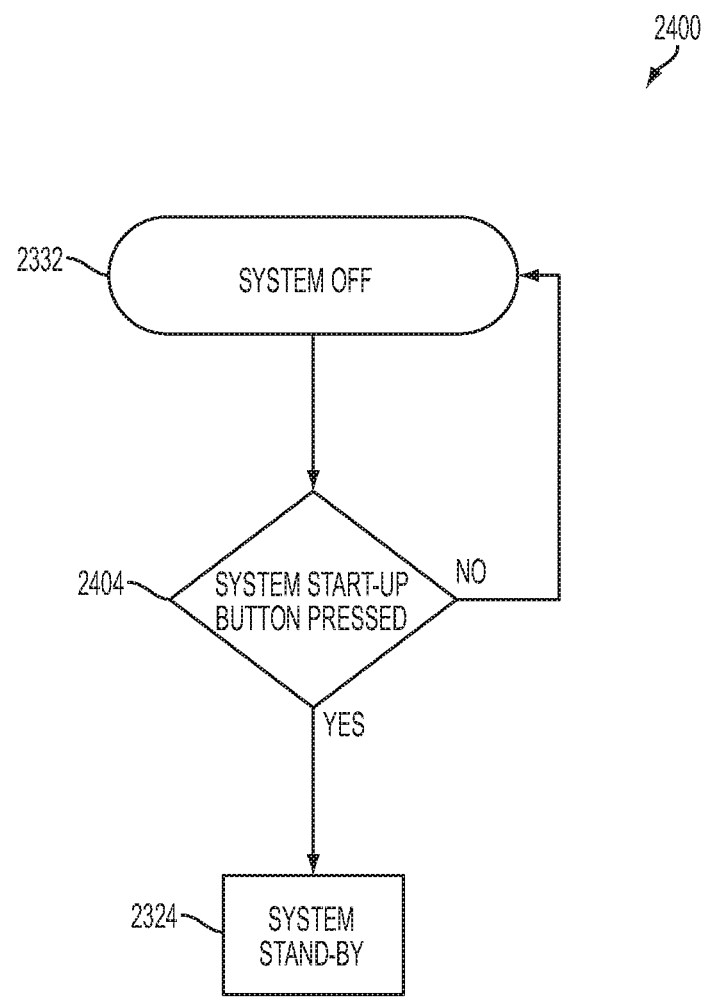

Turning first to FIG. 24, the device may be in the system off state 2332. While in the system off state, the controller of the device 100 may run method 2400. In response to receiving a signal that a system start-up button has been pressed (e.g., via the user interface or an input switch of the device) at 2404, the method proceeds to transition the device into the system stand-by state 2324. Otherwise, the device remains in the system off state 2332 and the controller continues to check if the system start-up button has been pressed.

Figure 25:
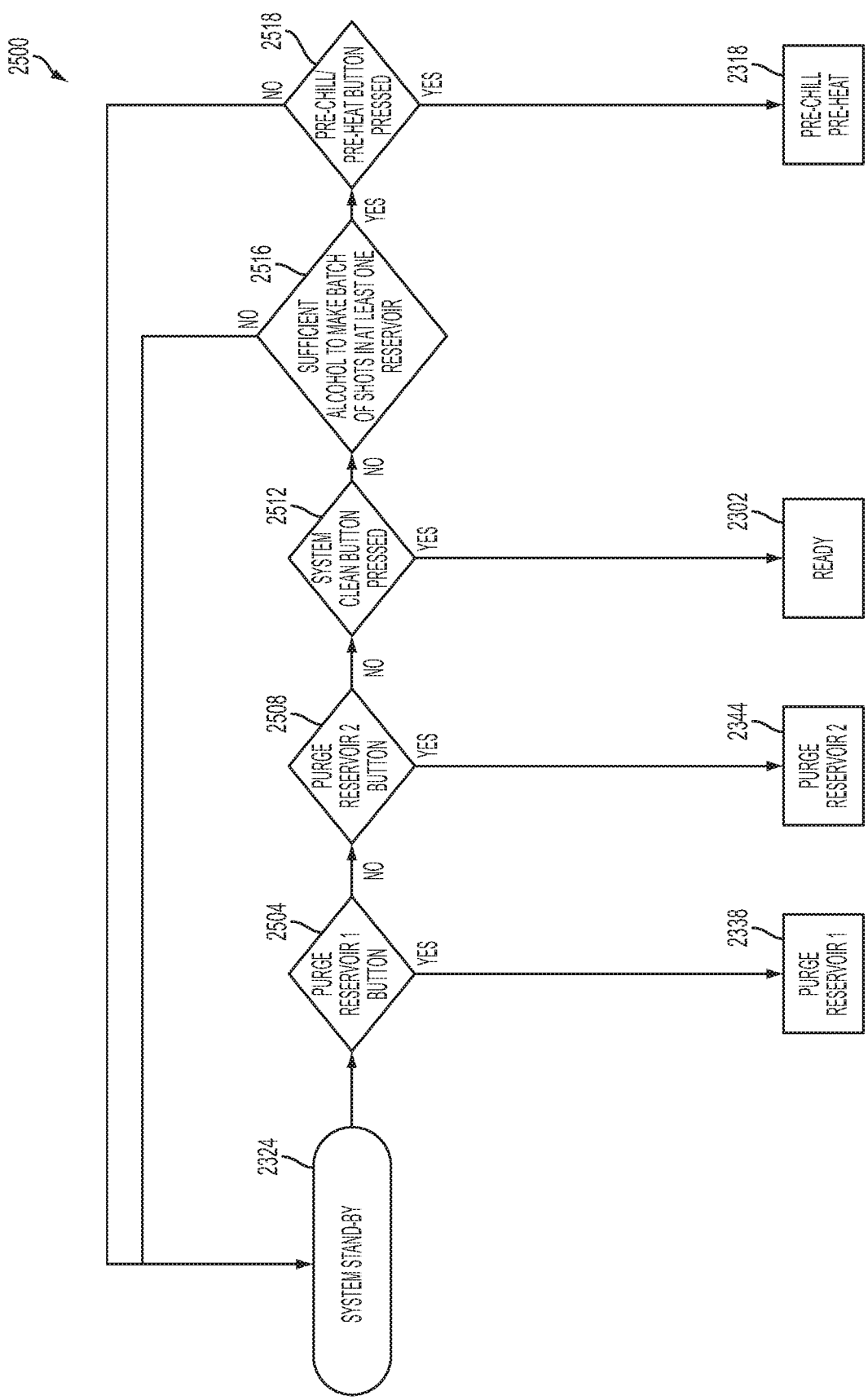

FIG. 25 shows a method 2500 executed during device operation in the system stand-by state 2324. At 2504, the method includes determining if the purge reservoir 1 button has been selected (e.g., via the user interface). In one example, the controller may display via the user interface the purge reservoir 1 button in a settings display menu. The settings display menu may also include the purge reservoir 2 button, the pre-chill button (and/or pre-heat button), and the system clean button. If the controller receives a selection of the purge reservoir 1 button, the method continues to transition the device into the purge primary reservoir (e.g., reservoir 1) state 2338. The controller may then run a method of the purge primary reservoir state, as described below with reference to FIG. 30. Otherwise at 2504, the method proceeds from 2504 to 2508 to determine if the purge reservoir 2 has been selected (e.g., if the controller has received a signal indicating that the purge reservoir 2 was selected via the user interface). If the purge reservoir 2 button has been selected, the method continues to transition the device from the system stand-by state 2324 to the purge secondary reservoir (e.g., reservoir 2) state 2344. The controller may then run a method of the purge secondary reservoir state, as described below with reference to FIG. 31.

Otherwise, if the purge reservoir 2 button has not been selected, the method continues to 2512 to determine if the system clean button has been selected. If the system clean button has been selected via the user interface, the method proceeds to transition the device into the ready state 2302 and run method 2800 of FIGS. 28A-28B, described further below. Alternatively, if the system clean button has not been selected, the method continues to 2516 to determine if there is sufficient alcohol to make a batch of shots in at least one of the first or second reservoirs. If not, the method maintains the device in the system stand-by state 2324 and loops back to re-check the system stand-by conditions. However, if there is sufficient alcohol to make at least one batch of shots, the method continues to 2518 to determine if a pre-chill or pre-heat button has been selected. If not, the method maintains the device in the system stand-by state 2324. However, if the pre-chill or pre-heat buttons have been selected, the method proceeds to transition the device to the pre-chill/pre-heat state 2318 and run method 2600 of FIGS. 26A-26B, described further below.

Figure 26A:
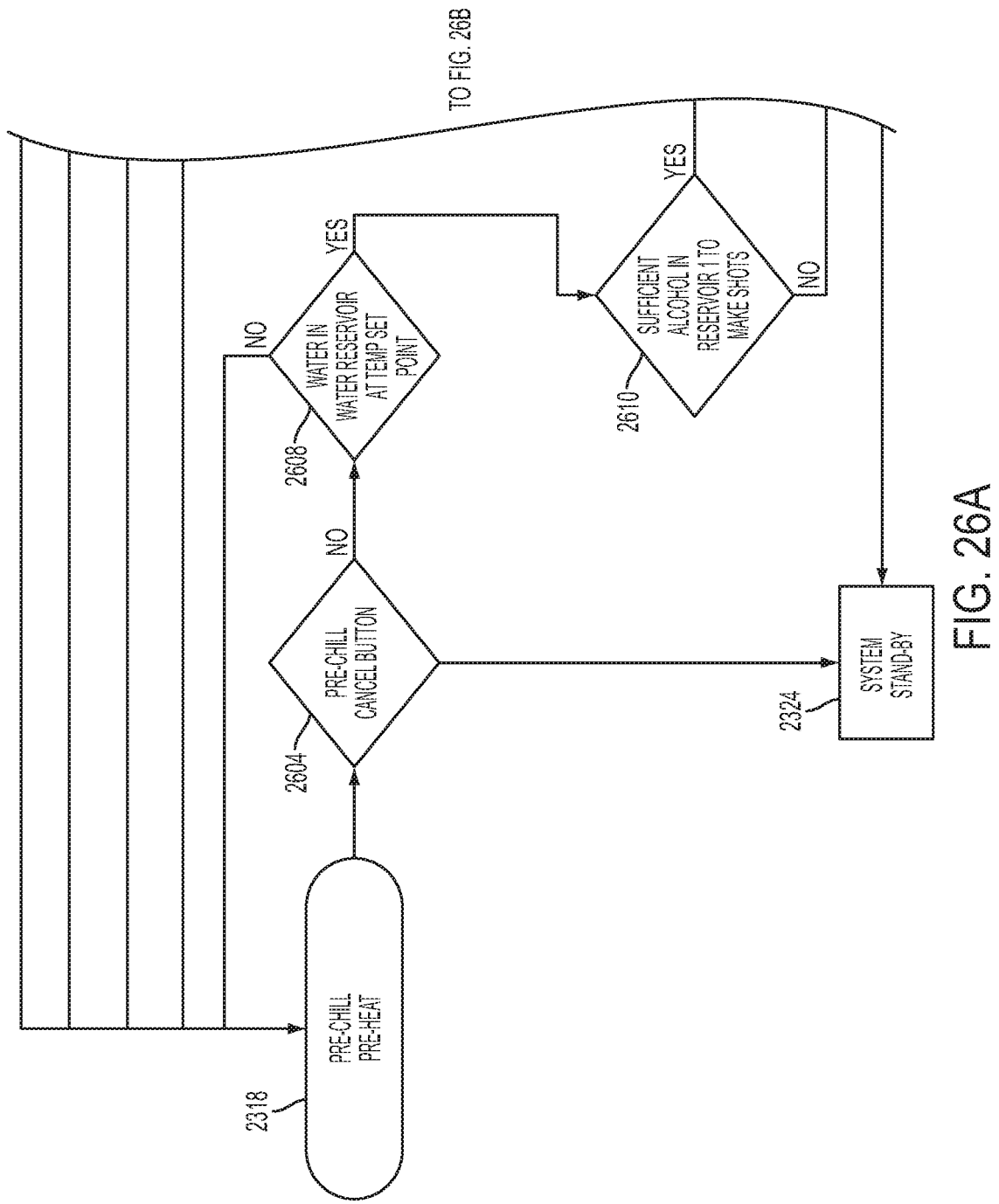
Figure 26B:
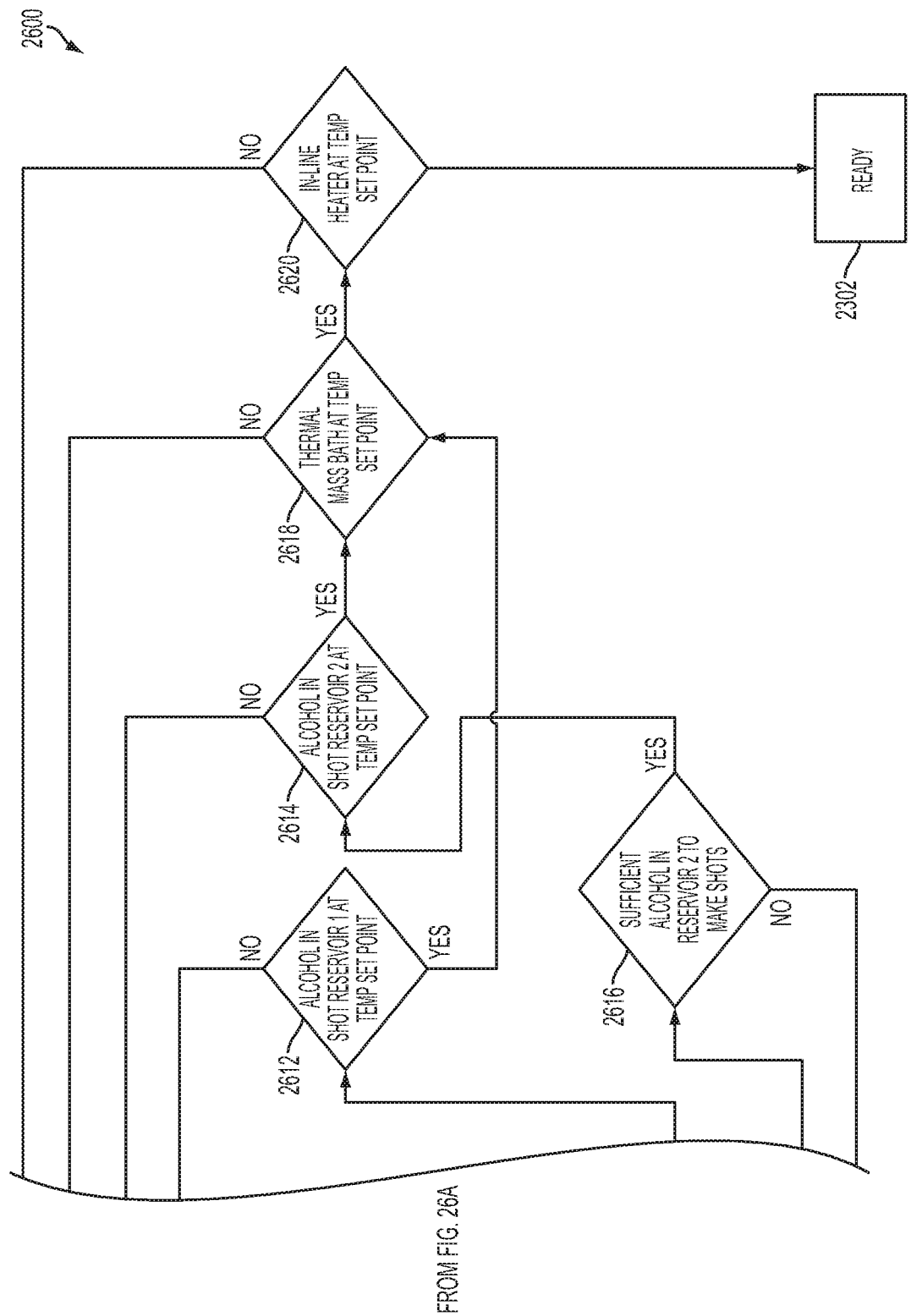
Figure 27A:
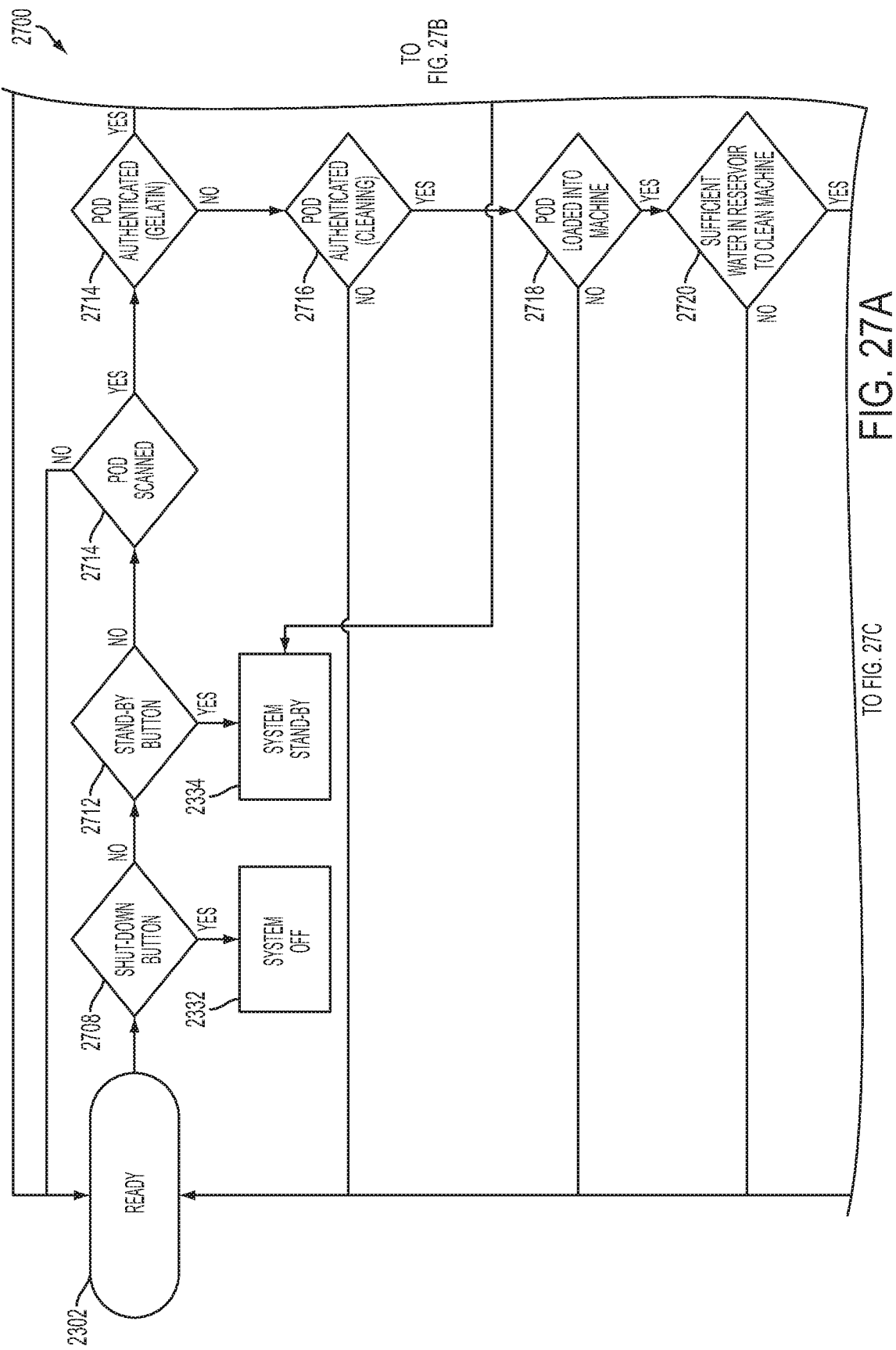
Figure 27B:
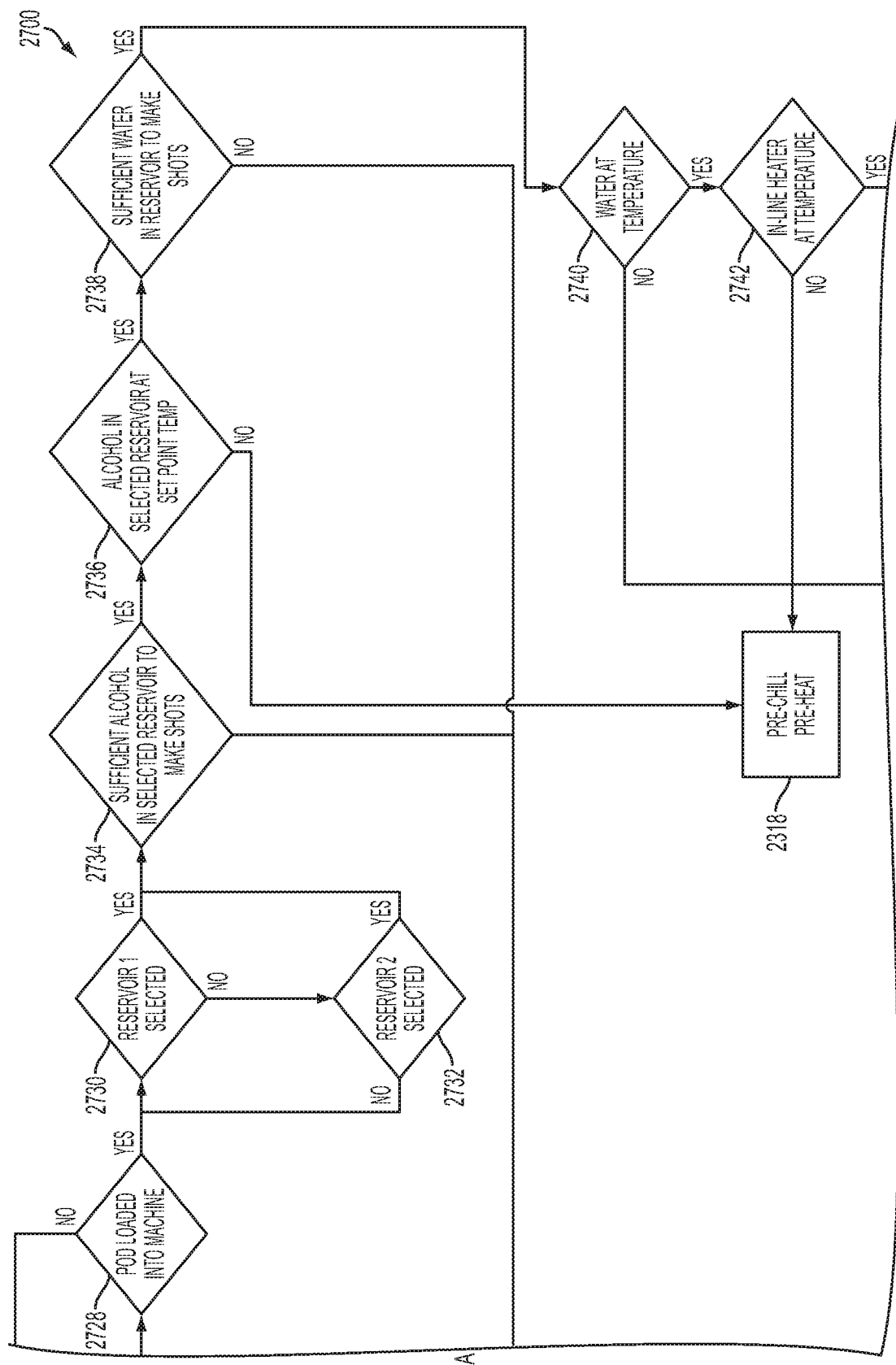
Figure 27C:
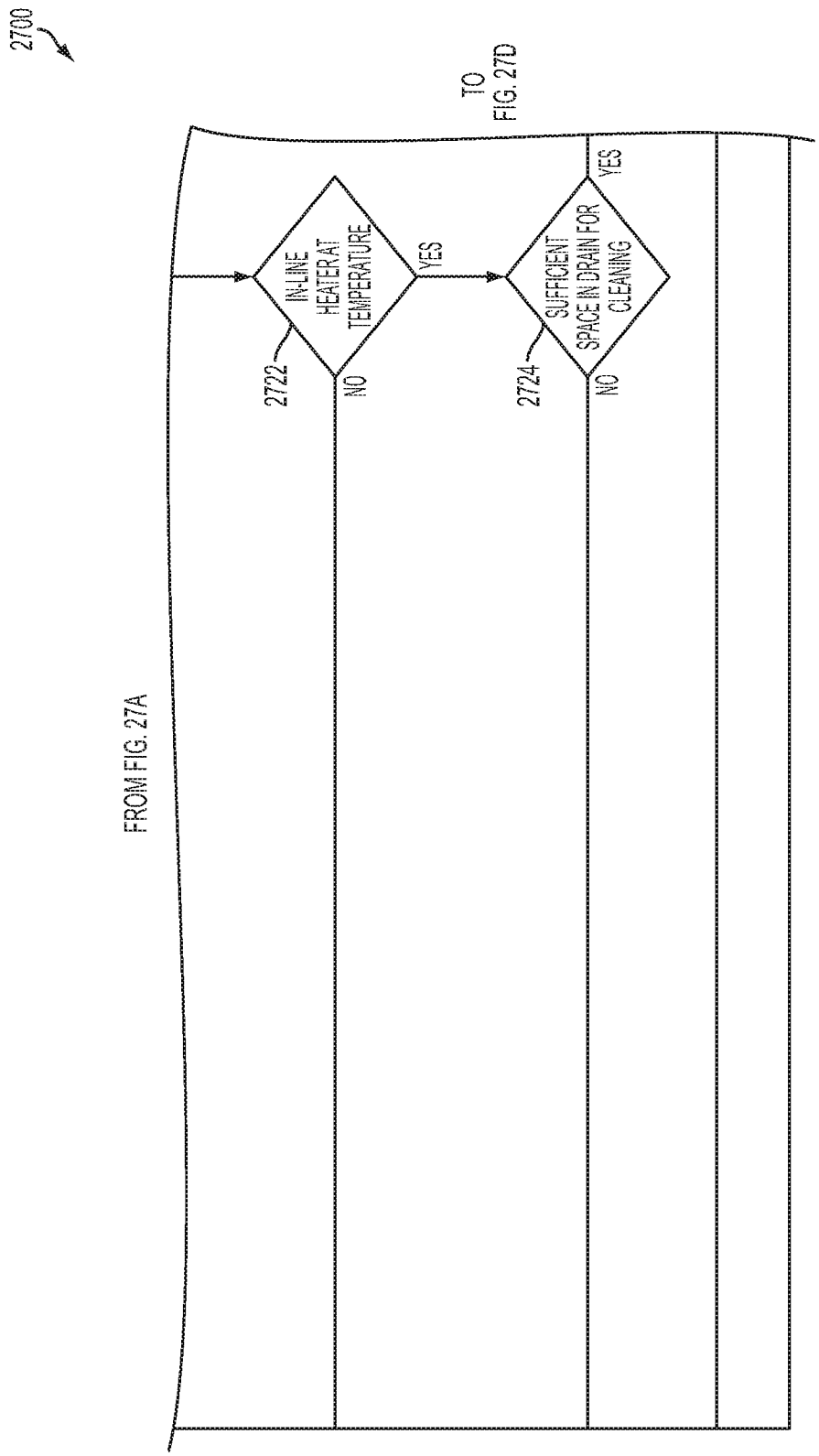
Figure 27D:
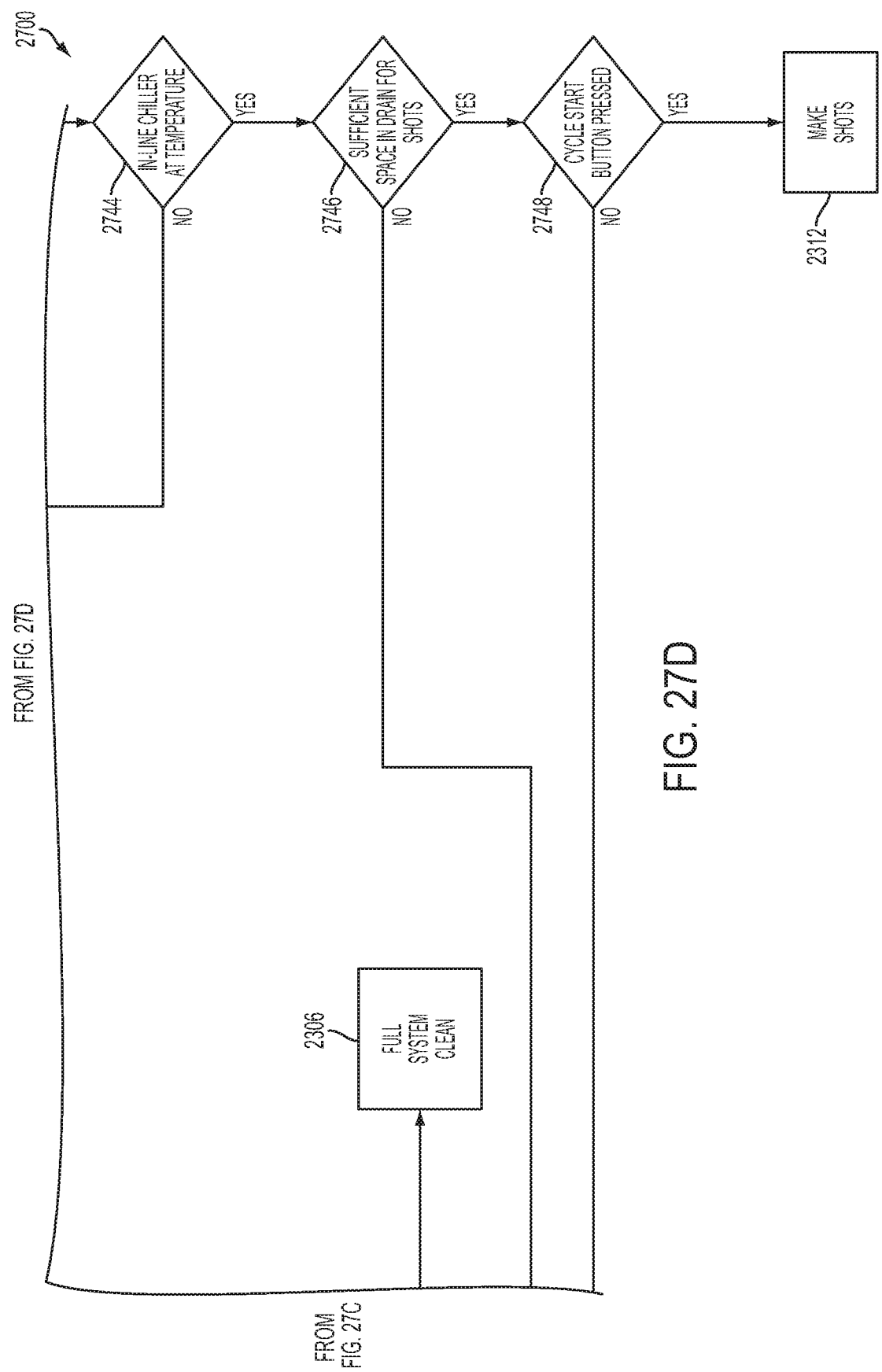

FIGS. 26A-26B shows a method 2600 executed during device operation in the pre-chill/pre-heat state 2318. At 2604, the method includes determining if a pre-chill cancel button has been selected. In one example, the controller may display the pre-chill cancel button via the user interface during the pre-chill/pre-heat state 22318 of the device 100. If the pre-chill cancel button has been selected, the method proceeds to transition the device into the system stand-by state 2324. The controller may then run method 2500 of FIG. 25, as described above. If the pre-chill button has not been selected, the method continues to 2608 to determine if water in the water reservoir is at a temperature set point (e.g., threshold). In one example, the water reservoir may be cold water reservoir 118 of device 100. If the water is not at or within a threshold of the temperature set point, the method continues to operate the device in the pre-chill/pre-heat state and circles back to re-check the pre-chill/pre-heat conditions of method 2600.

Alternatively, if the water in the cold water reservoir is at the temperature set point (or within a threshold temperature set point range), the method continues to 2610 to determine if there is sufficient alcohol in the first alcohol reservoir to make a batch of shots. If there is sufficient alcohol within the first alcohol reservoir (as determined based on feedback from a first level sensor (e.g., sensor 319 from FIGS. 3A-3L) of the first alcohol reservoir (e.g., first alcohol reservoir 120 from FIG. 1), the method continues to 2612 to determine if the alcohol within the first alcohol reservoir is at a temperature set point (e.g., at a threshold temperature or within a set temperature range). If not, the method returns and continues to operate in the pre-chill/pre-heat state while continuously executing method 2600. Otherwise, if the alcohol is at the temperature set point, the method continues to 2618 to determine if a thermal mass bath (e.g., chiller module 110 from FIGS. 1-2, 8-9, 14-15, and 17-20) is at a temperature set point. In one example, the thermal mass bath is chiller module 110 from FIG. 1. If no, the method returns. If yes, the method continues to 2620 to determine if the in-line heater (e.g., heater 166 from FIG. 1) is at a temperature set point of the in-line heater. If the in-line heater is at the temperature set point, after determining that all the other conditions of method 2600 are met as described above, the method proceeds to transition the device into the ready state 2302. The controller may then run method 2700 of FIGS. 27A-27D, as described further below.

Returning to 2610, if there is not a sufficient amount of alcohol within the first reservoir to make a batch of shots, the method continues to 2616 to determine if there is a sufficient amount of alcohol within the second alcohol reservoir (e.g., second alcohol reservoir 122 from FIG. 1) to match a batch of shots. The amount of alcohol within the second reservoir may be determined based on feedback from second level sensor (e.g., sensor 321 from FIGS. 3A-3L). If there is not a sufficient amount of alcohol within the second reservoir, the method proceeds to transition the device to the system stand-by state 2324. Otherwise, if there is a sufficient amount of alcohol within the second reservoir, the method continues to 2614 to determine if the alcohol within the second reservoir is at a temperature set point (or within a desired temperature range for the second reservoir). If the answer is yes at 2614, the method continues to 2618, as described above. If the alcohol within the second reservoir is not at the temperature set point (or within a desired temperature range for the second reservoir) at 2614, the method continues to operate in the pre-chill/pre-heat state 2318 while continuously executing method 2600.

FIGS. 27A-27D shows a method 2700 executed during device operation in the ready state 2302. At 2704, the method includes determining if a shutdown button has been pressed. If yes, the controller transitions the device into the system off state 2332. Otherwise, if the shutdown button has not been pressed, the method continues to 2708 to determine if a stand-by button has been pressed. If yes, the device transitions into the system stand-by state 2324. Otherwise, if the stand-by button has not been pressed, the method continues to 2712 to determine if a pod (e.g., consumable cartridge) has been scanned. A scanned pod may indicate that a consumable cartridge (e.g., a consumable pod) has been loaded into the pod receptacle of the device. As described above, the pod may be scanned with the scanning device (e.g., scanning device 1104 from FIG. 11) and mirror (e.g., mirror 1004 from FIG. 10) of the pod receptacle (e.g., pod receptacle 704 from FIG. 7). If the pod has not been scanned, the method returns. However, if controller receives a signal indicting the pod has been scanned (e.g., receives the consumable data from the pod scanner), the method continues to 2714 to determine if the pod is a consumable pod containing a gelatin based product. If the pod is not authenticated as a gelatin based pod, the method continues to 2716 to determine if the pod loaded into the device is a cleaning type pod. The cleaning pod may contain a cleaning solution for cleaning the device. If the pod is not authenticated as a cleaning pod, the method returns and neither the cleaning cycle or shot making process are executed. If the pod is confirmed to be a cleaning pod, the method continues to 2718 to determine if the pod is loaded into the machine. If the cleaning pod is loaded properly, the method continues to 2720 to determine if there is sufficient water in the water reservoir (e.g., cold water reservoir 118 from FIG. 1) to clean the machine. If yes, the method continues to 2722 to determine if the in-line heater (e.g., heater 166 from FIGS. 1-2, 10-11, and 14) is at a threshold temperature. If yes, the method continues to 2724 to determine if there is sufficient space in the drain for cleaning. As one example, the drain may be the waste drawer 902 from FIG. 9 of the device 100. If yes at 2724, the method proceeds to transition the device into the full system clean state 2306 where the controller may execute a cleaning routine while also running method 2800. If no at any of 2718-2724, the controller may continue to operate in the ready state 2302 while continuously executing method 2700.

Alternatively at 2714, if the pod is confirmed to be a consumable pod containing the gelatin based product, the method continue to 2728 to determine if the consumable pod is loaded properly into the pod receptacle of the device. If yes at 2728, the method continues to 2730 to determine if the first (e.g., primary) alcohol reservoir (e.g., first alcohol reservoir 120 from FIG. 1) has been selected (e.g., by the user via the user interface). If not, the method continues to 2732 to determine if the second (e.g., secondary) alcohol reservoir (e.g. second alcohol reservoir 122 from FIG. 1) has been selected. After determining which of the two alcohol reservoirs have been selected (based on signals received at the controller from the user interface), the method proceeds to 2734 to determine if there is sufficient alcohol in the selected alcohol reservoir to make at least one batch of shots (or the amount of shots selected by the user or indicated by the pod type). If no, the method proceeds to transition the device into the stand-by state 2324. If yes at 2734, the method proceeds to 2736 to determine if the alcohol within the selected reservoir is at the set point temperature (or within a threshold temperature range for the selected reservoir). If no, the device transitions into the pre-chill/pre-heat state 2318. If yes at 2736, the method continues to 2738 to determine if there is sufficient water within the cold water reservoir to make shots. If yes, the method continues to 2740 to determine if the water within the cold water reservoir is at a threshold temperature (or within a threshold temperature range). If no, the device enters the pre-chill/pre-heat state 2318. If yes at 2740, the method continues to 2742 to determine if the in-line heater (e.g., heater 166 from FIG. 1) is at its threshold temperature or within its threshold temperature range. If yes, the method continues to 2744 to determine if the in-line chiller (e.g., chiller module 110 from FIG. 1) is at its threshold temperature or within its threshold temperature range. If yes, the method continues to 2746 to determine if there is sufficient space in the drain (e.g., waste drawer) for the shots. If yes, the method continues to 2748 to determine if the cycle button has been pressed. The method at 2748 may include determining if the controller has received a signal from the user interface indicating a user has selected a cycle start button. If yes at 2748, the method proceeds to transition the device into the make shots state 2312. If no at 2746 or 2748, the controller may continue to operate in the ready state 2302 while continuously executing method 2700.

Figure 28A:
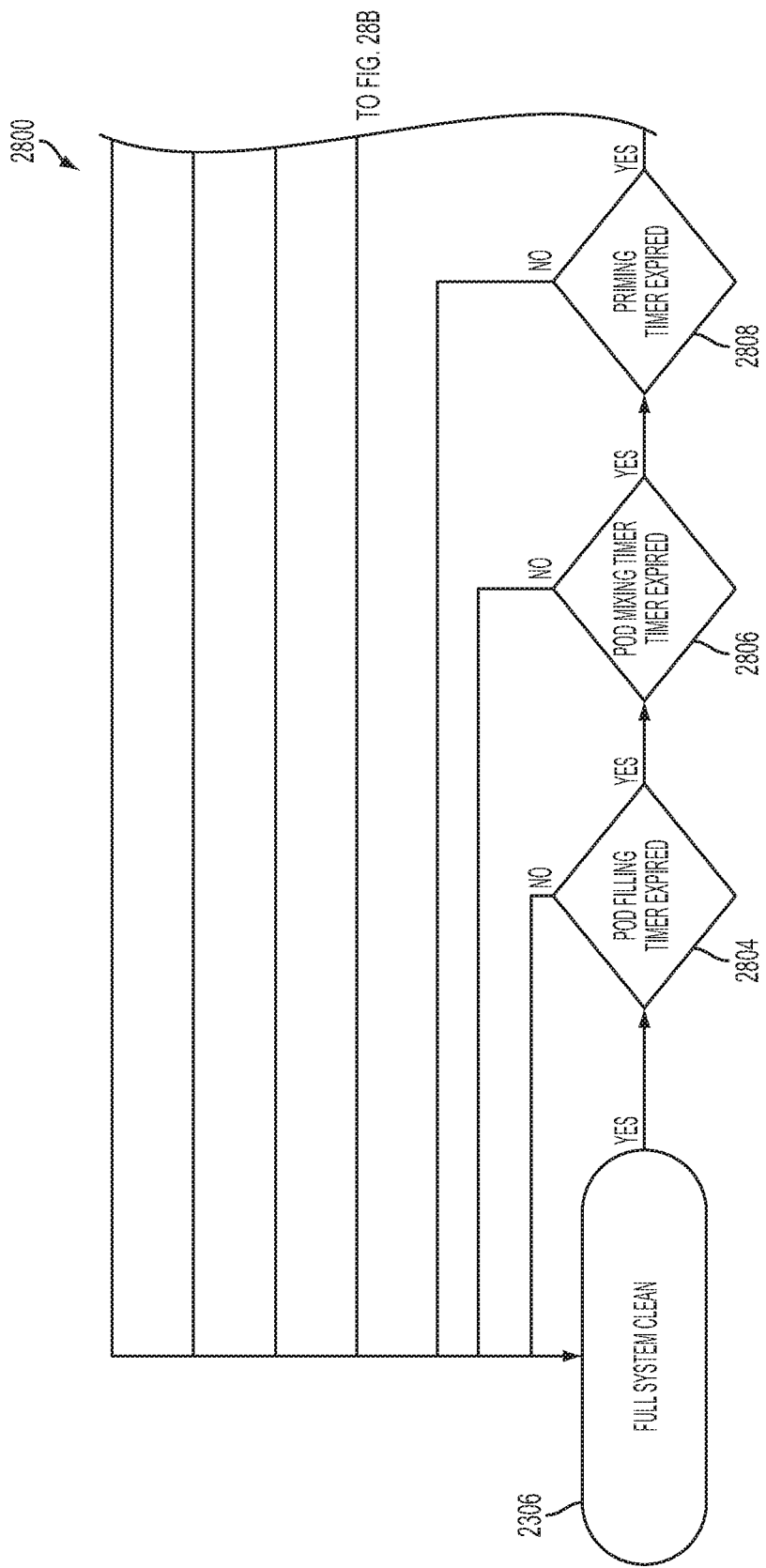
Figure 28B:
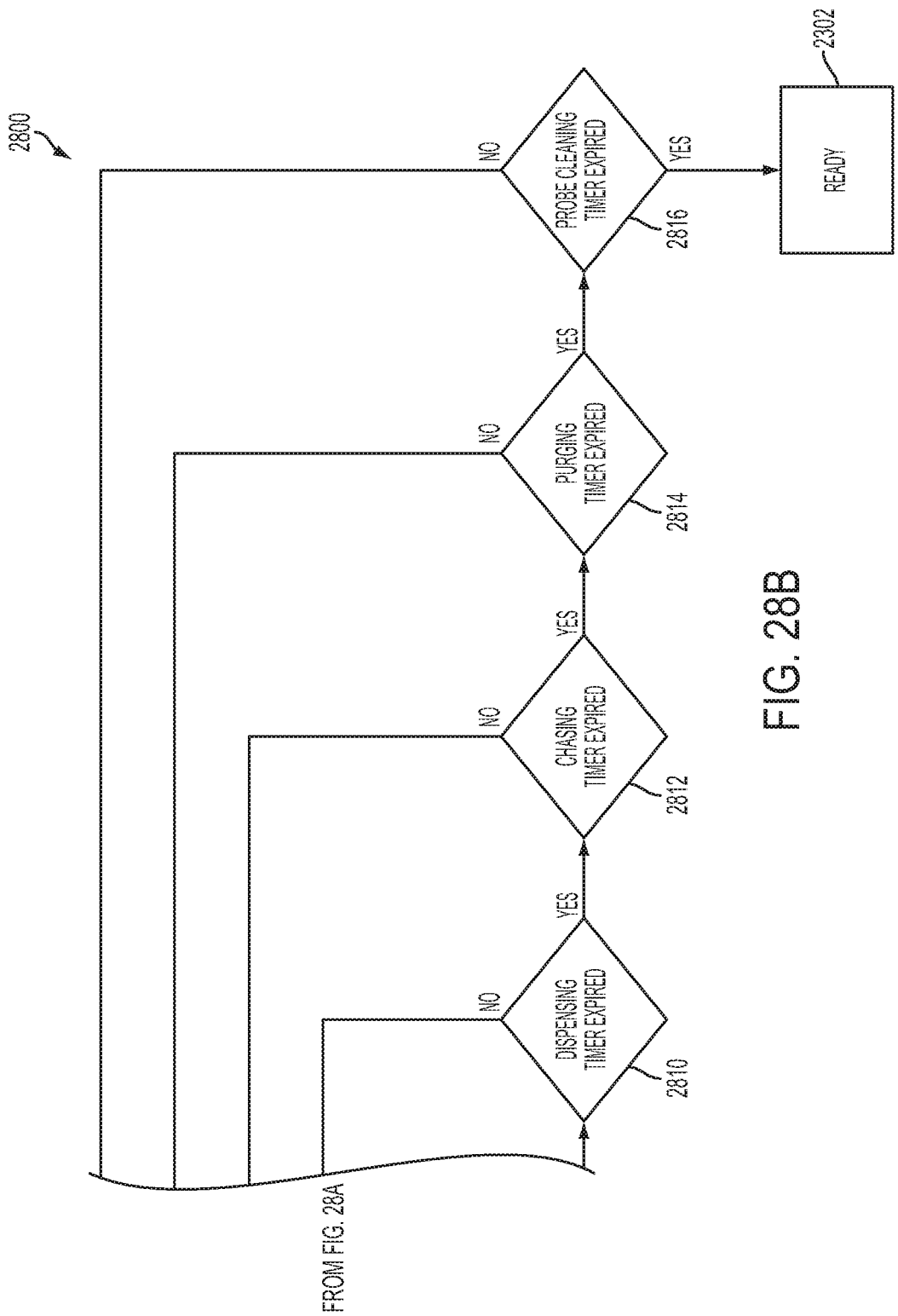

FIGS. 28A-28B shows a method 2800 executed during device operation in the full system clean state 2306. Method 2800 may be executed by the controller while also running a cleaning routine for the device. At 2804, the method includes determining if a pod filling timer has expired. As one example, the pod filling timer may be a timer for filling the cleaning pod within the pod receptacle with heated water. If not, the method returns and the controller may continue checking the conditions of method 2800 (e.g., continue running method 2800). If yes at 2804, the method continues to 2806 to determine if the pod mixing timer (e.g., time for mixing the cleaning pod contents with hot water) has expired. If yes at 2806, the method continues to 2808 to determine if the priming timer (e.g., time for extracting the mixed liquid from the pod via the pod receptacle needle) has expired. If yes, the method continues to 2810 to determine if the dispensing timer (e.g., time for dispensing the mixed cleaning solution through the fluid lines and injection assembly of the device) has expired. If yes, the method continues to 2812 to determine if the chasing timer (e.g., time for flowing a small amount of alcohol through the device fluid lines, e.g., common fluid line 105) has expired. If yes, the method continues to 2814 to determine is the purging timer (e.g., time for purging all fluid from the fluid lines, pod receptacle needle, and injection assembly) has expired. If yes, the method continues to 2816 to determine if the probe (e.g., needle 1002 from FIG. 10) cleaning timer (e.g., time for cleaning the needle) has expired. If yes, the method proceeds to transition the device into the ready state 2302. As such, the device cleaning cycle may be complete.

Figure 29:
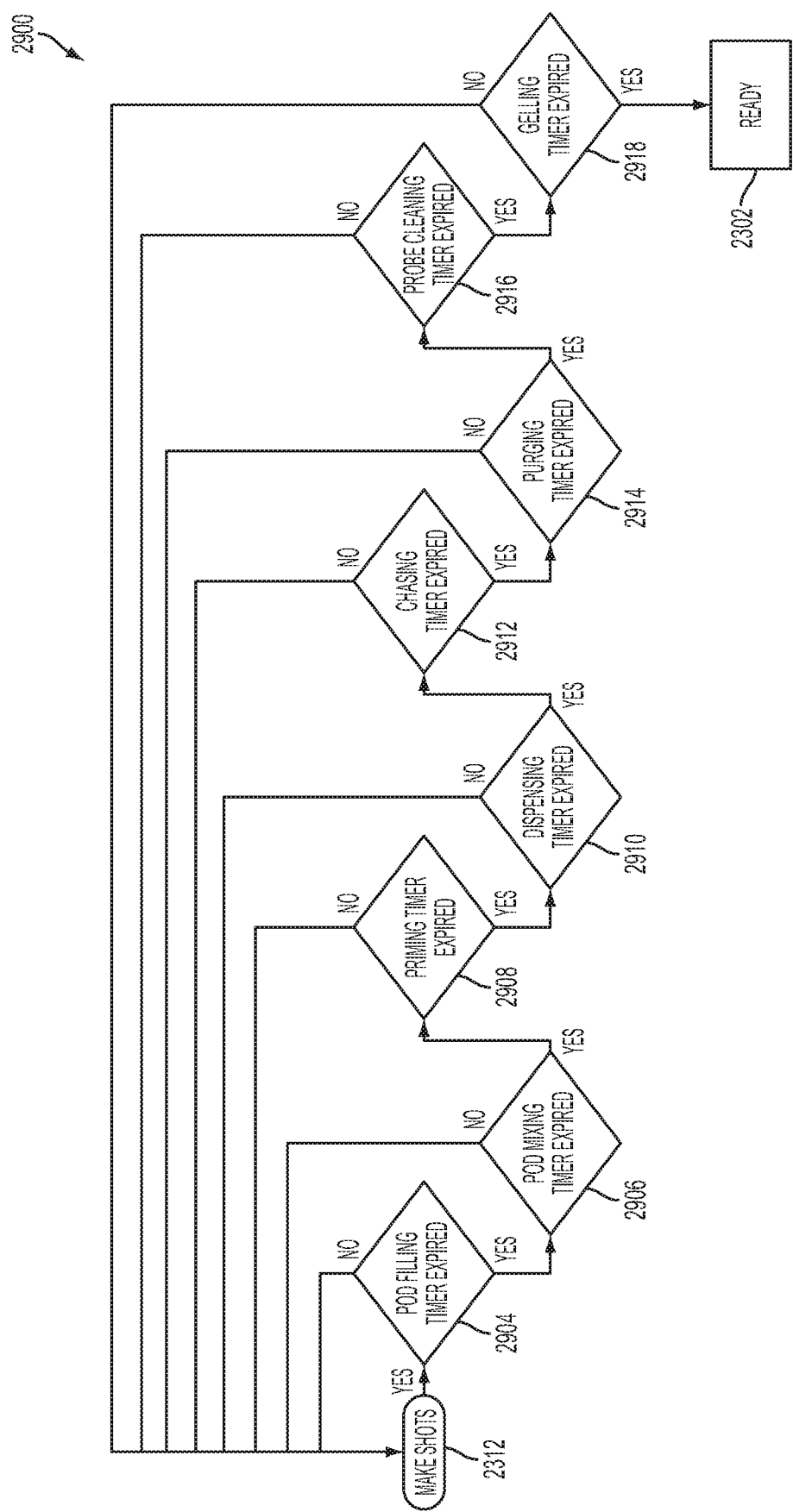

FIG. 29 shows a method 2900 executed during device operation in the make shots state 2312. Method 2900 may be executed by the controller while also running a shot making routine for the device (such as the shot making routine shown in FIGS. 34A-B). At 2904, the method includes determining if the pod filling timer (e.g., the time for filling the consumable pod with heated water via the needle of the pod receptacle) has expired. If no, the method returns and the controller may continue checking for the conditions of method 2900. If yes at 2904, the method continues to 2906 to determine if the pod mixing timer (e.g., the time for mixing the dry ingredients and the heated water inside the pod via rotating the pod acceptor) has expired. If yes at 2906, the method continues to 2908 to determine if the priming timer (e.g., time for extracting the mixed liquid gelatin mixture from the pod via the pod receptacle needle) has expired. If yes, the method continues to 2910 to determine if the dispensing timer (e.g., time for dispensing the mixed liquid gelatin mixture, cold water, and selected alcohol into cups arranged in the cup tray using the injection assembly of the device) has expired. If yes, the method continues to 2912 to determine if the chasing timer (e.g., time for flowing a small amount of alcohol through the device fluid lines, e.g., common fluid line 105) has expired. If yes, the method continues to 2914 to determine is the purging timer (e.g., time for purging all fluid from the fluid lines, pod receptacle needle, and injection assembly) has expired. If yes, the method continues to 2916 to determine if the probe (e.g., needle 1002 from FIG. 10) cleaning timer (e.g., time for cleaning the needle) has expired. If yes at 2916, the method continues to 2918 to determine if the gelling time (e.g., time for chilling and setting the gelatin based shots) has expired. If yes, the method proceeds to transition the device into the ready state 2302. As such, the device shot making cycle may be complete. If no at any of 2904-2918, the controller may continue to operate in the make shots state 2312 while continuously executing method 2900.

Figure 30:
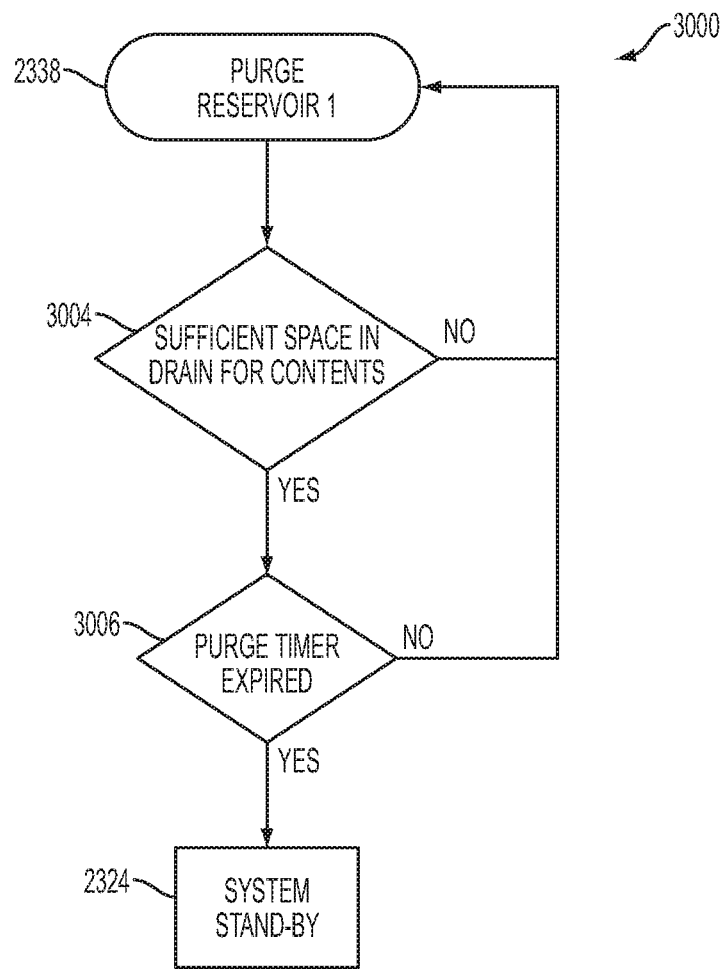

FIG. 30 shows a method 3000 executed during device operation in the purge primary (e.g., first) reservoir state 2338. Method 3000 may be executed by the controller while also running a purging routine for the device where all fluid within the primary reservoir may be purged out of the reservoir and into the waste drawer (e.g., waste drawer 902 from FIG. 9). At 3004, the method includes determining if there is sufficient space in the drain (e.g., waste drawer) for the contents of the primary reservoir. If not, the method returns and the controller may continue checking for when sufficient space is available. If yes at 3004, the method continues to 3006 to determine if the purge timer (e.g., a time for flowing all fluid in the primary reservoir out of the reservoir and into the waste drawer) has expired. If yes, the purging process may be complete and the method proceeds to transition the device into the system stand-by state 2324.

Figure 31:
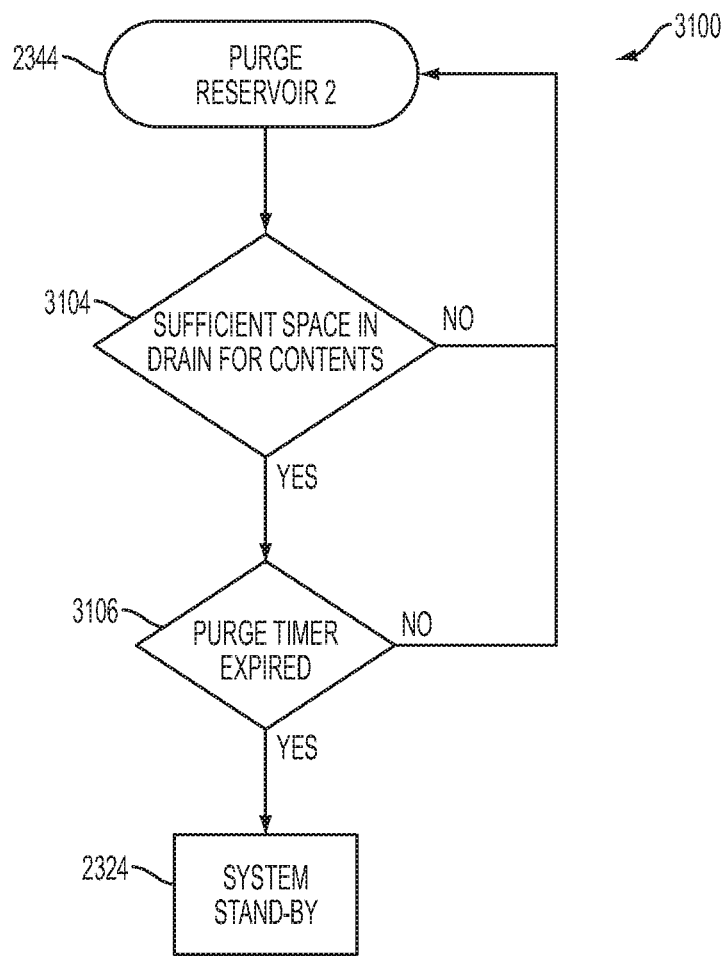

FIG. 31 shows a method 3100 executed during device operation in the purge secondary (e.g., second) reservoir state 2344. Method 3100 may be executed by the controller while also running a purging routine for the device where all fluid within the secondary reservoir may be purged out of the reservoir and into the waste drawer (e.g., waste drawer 902 from FIG. 9). At 3104, the method includes determining if there is sufficient space in the drain (e.g., waste drawer) for the contents of the secondary reservoir. If not, the method returns and the controller may continue checking for when sufficient space is available. If yes at 3104, the method continues to 3106 to determine if the purge timer (e.g., a time for flowing all fluid in the secondary reservoir out of the reservoir and into the waste drawer) has expired. If yes, the purging process may be complete and the method proceeds to transition the device into the system stand-by state 2324.

Figure 32:
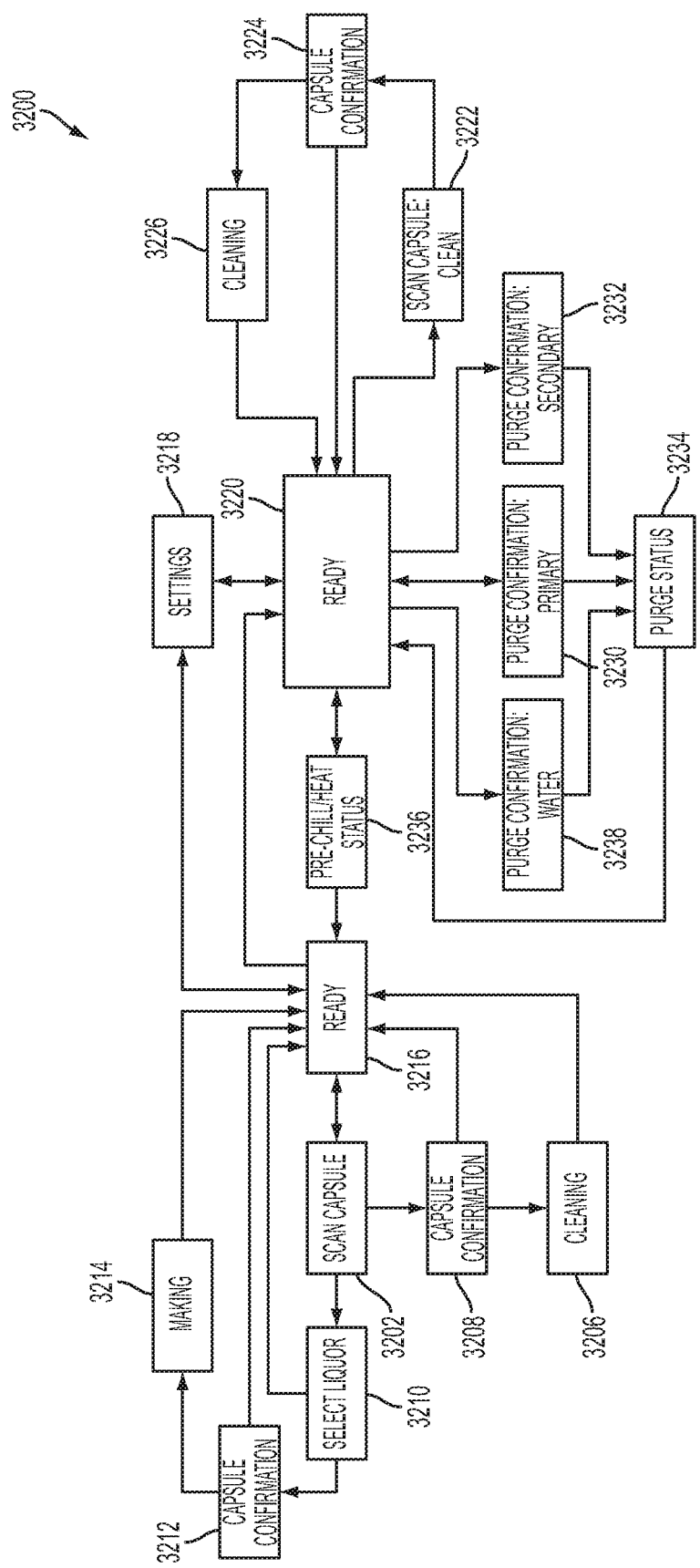
FIG. 32 shows a site-map diagram illustrating a site-flow as it relates to functionality of a device used to prepare a gelatin-based product.

FIG. 32 shows a site-map diagram 3200 showing a site-flow as is relates to functionality of the device 100. More specifically, the site-map diagram 3200 may show an example flow of the display screens that the controller may display via the user interface (e.g., user interface 104 from FIG. 1) during device operation. Thus, the site-map diagram 3200 may show an overview of the display screens that a user may see and/or interact with during operation of the device 100. The arrows of FIG. 32 show the flow of transitioning from a first display to a second display. Double arrows show that a user may transition back and forth between the connected displays. The controller may receive user selections during displaying a first display and in response, change the user interface to display a second display based on the selection. Thus, from one display, multiple different displays may be reached and the second display is based on a selection received at the controller. In another example, the controller may receive a user selection during displaying a first display and in response display a second display and subsequently a third display. Below is a description of the flow from one display to another display. However, it should be noted that transitioning from one display to the next may be based on user inputs received at the controller via a display of the user interface. Thus, instructions for controlling the user interface of the device and displaying the displays described above may be stored in a memory of the controller. Additionally, during displaying the different displays discussed below, the controller may be executing other routines. For example, during displaying a cleaning display 3226 the controller may be executing a cleaning routine for the device (which may include a method for cleaning the device and method 2800 described above). The methods performed while displaying the displays shown in FIG. 32 may include the methods shown in FIGS. 23-31. Further, the user interface displays shown in FIG. 32 may include the user interface displays described above with reference to FIGS. 21-22.

For example, from the standby display 3220, the controller may display a settings display 3218, a pre-chill/pre-heat status display 3236, a water reservoir purge confirmation display 3238, a primary reservoir purge confirmation display 3230, a secondary reservoir purge confirmation display 3232, and a scan cleaning capsule (e.g., pod) display 3222. From each of the water reservoir purge confirmation display 3238, the primary reservoir purge confirmation display 3230, and the secondary reservoir purge confirmation display 3232, the controller may display a purge status display 3234. From the scan cleaning capsule display 3222, the controller may display a capsule confirmation display 3224 and then a cleaning display 3226.

A system ready display 3216 may also be reachable from a plurality of other displays, as shown by the arrows in FIG. 32. Additionally, from the ready display 3216, the controller may display a scan capsule display 3202 and then a capsule confirmation display 3208 and cleaning display 3206. From the scan capsule display, the controller may display a select liquor display 3210 (which may include a plurality of alcohol selection buttons) and subsequently a capsule confirmation display 3212 and then a making display 3214

(where the controller may be executing the shot making method of FIG. 34A-B or 35A-B).

Figure 33:
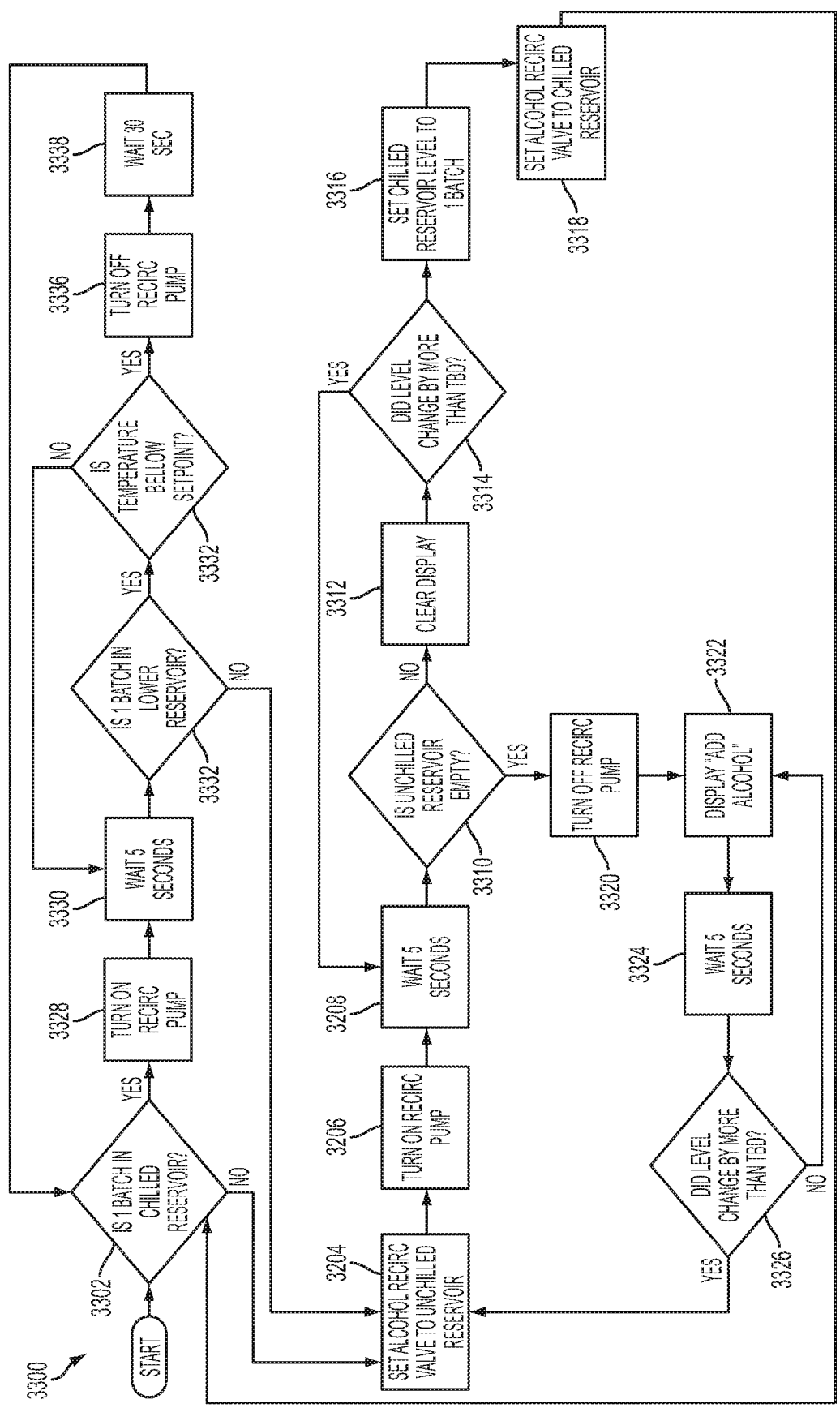
FIG. 33 shows a flow chart of a method for operating a device used to prepare a gelatin-based product.
Figure 34A:
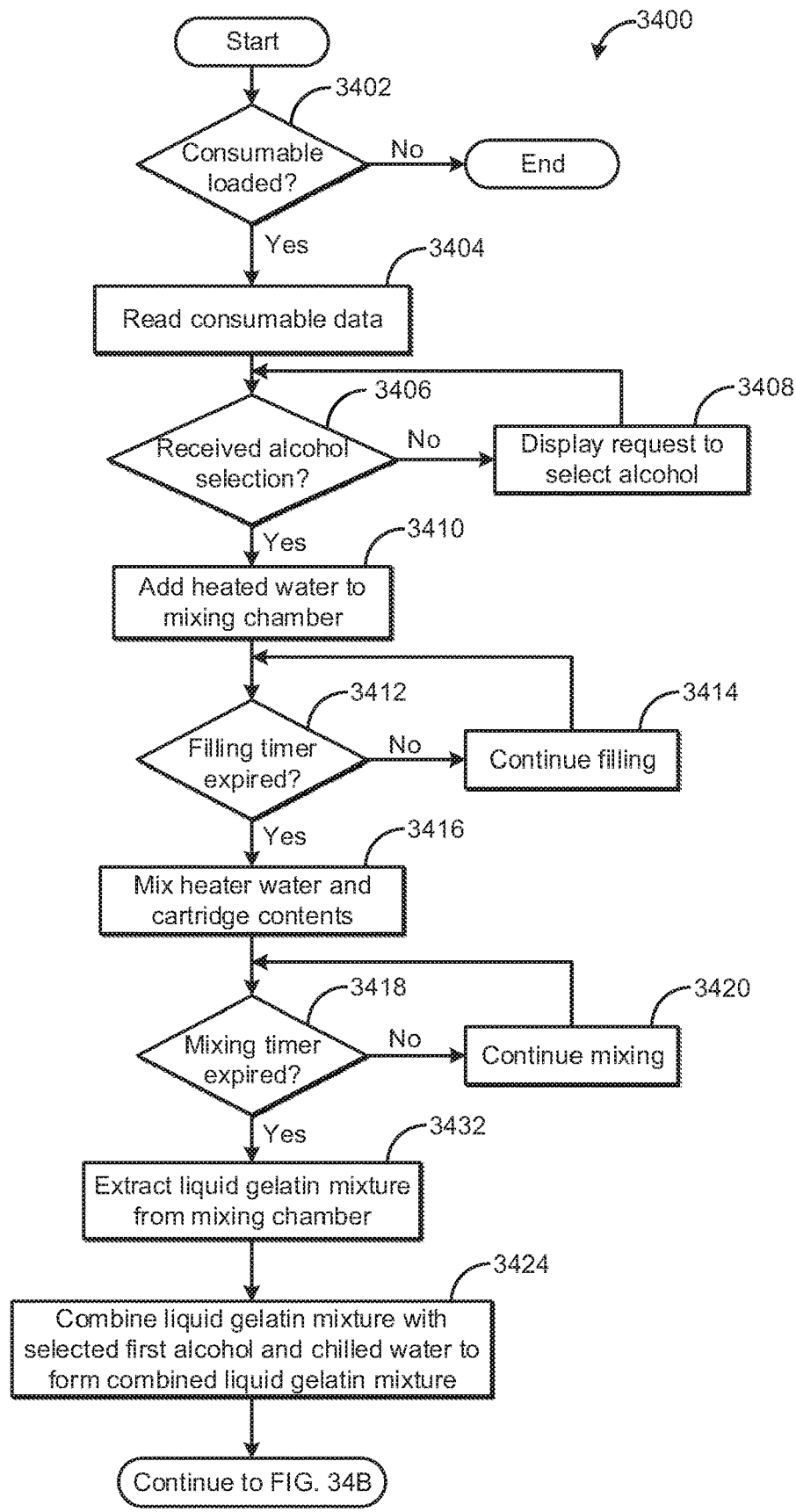
FIGS. 34A-B show a flow chart of a first embodiment of a method for preparing a gelatin-based product.
Figure 34B:
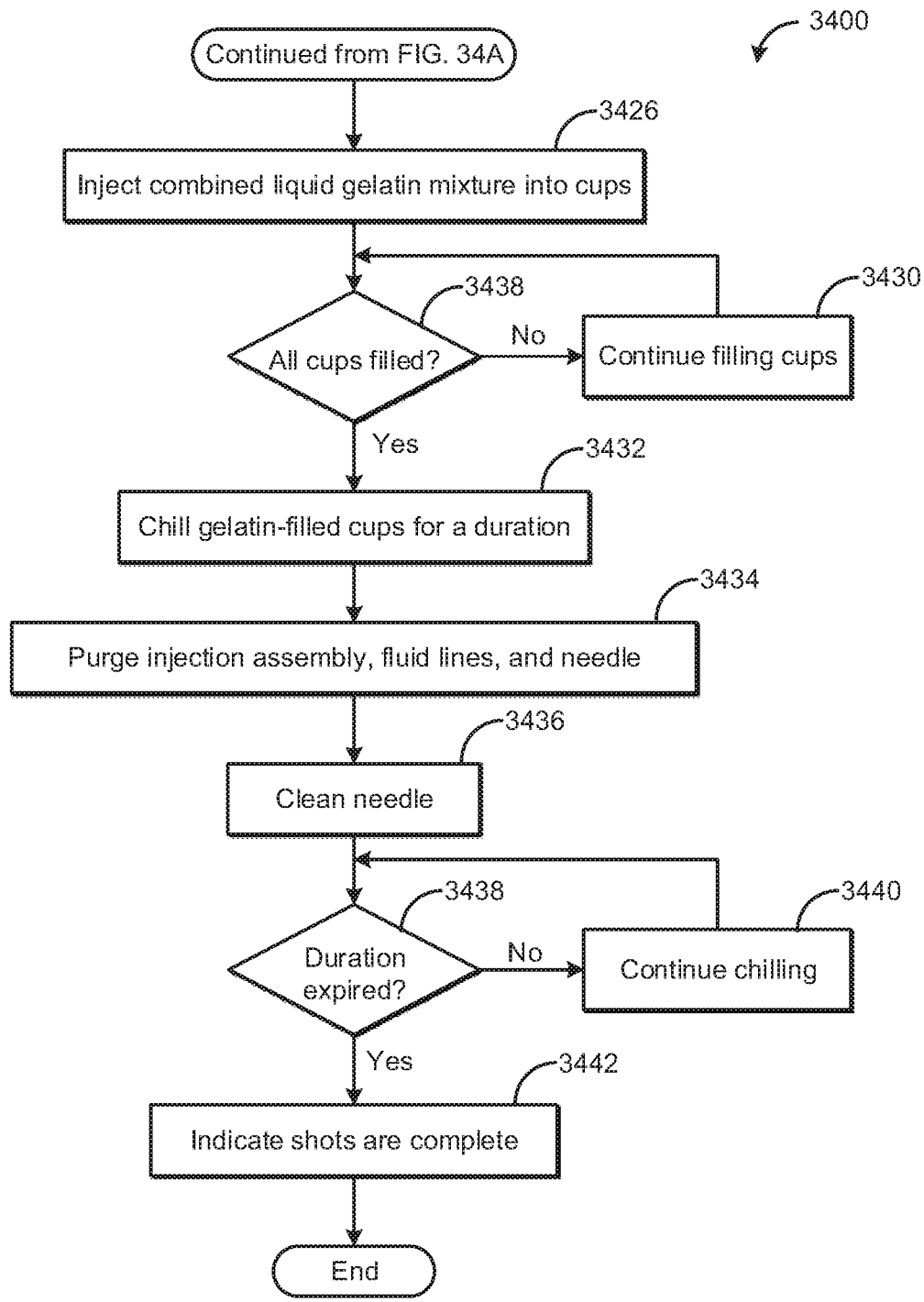

FIG. 33 shows one embodiment of a method 3300 for filling the alcohol reservoirs (e.g., first alcohol reservoir 120 and second alcohol reservoir 122) of the device 100. As discussed above, each of the reservoirs may have a front, un-chilled compartment and a back, chilled compartment fluidly coupled to the chiller module of the device. The front and back compartments are fluidly coupled to one another and one or more pumps (e.g., recirculation pumps) may control a flow of fluid between the front and back compartments (also referred to herein as the un-chilled and chilled reservoirs, respectively) of each reservoir. Thus, method 3300 may be run for one or each of the two alcohol reservoirs removable coupled to the device. Further, one batch as referred to in the flow chart of FIG. 33 may be an amount of alcohol needed to prepare one batch of gelatin-based or alcohol-only shots. More specifically, one batch in a reservoir may be an amount of alcohol needed to prepare a batch of shots from a single consumable cartridge (e.g., pod) loaded into the device.

Method 3300 begins at 3302 by determining if there is one batch (e.g., one batches worth of alcohol) within the chilled reservoir (e.g., primary compartments 364 and 368 from FIGS. 3A-3L of one of the primary or secondary alcohol reservoir). If yes, the method continues to 3328 to turn on a recirculation pump (e.g., recirculation pump 307 or 309 from FIGS. 3A-3L). After waiting approximately five seconds at 3330, the method continues to 3332 to determine if there is one batches worth of alcohol within the un-chilled (e.g., lower) reservoir (e.g., front compartment of one of the primary or secondary alcohol reservoir). If no, the method continues to 3304, as discussed further below. If yes at 3332, the method continues to 3334 to determine if the temperature of the alcohol within the chilled reservoir is below a threshold temperature (e.g., setpoint temperature). If no, the method returns to 3330. If yes at 3334, the method continues to 3336 to turn off the recirculation pump, wait approximately thirty seconds at 3338, and then return to 3302.

Returning to 3302, if there is not one batches worth of alcohol with the chilled reservoir, the method continues to 3304 to set an alcohol recirculation valve (e.g., alcohol recirculation valve 391 or 393 from FIGS. 3A-3L) to the un-chilled reservoir (so that alcohol may flow from the un-chilled reservoir and into the chilled reservoir). At 3306, the controller may turn on the recirculation pump and then wait approximately five seconds at 3308. At 3310, the method includes determining if the un-chilled reservoir is empty (or below a threshold level). If the un-chilled reservoir is empty, the controller may turn off the recirculation pump at 3320, display a request to add alcohol to the selected reservoir at 3322, and then wait for a duration (e.g., approximately five seconds) at 3324. At 3326, the method includes determining if a level of the front compartment of the reservoir (e.g., un-chilled reservoir) changed more than a threshold amount. If not, the method returns to 3322. If yes at 3326, the method returns to 3304.

Returning to 3310, if the un-chilled reservoir is not empty, the method continues to 3312 to clear a display of the user interface (e.g., clear a display requesting that the user fill the alcohol reservoir). At 3314, the method includes determining if the alcohol level within the reservoir changed by more than a threshold amount. If no, the method returns to 3208. If yes at 3314, the method continues to 3316 to set the chilled reservoir level to one batch and then set the alcohol recirculation valve to the chilled reservoir at 3318 (so that chilled alcohol may be pumped from the chilled reservoir and to the injection system during the shot making process.

Turning now to FIG. 34, a method 3400 is shown for preparing gelatin-based shots. Specifically, method 3400 shows a method for preparing a gelatin-based product (e.g., shots) using a device, such as device 100 shown in FIG. 1 and FIGS. 3-20. Further method 3400 may continue from, be part of, or at least partially include the methods shown in FIGS. 21-33, as described above. As described above, the gelatin based product may be a formed gelatin product including alcohol and referred to herein as a "shot". In other examples, the gelatin based product may not include alcohol. The gelatin-based shot may be formed in a cup or alternative container positioned within the shot-making device, as described above. In one example, instructions for executing method 3400 may be stored on a memory of a controller, such as controller 106 shown in FIGS. 1-2. As such, the controller may execute method 3400 in order to operate the device 100 and prepare the gelatin-based shots.

Method 3400 begins at 3402 by determining if a consumable (e.g., consumable cartridge or pod 108 shown in FIGS. 1-2) has been loaded into the device 100. As discussed above, the consumable cartridge (e.g., pod) may include an indicator, identifier tag, or other electronic label (e.g., microchip) readable by the controller. Upon loading a specific consumable cartridge into the device, the controller may determine that the consumable cartridge is coupled to the device. For example, upon inserting a consumable cartridge into a pod acceptor of a pod receptacle (e.g., pod acceptor 107 of pod receptacle 704 shown in FIGS. 7, and 9-13, the controller may receive a signal that the consumable pod has been loaded into the device. If the consumable cartridge is loaded, the method continues on to 3404 to read the consumable data from the consumable cartridge. The method at 3404 may include reading the identifier tag on a side of the consumable cartridge. The identifier tag may include information such as the volume of the consumable cartridge, the contents of the consumable cartridge (e.g., flavor), date of manufacture, use by date, and/or the manufacturer. In another example, the identifier tag may provide a way of authenticating the type and manufacturer of the consumable cartridge.

At 3406, the method includes determining if the controller has received an alcohol selection from a user via the user interface of the device. If the alcohol selection has not been received, the method may display a request via the user interface display of the device to select an alcohol at 3408. In one example, the device may display a list of available alcohol selections based on the alcohol reservoirs loaded into the device. In this way, selection of a first alcohol may result in a signal sent to the controller of the device corresponding to a selected alcohol (e.g., liquid) reservoir containing the first alcohol.

Once the controller receives the alcohol selection (e.g., via a user input through the user interface), the method continues on to 3410 to add heated water to the mixing chamber of the device. Specifically, the method at 3410 may include flowing a first volume of water at an upper threshold temperature into the mixing chamber. As one example, the upper threshold temperature may be greater than warm temperature and warm enough to dissolve dry ingredients within the mixing chamber. In one example, the consumable cartridge may be a pod, as disclosed above, and the pod may form the mixing chamber. As such, the heated water may be delivered to the pod via a needle (e.g., probe) inserted through a top of the pod and into an interior of the pod.

At 3412, the method includes determining if a filling timer has expired. In one example, the filling timer may be a pod filling timer. A duration of the filling timer may be based on the first volume of heated water and a flow rate of a pump pumping heated water from the heated water reservoir and to the pod. If the filling timer has not expired, the method continues to 3414 to continue filling the mixing chamber (e.g., pod) with the heated water. Otherwise, if the filling timer has expired, the method continues on to 3416 to mix the heated water and the gelatin-based product disposed within the consumable cartridge. In one example, the mixing at 3416 includes rotating the mixing chamber to mix the heated water with the gelatin-based product disposed inside the consumable cartridge to form a liquid gelatin mixture. In the embodiment where the consumable cartridge forms the mixing chamber (one example may be the above described pod) and rotating the mixing chamber includes rotating the consumable cartridge according to a pre-determined agitation profile for a second duration. For example, the controller may rotate a pod acceptor which holds the consumable cartridge via a stepper motor. In one example, the rotating may include rotating the pod acceptor back and forth at a rotation angle less than 360 degrees, without continuously and repeatedly rotating the pod acceptor by 360 degrees. Further, as described above, a pod may include internal fins positioned along internal sides of the pod to facilitate the mixing and dissolving of the pod dry ingredients with the heated water.

At 3418, the method includes determining if the mixing timer has expired. In one example, the controller may rotate the pod acceptor to mix the contents of the mixing chamber (e.g., pod) for a per-determined amount of time. The pre-determined amount of time may be a total duration for the agitation profile. If the mixing timer has not expired, thereby indicating that mixing is not complete, the method continues on to 3420 to continue mixing (e.g., by continuing to rotate the mixing chamber). Once the mixing timer expires, the method continues on to 3422 to extract the mixed liquid gelatin mixture from the mixing chamber. In one embodiment, where the consumable cartridge (or pod) forms the mixing chamber, the method at 3422 may include extracting the liquid gelatin mixture from the consumable cartridge via the needle inserted into the top of the cartridge. The method then continues on to 3424 to combine the liquid gelatin mixture with the selected first alcohol and chilled water to form a combined liquid gelatin mixture. For example, the method at 3424 may include flowing (e.g., pump-assisted flow) the liquid gelatin mixture, a pre-determined amount of the first alcohol, and a pre-determined amount of chilled water and combining the three fluids at a junction upstream of an injection assembly (e.g., such as at a valve).

The method proceeds to 3426 to inject the combined liquid gelatin mixture into a plurality of cups. As described above, the plurality of cups may be positioned within a tray, the tray removably coupled to a slideable drawer of the device. Additionally, the injecting may be performed with an injection assembly, such as injection assembly. In one example, the injection assembly may include a nozzle, such as nozzle 130 shown in FIG. 1. Injecting the combined liquid gelatin mixture into the plurality of cups may include translating the injection assembly to inject a volume of fluid into each of the plurality of cups. In another example, the injection assembly may be injection assembly 129 shown in FIGS. 1-2. In this embodiment, injecting the liquid gelatin mixture into the plurality of cups may include translating the injection assembly along a single axis to inject the combined liquid gelatin mixture into each of the plurality of cups. For example, injecting the liquid in this way may include positioning a bar including a plurality of dispensing ports (e.g., nozzles 130 from FIG. 1) over a first row of cups such that each dispensing port is positioned over a single cup of the first row. The injecting then includes translating the assembly from the first row to a next, second row of cups and dispensing a pre-determined amount of the combined liquid gelatin mixture into each cup. In this way, the injecting may include concurrently injecting the combined liquid gelatin mixture into multiple cups arranged in a row.

At 3428 the method includes determining if all the cups within the cup array (or cup tray) have been filled. If all the cups have not been filled, the method continues to 3430 to continue injecting and filling the cups. Otherwise, if all the cups have been filled, the method continues to 3432 to chill the plurality of gelatin-filled cups for a duration. Chilling may include transferring heat from the cups and cup tray via the chiller module (e.g., chiller module 110 shown in FIGS. 1-3) disposed vertically below the cup tray.

The method at 3434 includes purging all fluid from the injection assembly, fluid lines, and/or needle (e.g., needle of the pod receptacle) of the device and into a waste drawer of the device. In one example, method 3434 may occur during the chilling at 3432 and directly following injecting the combined liquid gelatin mixture into all of the cups. The method at 3436 includes further cleaning the needle of the pod receptacle.

At 3438, the method includes determining if the chilling duration has expired (e.g., determining if a chilling timer has expired). If the chilling timer has not expired, the method continues to 3440 to continue chilling. Once the chilling duration is complete, the method proceeds to 3442 to indicate that the gelatin-based shots in the cups are complete. The indicating may include displaying a visual indicating on the display screen (e.g., user interface 104 from FIG. 1) of the device and/or emitting an audible signal indicating the shots are complete and ready for consumption.

It should be noted that method 3400 may include additional timers for each step in the method, as shown at FIG. 29.

Figure 35A:
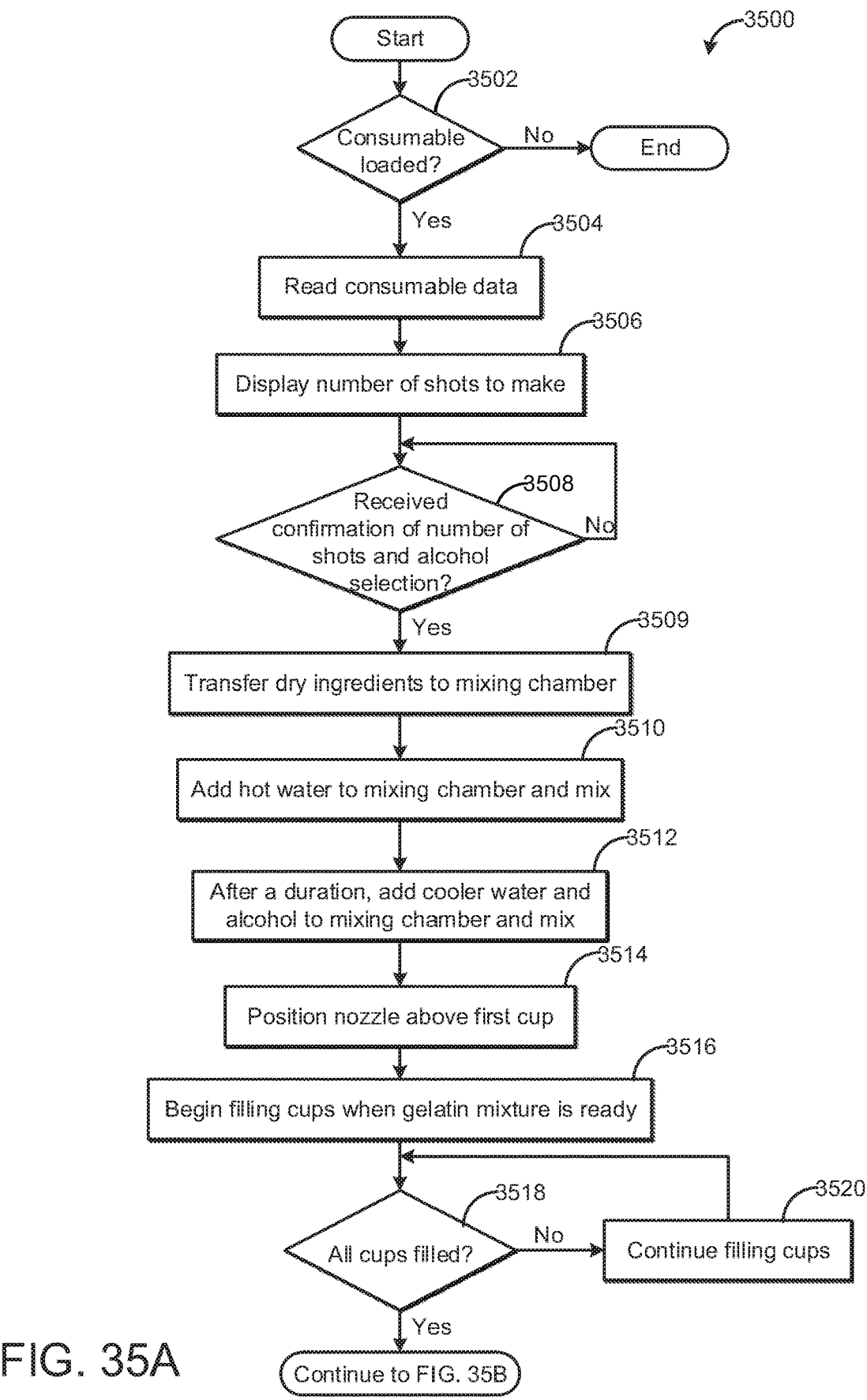
FIGS. 35A-B show a flow chart of a second embodiment of a method for preparing a gelatin-based product.
Figure 35B:
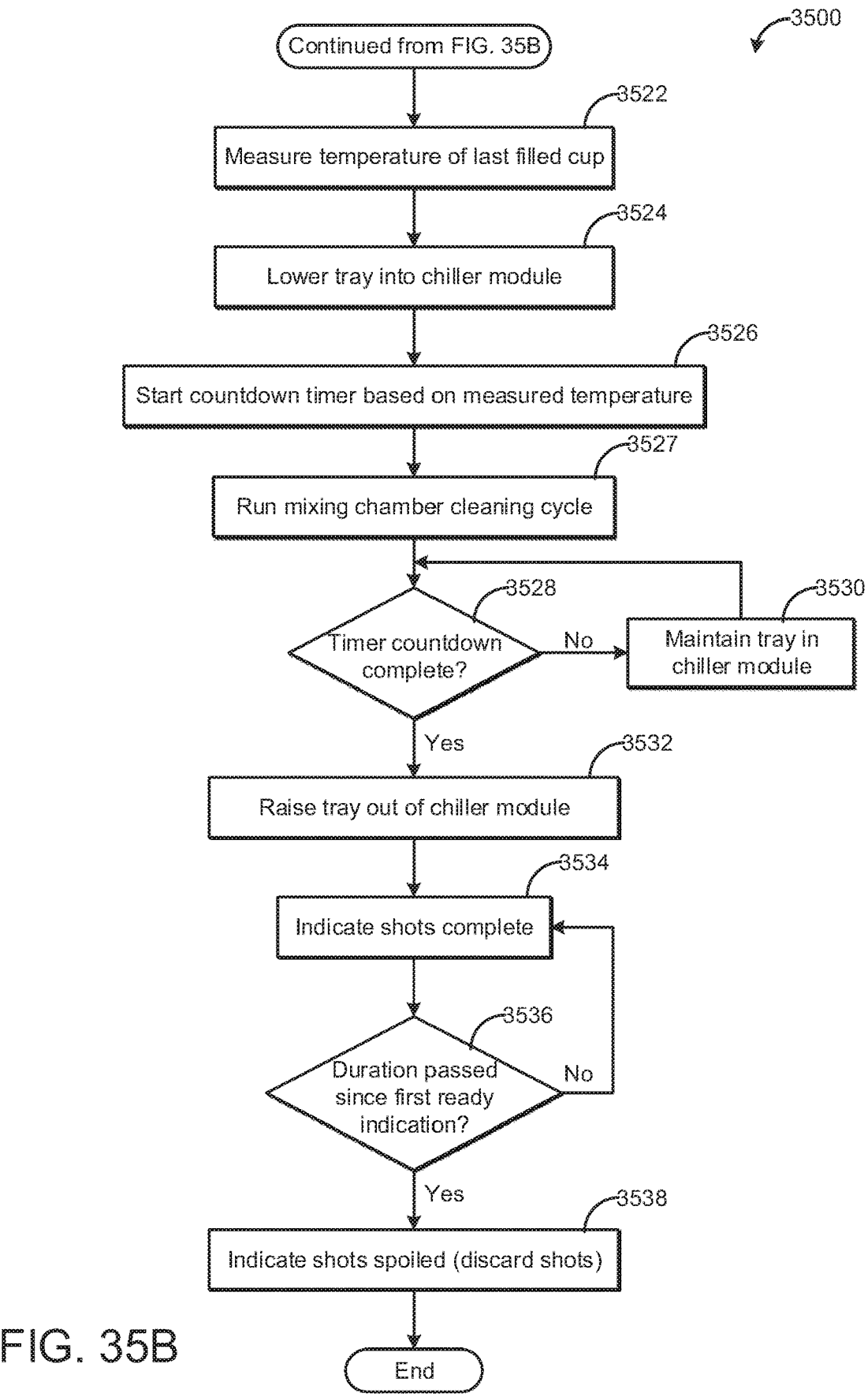

FIGS. 35A-B show an embodiment of another possible method 3500 for preparing the gelatin-based product. Specifically, method 3500 shows a method for preparing a gelatin-based product using the device 100 shown in FIG. 2. In one example, the gelatin based product may be a formed gelatin product including alcohol and referred to herein as a "shot". In other examples, the gelatin based product may not include alcohol. The gelatin-based shot may be formed in a cup or alternative container positioned within the shot-making device. In one example, instructions for executing method 3500 may be stored on a memory of a controller, such as controller 106 shown in FIG. 2. As such, the controller may execute method 3500 in order to operate the device 100 and prepare the gelatin-based shots.

Method 3500 begins at 3502 by determining if a consumable (e.g., consumable cartridge 108 shown in FIG. 1) has been loaded into the device 100. As discussed above, the consumable cartridge may include an indicator, identifier tag, or other electronic label (e.g., microchip) readable by the controller. Upon loading a specific consumable cartridge into the device, the controller may determine that the consumable cartridge is coupled to the device. For example, upon snapping a valve of the consumable cartridge into a complementary coupler of the device (e.g., cartridge receiving portion), the controller may receive a signal that the consumable cartridge has been loaded into the device. If the consumable cartridge is loaded, the method continues on to 3504 to read the consumable data from the consumable cartridge. The method at 3504 may include reading the identifier tag on the valve of the consumable cartridge. The identifier tag may include information such as the volume of the consumable cartridge and the corresponding number of shots to be made with the consumable cartridge (e.g., 10 or 20). In other examples, the identifier tag may include additional information such as the contents of the consumable pouch (e.g., flavor), date of manufacture, use by date, and/or the manufacturer.

At 3506, the method includes displaying the number of shots to make on the user interface of the device (e.g., user interface 104 shown in FIG. 1). The number of shots to make is based on the consumable data read from the consumable cartridge. For example, if the consumable cartridge is a cartridge containing enough dry ingredients to make 20 1.5 ounce shots, the number displayed at 3506 is 20. Alternatively, if the consumable cartridge contains enough dry ingredients to make 10 1.5 ounce shots, the number displayed at 3506 is 10. In other embodiments, other numbers of shots other than 10 or 20 may be possible and displayed on the user interface.

At 3508, the method includes determining if the controller has received confirmation of the number of shots and an alcohol selection. If confirmation of the number of shots or the alcohol selection has not been received, the method circles back until both selections are received by the controller. Once the confirmation of the displayed number of shots and the alcohol selection have been received (e.g., via a user input through the user interface) by the controller, the method continues on to 3509 to transfer the dry ingredients from the consumable cartridge and into the mixing chamber 178. The method then continues on to add liquids to the mixing chamber. First, at 3510, heated water is added to the mixing chamber. Specifically, at 3510 a first volume of water at approximately 212° F. is metered into the mixing chamber and subsequently mixed with the dry ingredients using the mixing blade. In other examples, the first volume of water may be at another temperature; however, the water may still be heated warmer than room temperature. The first volume of water may be based on the volume of the consumable cartridge and the amount of dry ingredients within the consumable cartridge (and transferred to the mixing chamber). For example, the first volume of water may correspond to the amount of water needed to dissolve the dry ingredients completely within the mixing chamber. In one example, the first volume of water may be in a range of approximately 4-8 ounces for a consumable cartridge containing dry ingredients to make 20 shots. The method at 3510 may include adjusting one or more of a valve or a pump controlling the flow of heated water from the water reservoir and to the mixing chamber. For example, the controller may adjust the valve and/or the pump to deliver the first volume of heated water to the mixing chamber.

After a first duration of mixing (e.g., a duration after adding the hot water), cooler water and alcohol are added to the mixing chamber at 3512. Specifically, at 3512 a second volume of cooler water and a third volume of alcohol may be metered into the mixing chamber. In one example, the second volume and the third volume may be substantially equal. In another example, the second volume and the third volume may not be equal. The first volume, the second volume, and the third volume may all equal a total volume based on the number of shots to be made and the amount of dry ingredients transferred from the consumable cartridge to the mixing chamber. For example, the total volume may be 30 ounces if the consumable cartridge makes 20 shots. In another example, the total volume may be 15 ounces if the consumable cartridge makes 10 shots. The method at 3512 may include adjusting one or more of a first valve and/or a first pump controlling the flow of cooler water from the water reservoir to the mixing chamber. The method at 3512 may also include adjusting one or more of a second valve and/or a second pump controlling the flow of alcohol from an alcohol reservoir to the mixing chamber. As shown in FIG. 1, the device may include more than one alcohol reservoir. The method at 3512 may include determining the required alcohol reservoir based on the alcohol selection. The valve and pump corresponding to the selected type of alcohol and corresponding alcohol reservoir may then be adjusted to deliver the third volume to the mixing chamber. In some embodiments, only one type of alcohol from only one reservoir may be delivered to the mixing chamber. In other embodiments, alcohol from more than one alcohol reservoir may be delivered to the mixing chamber to make up the third volume. In one example, different alcohols from different alcohol reservoirs may be delivered to the mixing chamber. In another example, the same alcohol from different alcohol reservoirs may be delivered to the mixing chamber (e.g., two alcohol containers may contain the same type of alcohol).

The method at 3512 further includes mixing the contents of the mixing chamber using the mixing blade. Mixing may include rotating the mixing blade about a central axis of the mixing chamber at a set rotational speed. The mixing may further include rotating the mixing blade for a second duration. The second duration may be based on an amount of time required for complete mixing of the dry ingredients and liquids. In another example, the second duration may be additionally or alternatively based on a time for the ingredients to set before injecting.

At 3514, the controller positions the nozzle (via the x-y motion control assembly) above the first cup (e.g., fluid vessel). For example, the method at 3514 may include translating the nozzle such that the nozzle is vertically aligned with the first slot of the tray holding the first cup. After all the liquids have been added to the mixing chamber and the second duration for mixing has passed, the method continues on to 3516 to begin filling the cups in the carousel with the liquid gelatin mixture. Filling the cups includes injecting each cup with a volume of fluid from the mixing chamber and through the nozzle. The nozzle may control the amount of fluid injecting into each cup. In one example, the volume of fluid may be approximately 1.5 ounces. In another example, the volume of fluid may be more or less than 1.5 ounces.

At 3518, the method includes determining if all the cups (e.g., 12 or 24 depending on consumable cartridge) have been filled. If all the cups have not been filled, the method continues on to 3520 to continue filling the unfilled cups. In one example, after filling a first cup, the controller may translate the nozzle via the x-y motion control assembly in a first direction (e.g., horizontal or lateral) until all the cups in that row are filled. The nozzle may then translate in a second direction, opposite the first in order to fill a cup on an adjacent row. In this way, the nozzle may fill the cups row by row or column by column, sequentially until all the cups are filled. Once all the cups are filled, the method continues on to 3522 shown in FIG. 35B. At 3522, the controller measures the temperature of the last cup. As described above, the carousel may include a temperature sensor integrated into the slot corresponding to the last cup (e.g., the last filled cup).

The method then continues on to 3524 to vertically lower the carousel (with the filled cups) into the chiller module. At 3526, the controller starts a countdown timer based on the temperature measured at 3522. At 3527, the controller may run a mixing chamber cleaning cycle. For example, after all the liquid has been dispensed into the cups, the controller may activate a quick clean/rinse cycle where the mixing chamber and tubes (e.g., fluid lines) are cleaned in less than 30 seconds. In another example, the cleaning cycle may be 30 seconds or more. In one example, the cleaning cycle may include injecting the mixing chamber with heated water and/or a cleaning solution, mixing with the mixing blade, and then draining the water or cleaning solution from the mixing chamber. The mixing chamber may be removed from the device at an end of a use period (e.g., end of the day) for a more thorough cleaning. The method at 3527 may occur concurrently with the methods at steps 3522-3526.

At 3528, the method includes determining if the timer countdown is complete. If the timer countdown is not complete, the method continues on to 3530 to maintain the tray in the chiller module. However, if the timer countdown is complete at 3528, the method continues on to 3532 to raise the tray out of the chiller module. Specifically, the method at 3528 may include vertically moving the tray out of the chiller module and back in front of a door positioned vertically above the chiller module and in a front face of the device.

At 3534, the method includes indicating that the shots are complete. In one example, the method at 3534 may include indicating the shots are complete via an indicator light located on the user interface or outside of the device. In another example, the method at 3534 may include indicating the shots are complete via displaying a "shots are complete are ready" message (or similar message) on the user interface. At 3536, the method includes determining if a duration has passed since the first ready indication. The duration may be based on a period of time for which the shots are good and may be consumed. After the duration, the shots may become bad and inedible. As such, the duration may be an expiration duration. If the duration has not passed, the shots ready (or complete) indicator may remain on the user interface. However, if the duration has passed, the method continues on to 3538 to instead indicate the shots have spoiled and the user should discard the shots. In one example, the method at 3538 may include removing the shots complete indicating and instead displaying a "shots spoiled" or "discard shots" warning on the user interface. An alternative indicator such as a light or warning symbol may also be used to indicate the shots have spoiled.

In some embodiments, the device may be used to produce individual servings of gelatin-based food products that do not contain alcohol. As such, in some examples, the device may not contain any alcohol reservoirs. In this embodiment, the method at 3512 may include adding only cooler water to the mixing chamber. As such, the second volume of cooler water may be greater than when the third volume of alcohol is also being injected into the mixing chamber. In this embodiment, the first volume of heated water and the second volume of cooler water may equal the total volume of water required to make the number of shots for the amount of dry ingredients in the consumable cartridge. Further, in this embodiment, the user may not select a type of alcohol and may instead select "water only" or "no alcohol" or some other selection indicating that the gelatin-based shots to be produced contain water only and do not contain alcohol. In some examples, this embodiment may be used in facilities such as hospitals, physician offices, assisted living facilities, retirement facilities, etc.

In another embodiment, the device 100 shown in FIGS. 1 and 3-8 may not include a chiller module 110. For example, a remote chiller module, similar to the chiller module 110 described above with reference to FIGS. 1-8 may be located exterior to the device 100 and not within the device 100. As such, the cup tray 114 may not be lowered after filling the cups with the liquid gelatin mixture. Instead, the filled cups may be removed from the device via the slideable cup tray 114 and door 113. As described above, the tray 114 holding the cups may be removable. The tray 114 may then be removed from the device and inserted into the remote chiller module in order to set the shots. For example, the remote chiller module may be positioned in close proximity to (e.g., next to) the device 100 such that the liquid shots may be quickly transferred from the device 100 and into the remote chiller module.

As discussed earlier in FIG. 1, in some embodiments, the device 100 may not include the chiller module 100, and the chiller module may be positioned external to the device 100. In such embodiments of the device 100, the shot-making process for the device 100 may proceed similarly to the methods 3400 and 3500 described above with reference to FIGS. 34A-35B. However, after filling the cups at step 3438 in method 3400 and 3518 in method 3500, the method may further include removing the constituent tray 187 and cups 186 from the device 100. The constituent tray 187 may then be inserted into the remote chiller module. A timer for setting the shots may be set as described above. After removing constituent tray 187 and cups 186 containing the shots from the device 100, the methods 3400 and 3500 may continue on to 3434 and 3527 respectively. After chilling the shots in the remote chiller module, the constituent tray 187 may be returned to the device 100.

In this way, gelatin-based shots may be prepared automatically using a shot-making device, such as the device described above with regard to FIGS. 1-20. Upon loading a consumable cartridge into the device, a controller of the device may determine the flavor, manufactures, and type of consumable cartridge based on an electronic identifier on the consumable cartridge. Based on the consumable data received from the electronic identifier, the device may add the required amount of heated water to a mixing chamber containing the dry ingredients. As one example, the consumable cartridge and a pod acceptor of a pod receptacle of the device may form the mixing chamber. The mixed liquid gelatin mixture from the mixing chamber may then be combined with required amounts of pre-chilled water and alcohol. The alcohol may be selected by the user via a user interface from a series of types of alcohol positioned within the device. A translatable nozzle (e.g., injection assembly) may automatically fill individual serving cups positioned within slots of a cup tray, the tray positioned within a slideable shot drawer of the device. After filling each of the cups, the chiller module may chill and set the shots over a duration. A user may remove the shots by sliding the shot drawer and tray out of the device after the chilling process. In this way, a technical effect of quickly making gelatin based shots is achieved. The shot-making device and process is automated, easy to use, and reduces a time required to prepare and chill gelatin-based shots. As a result, gelatin-based shots may be produced more easily and efficiently, saving a user's time and money. Additionally, since all the shot-making components may be contained within a single device, gelatin based shots may be made with increased precision and a reduced likelihood of contamination.

As one embodiment, a device for preparing a gelatin-based product comprises: a mixing chamber; a first liquid reservoir fluidly coupled to the mixing chamber; a chiller module; a slideable tray including a number of slots for receiving a number of fluid vessels; and an injection assembly fluidly coupled to the mixing chamber and positioned vertically above the tray. The device may further comprise a pod receptacle adapted to receive a removable consumable pod, the pod receptacle including a pod acceptor coupled to a motor, a pod receptacle door including a needle coupled to an interior surface of the door. As one example, the mixing chamber is formed by the removable consumable pod. The device may further comprise a water heater fluidly coupled to the needle of the pod receptacle. Additionally, the device may comprise a user interface and a controller, the controller adapted to receive signals from a plurality of sensors of the device, receive user inputs via the user interface, and send signals to a plurality of actuators of the device according to instructions stored on a memory of the controller and the received signals and user inputs. In one example, the injection assembly is movable across a length of the tray. The chiller module may include an interior cavity containing water, a plurality of coolant tubes flowing coolant therethrough and positioned in the interior cavity, a pump extending into the interior cavity and adapted to circulate water through the interior cavity, and a plate coupled to a top of the interior cavity, a bottom surface of the plate including a plurality of pucks extending into the interior cavity. The device may further comprise a cold water reservoir fluidly coupled to an external water supply, fluid lines flowing through the chiller module, and the injection assembly. Further, the device may comprise a liquid reservoir receptacle comprising: a first slot removably coupled to a first liquid reservoir; a second slot removably coupled to a second liquid reservoir, the first liquid reservoir and second liquid reservoir fluidly coupled to the chiller module via corresponding valve interfaces of the liquid reservoir receptacle; and a slideable shot drawer movable into and out of an interior of the device, the shot drawer disposed vertically above the chiller module and including a plurality of apertures arranged in an array on a top surface of the shot drawer. The tray may be removably coupled to the top surface of the shot drawer and the plurality of apertures may align with the number of slots of the tray.

As another embodiment, a method for preparing a gelatin-based product comprises: receiving data from a consumable cartridge pre-loaded into a device; adding one or more liquids to a mixing chamber of the device based on the data to form a liquid gelatin mixture; injecting the liquid gelatin mixture into a plurality of cups with an injection assembly of the device; chilling the plurality of gelatin-filled cups for a first duration; and indicating the plurality of gelatin-filled cups are complete after the first duration. In one example, adding one or more liquids to the mixing chamber includes flowing a pre-determined amount of heated water from a hot water reservoir to the mixing chamber through a needle inserted into an interior of the mixing chamber. The method may further comprise rotating the mixing chamber to mix the one or more liquids with a gelatin-based product disposed inside the consumable cartridge to form the liquid gelatin mixture. As one example, the consumable cartridge forms the mixing chamber and rotating the mixing chamber includes rotating the consumable cartridge according to a pre-determined agitation profile for a second duration.

Additionally, the method may comprise receiving an alcohol selection of a first alcohol at controller of the device via a user interface. Further, the method may comprise extracting the liquid gelatin mixture from the mixing chamber and combining the liquid gelatin mixture with the first alcohol and chilled water to form a combined liquid gelatin mixture. Injecting the liquid gelatin mixture into the plurality of cups may include translating the injection assembly along a single axis to inject the combined liquid gelatin mixture into the plurality of cups.

The plurality of cups may be positioned within a tray, the tray removably coupled to a slideable drawer of the device, and injecting the liquid gelatin mixture into the plurality of cups may include translating the injection assembly to inject a volume of fluid into each of the plurality of cups. The method may further comprise, following the injecting, purging all fluid from the injection assembly and fluid lines of the device and into a waste drawer of the device. Additionally, the injection assembly may include a nozzle and the data may include consumable data, the consumable data including one or more of a number of shots to be made from the consumable cartridge, a flavor of contents within the consumable cartridge, an expiration date of the contents within the consumable cartridge, or a manufacturer of the consumable cartridge. In another example, the data may include data indicating the pod is a cleaning pod and in response to the data, activating a cleaning cycle of the device.

As yet another embodiment, a device for preparing a gelatin-based product comprises: a pod receptacle adapted to receive a removable pod, the pod receptacle including: a pod acceptor coupled to a motor; a pod receptacle door including a needle coupled to an interior surface of the door; and a scanning device. In one example, the pod receptacle door further includes a mirror coupled to the interior surface of the door, where the mirror is angled relative to the interior surface of the door and at least partly faces the scanning device. The pod acceptor may further comprise a cylindrical cavity including a plurality of fins projecting outwardly from an interior surface of the cylindrical cavity. Additionally, the needle may be coupled to the interior surface of the door through a hinged joint and the needle may extend into an interior of the pod acceptor when the pod receptacle door is closed. As one example, the pod acceptor is rotatable in two directions about a center axis of the pod acceptor and wherein the motor is a stepper motor.

In another representation, a method for preparing a gelatin-based product comprises: receiving data from a pod pre-loaded into a rotatable pod acceptor of a device; receiving an input selection of a first liquid via a user interface of the device; injecting a second liquid into the pod; rotating the pod according to a pre-determined agitation profile via the pod acceptor to mix contents of the pod with the second liquid to create a dissolved mixture; extracting the dissolved mixture from the pod and combining the dissolved mixture with the first liquid and a third liquid upstream of an injection assembly to form a combined gelatin-based mixture; injecting the combined gelatin-based mixture with the injection assembly into a plurality of cups arranged in array on a tray, the tray removably coupled to a slideable drawer of the device; chilling the plurality of cups containing the combined gelatin-based mixture for a duration; and after expiration of the duration, indicating the plurality of cups containing the gelatin-based mixture are complete.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for preparing a gelatin-based product, comprising:
   receiving data from a consumable pod pre-loaded into a device;
   adding one or more liquids from a liquid reservoir of the device to a mixing chamber of the device based on the received data to form a liquid gelatin mixture;
   injecting the liquid gelatin mixture into a plurality of cups with an injection assembly of the device;
   chilling the plurality of gelatin-filled cups for a first duration with a chiller module of the device; and
   indicating the plurality of gelatin-filled cups is complete after the first duration; and
   rotating the mixing chamber to mix the one or more liquids with a gelatin-based product disposed inside the consumable pod to form the liquid gelatin mixture.

2. The method of claim 1, wherein adding one or more liquids to the mixing chamber includes flowing a pre-determined amount of heated water from a hot water reservoir to the mixing chamber through a needle inserted into an interior of the mixing chamber.

3. The method of claim 1, wherein the pod is pre-loaded into a pod acceptor of a pod receptacle of the device, wherein the consumable pod forms the mixing chamber, and wherein rotating the mixing chamber includes rotating the consumable pod via a motor coupled to the pod acceptor according to a pre-determined agitation profile for a second duration.

4. The method of claim 1, further comprising receiving an alcohol selection of a first alcohol at a controller of the device via a user interface of the device.

5. The method of claim 4, further comprising extracting the liquid gelatin mixture from the mixing chamber and combining the liquid gelatin mixture with the first alcohol and chilled water to form a combined liquid gelatin mixture and wherein injecting the liquid gelatin mixture into the plurality of cups includes translating the injection assembly along a single axis to inject a volume of the combined liquid gelatin mixture into each of the plurality of cups.

6. The method of claim 1, wherein the plurality of cups is positioned within a tray, the tray removably coupled to a slideable drawer of the device, wherein the injection assembly includes a plurality of nozzles extending across a length of the tray, and wherein injecting the liquid gelatin mixture into the plurality of cups includes translating the injection assembly to inject a volume of fluid into each of the plurality of cups.

7. The method of claim 1, further comprising, following the injecting, purging all fluid from the injection assembly and fluid lines of the device and into a waste drawer of the device.

8. The method of claim 1, wherein the injection assembly includes a nozzle and wherein the data includes consumable data, the consumable data including one or more of a number of shots to be made from the consumable pod, a flavor of contents within the consumable pod, an expiration date of the contents within the consumable pod, or a manufacturer of the consumable pod.

9. The method of claim 1, wherein the data includes data indicating the pod is a cleaning pod and in response to the data, activating a cleaning cycle of the device.

10. The method of claim 1, wherein the consumable pod contains dry ingredients including gelatin.

11. The method of claim 1, wherein the receiving data from the consumable pod includes reading a barcode of the consumable pod via a mirror and a scanning device included on a pod receptacle of the device, where the consumable pod is pre-loaded into a pod acceptor of the pod receptacle.

12. The method of claim 1, wherein chilling the plurality of gelatin-filled cups with the chiller module of the device includes circulating coolant through the chiller module, the chiller module positioned vertically below the injection assembly and the plurality of gelatin-filled cups.

13. The method of claim 1, wherein indicating the plurality of gelatin-filled cups is complete includes displaying a visual indication on a display screen of a user interface of the device, the user interface coupled to an exterior of a housing of the device.

* * * * *